US012631335B2

(12) United States Patent
Madden et al.

(10) Patent No.:     US 12,631,335 B2
(45) Date of Patent:          May 19, 2026

(54) GAS TURBINE ENGINE AND METHOD FOR REDUCING NONVOLATILE PARTICULATE MATTER EMISSIONS IN THE EXHAUST

(71) Applicant: ROLLS-ROYCE PLC, London (GB)

(72) Inventors: Christopher P Madden, Derby (GB); Peter Swann, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/892,765

(22) Filed: Sep. 23, 2024

(65) Prior Publication Data

US 2025/0377111 A1      Dec. 11, 2025

(30) Foreign Application Priority Data

Jun. 10, 2024   (GB) ..................................... 2408240

(51) Int. Cl.
| | |
|---|---|
| *F23R 3/34* | (2006.01) |
| *F02C 7/22* | (2006.01) |
| *F02C 7/228* | (2006.01) |

(52) U.S. Cl.
CPC ................. *F23R 3/34* (2013.01); *F02C 7/22* (2013.01); *F02C 7/228* (2013.01)

(58) Field of Classification Search
CPC .. F02C 7/22; F02C 7/228; F02C 7/224; F23R 3/34
See application file for complete search history.

(56) References Cited

U.S. PATENT DOCUMENTS

| | | | |
|---|---|---|---|
| 4,817,389 A | 4/1989 | Holladay et al. |
| 4,903,478 A | 2/1990 | Seto et al. |
| 5,036,657 A | 8/1991 | Seto et al. |
| 5,211,005 A | 5/1993 | Hovnanian |

(Continued)

OTHER PUBLICATIONS

Speth_Black carbon emissions reductions from combustion of alternative jet fuels_2015_Atmospheric Environment (Jan. 19, 2015).

(Continued)

*Primary Examiner* — William H Rodriguez
(74) *Attorney, Agent, or Firm* — Oliff PLC

(57) ABSTRACT

A gas turbine engine has a first subset of fuel spray nozzles and a second subset of fuel spray nozzles. A combustor is operable with the first subset of fuel spray nozzles supplied with fuel at a greater flow rate than each of the second subset of fuel spray nozzles. A ratio of the first subset of fuel spray nozzles to the second subset of fuel spray nozzles is 1:2 to 1:5. A first idle-MTO nvPM emissions index ratio is:

$$\frac{EI_{idle}}{EI_{maxTO}},$$

where: $EI_{idle}$ is the nvPM emissions index in mg/kg operating at around 7% available thrust; $EI_{maxTO}$ is the nvPM emissions index in mg/kg of the gas turbine engine operating at around 100% available thrust; and the first idle-MTO nvPM emissions index ratio of the gas turbine engine is less than 60. A sustainable aviation fuel (SAF) can be provided to the fuel spray nozzles.

20 Claims, 6 Drawing Sheets

(56) References Cited

U.S. PATENT DOCUMENTS

| | | | |
|---|---|---|---|
| 5,884,483 | A | 3/1999 | Munro |
| 5,987,889 | A | 11/1999 | Graves |
| 6,360,525 | B1 | 3/2002 | Senior |
| 6,857,272 | B2 | 2/2005 | Summerfield et al. |
| 11,530,651 | B2 | 12/2022 | Madden et al. |
| 11,585,278 | B1 | 2/2023 | Swann et al. |
| 11,585,282 | B1* | 2/2023 | Swann ..................... F02C 9/28 |
| 11,591,973 | B1* | 2/2023 | Swann ..................... F02C 9/34 |
| 11,643,979 | B1* | 5/2023 | Bemment ............. B64D 37/30 |
| | | | 60/776 |
| 11,643,980 | B1 | 5/2023 | Bemment et al. |
| 11,821,373 | B2 | 11/2023 | Madden et al. |
| 12,168,958 | B2 | 12/2024 | Madden et al. |
| 2005/0204741 | A1 | 9/2005 | Simons |
| 2007/0105061 | A1 | 5/2007 | Flohr et al. |
| 2008/0011073 | A1 | 1/2008 | Pilatis |
| 2009/0229238 | A1 | 9/2009 | Zhang et al. |
| 2009/0241548 | A1 | 10/2009 | Danis et al. |
| 2011/0016873 | A1 | 1/2011 | Nakamura et al. |
| 2012/0131926 | A1 | 5/2012 | Kopecek et al. |
| 2013/0125556 | A1 | 5/2013 | Hoke et al. |
| 2013/0340324 | A1 | 12/2013 | Swann |
| 2015/0134151 | A1 | 5/2015 | Swann |
| 2015/0316266 | A1 | 11/2015 | Prade |
| 2017/0089205 | A1 | 3/2017 | Joshi |
| 2017/0268782 | A1 | 9/2017 | Huang |
| 2021/0277835 | A1* | 9/2021 | Madden .................. F23R 3/346 |
| 2022/0235716 | A1* | 7/2022 | Swann ..................... F02C 9/28 |
| 2023/0192303 | A1 | 6/2023 | Swann et al. |
| 2023/0193777 | A1 | 6/2023 | Swann et al. |
| 2023/0193834 | A1 | 6/2023 | Keeler et al. |
| 2023/0193835 | A1 | 6/2023 | Swann et al. |
| 2023/0193836 | A1 | 6/2023 | Swann et al. |
| 2023/0193837 | A1 | 6/2023 | Keeler et al. |
| 2023/0279808 | A1* | 9/2023 | Swann .................. B64D 27/10 |
| | | | 477/3 |
| 2023/0323820 | A1* | 10/2023 | Swann ..................... F02C 9/26 |
| | | | 60/39.094 |
| 2023/0323823 | A1* | 10/2023 | Swann ..................... F02C 9/28 |
| | | | 60/204 |
| 2023/0324319 | A1 | 10/2023 | Bemment et al. |
| 2024/0209792 | A1* | 6/2024 | Madden .................. F23R 3/346 |
| 2025/0088469 | A1 | 3/2025 | Jennings et al. |

OTHER PUBLICATIONS

Durdina, "Reduction of Nonvolatile Particulate Matter Emissions of a Commercial Turbofan Engine at the Ground Level from the Use of a Sustainable Aviation Fuel Blend", Oct. 18, 2021, ACS Publications, pp. 14576-14585 (Year: 2021).

Apr. 9, 2026 Notice of Allowance issued in U.S. Appl. No. 18/892,710.

* cited by examiner

1000

GAS TURBINE ENGINE AND METHOD FOR REDUCING NONVOLATILE PARTICULATE MATTER EMISSIONS IN THE EXHAUST

CROSS-REFERENCE TO RELATED APPLICATIONS

This specification is based upon and claims the benefit of priority from UK Patent Application Number 2408240.6 filed on 10th June 2024, the entire contents of which are incorporated herein by reference.

BACKGROUND

Field of the Disclosure

The present disclosure relates to the emissions of non-volatile particulate matter (nvPM) from gas turbine engines, specifically gas turbine engines for an aircraft. The present disclosure provides various methods of operating a gas turbine engine and gas turbine engines. Aspects of the present application relate to methods of operating gas turbine engines using a fuel which comprises a sustainable aviation fuel (SAF) and gas turbine engines configured to operate using fuel comprising a SAF.

Description of the Related Art

There is an expectation in the aviation industry of a trend towards the use of fuels different from the traditional kerosene-based jet fuels generally used at present.

The inventors have identified that the emissions of a gas turbine engine are sensitive to the fuel being used, in particular the amount of nvPM produced by the engine varies depending on the operating parameters and the type of fuel being used. Thus, there is a need to take account of fuel properties of these different fuels and to adjust methods of operating gas turbine engines accordingly.

SUMMARY

According to a first aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a first idle-MTO nvPM emissions index ratio may be defined as:

$$\frac{EI_{idle}}{EI_{maxTO}}$$

where:

$EI_{idle}$ is the nvPM emissions index in mg/kg of the gas turbine engine if operating at around 7% available thrust for given operating conditions; and $EI_{maxTO}$ is the nvPM emissions index in mg/kg of the gas turbine engine if operating at around 100% available thrust for the given operating conditions;

the first idle-MTO nvPM emissions index ratio of the gas turbine engine is less than 60; and the gas turbine engine is configured to provide fuel comprising a sustainable aviation fuel (SAF) to the plurality of fuel spray nozzles.

Advantageously, reduced nvPM in the exhaust of a gas turbine engine contributes to a reduction in undesirable emissions of the engine. For example, according to operational conditions, reducing nvPM in such a manner may lead to a reduced degree of soot deposits within the engine within and/or downstream of the combustor, and/or an improvement in local air quality. Furthermore, at certain stages of an aircraft flight (where contrails are otherwise expected to form) reduced nvPM in the exhaust may lead to reduced contrail strength and/or time taken for a contrail to disperse. Still further, it has been recognised that certain parts of the flight cycle at which the nvPM is reduced (or most reduced) can be targeted in order to achieve a desired outcome, for example in terms of environmental impact. Purely by way of example, lower nvPM at cruise conditions may particularly reduce the radiative forcing impact of contrails. Purely by way of further example, lower nvPM at idle conditions may particularly improve local air quality on the ground in the region of engine operation. Purely by way of further example, lower nvPM at MTO conditions may particularly reduce the maximum rate of nvPM production during the flight cycle and/or improve air quality on the ground and/or in the region of engine operation. These considerations may apply to all aspects of the disclosure.

A number of parameters related to gas turbine engine operation have been determined to have an influence on, or are an important factor in, the configuration and arrangement of the combustor of the engine when certain types of fuel, such as a sustainable aviation fuel, are being combusted. Accordingly, any one or more parameters of the following aspects may be advantageously taken into account when determining, for example, operational settings, combustor arrangement and/or combustor configuration, to influence and/or optimise how that fuel is to be distributed, ignited, and/or combusted within the gas turbine engine. These considerations may apply to all aspects of the disclosure.

The first idle-MTO nvPM emissions index ratio of the gas turbine engine may be greater than zero.

The first idle-MTO nvPM emissions index ratio may be less than 58.4 and preferably may be less than 53.5 and more preferably may be less than 48.6.

The first idle-MTO nvPM emissions index ratio may be less than or equal to 45 and preferably may be less than or equal to 30 and more preferably may be less than or equal to 15.

The first idle-MTO nvPM emissions index ratio may be less than or equal to 8.65 and preferably may be less than or equal to 7.93 and more preferably may be less than or equal to 7.21.

The first idle-MTO nvPM emissions index ratio may be less than or equal to 0.155 and preferably may be less than or equal to 0.142 and more preferably may be less than or equal to 0.129.

The first idle-MTO nvPM emissions index ratio may be greater than or equal to 0.038 and preferably may be greater than or equal to 0.0428 and more preferably may be greater than or equal to 0.0475.

The first idle-MTO nvPM emissions index ratio may be greater than or equal to 1.21 and preferably may be greater than or equal to 1.36 and more preferably may be greater than or equal to 1.52.

The first idle-MTO nvPM emissions index ratio may be in the range of 0.0380 to 8.65 and preferably may be in the range of 0.0428 to 7.93 and more preferably may be in the range of 0.0475 to 7.21.

The first idle-MTO nvPM emissions index ratio may be in the range of 0.0380 to 0.155 and preferably may be the range of 0.0428 to 0.142 and more preferably may be in the range of 0.0475 to 0.129.

The first idle-MTO nvPM emissions index ratio may be in the range of 1.21 to 8.65 and preferably may be in the range of 1.36 to 7.93 and more preferably may be in the range of 1.52 to 7.21.

The first idle-MTO nvPM emissions index ratio may be less than 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, or in any range defined between any two of these values.

A second idle-MTO nvPM emissions index ratio may be defined as:

$$\frac{EI_{idle,SAF}/EI_{maxTO,SAF}}{EI_{idle,FF}/EI_{maxTO,FF}}$$

where:

$EI_{idle,SAF}$ is the nvPM emissions index in mg/kg of the gas turbine engine if operating at around 7% available thrust for the given operating conditions, or for other different operating conditions, and if a fuel provided to the combustor comprises a sustainable aviation fuel;

$EI_{maxTO,SAF}$ is the nvPM emissions index in mg/kg of the gas turbine engine if operating at around 100% available thrust for the same given operating conditions at which $EI_{idle,SAF}$ is calculated, and if a fuel provided to the combustor comprises a sustainable aviation fuel;

$EI_{idle,FF}$ is the nvPM emissions index in mg/kg of the gas turbine engine if operating at around 7% available thrust for the same given operating conditions at which $EI_{idle,SAF}$ is calculated, and if a fuel provided to the combustor is a fossil-based hydrocarbon fuel;

$EI_{maxTO,FF}$ is the nvPM emissions index in mg/kg of the gas turbine engine if operating at around 100% available thrust for the same given operating conditions at which $EI_{idle,SAF}$ is calculated, and if a fuel provided to the combustor is a fossil-based hydrocarbon fuel;

and wherein the second idle-MTO nvPM emissions index ratio of the gas turbine engine may be less than 1.

The second idle-MTO nvPM emissions index ratio may be greater than zero.

The second idle-MTO nvPM emissions index ratio may be less than or equal to 0.8 and preferably may be less than or equal to 0.6 and more preferably may be less than or equal to 0.4 and more preferably may be less than or equal to 0.2.

The second idle-MTO nvPM emissions index ratio may be less than or equal to 0.178 and preferably may be less than or equal to 0.164 and more preferably may be less than or equal to 0.149.

The second idle-MTO nvPM emissions index ratio may be greater than or equal to 0.03 and preferably may be greater than or equal to 0.06 and more preferably may be greater than or equal to 0.09.

The second idle-MTO nvPM emissions index ratio may be greater than or equal to 0.118 and preferably may be greater than or equal to 0.133 and more preferably may be greater than or equal to 0.148.

The second idle-MTO nvPM emissions index ratio may be in the range 0.118 to 0.178 and preferably may be in the range 0.133 to 0.164 and more preferably may be in the range 0.148 to 0.149.

The second idle-MTO nvPM emissions index ratio may be less than 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or 1, or in any range defined between any two of these values.

According to a second aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a second idle-MTO nvPM emissions index ratio may be defined as:

$$\frac{EI_{idle,SAF}/EI_{maxTO,SAF}}{EI_{idle,FF}/EI_{maxTO,FF}}$$

where:

$EI_{idle,SAF}$ is the nvPM emissions index in mg/kg of the gas turbine engine if operating at around 7% available thrust for given operating conditions and if a fuel provided to the combustor comprises a sustainable aviation fuel;

$EI_{maxTO,SAF}$ is the nvPM emissions index in mg/kg of the gas turbine engine if operating at around 100% available thrust for the same given operating conditions at which $EI_{idle,SAF}$ is calculated, and if a fuel provided to the combustor comprises a sustainable aviation fuel;

$EI_{idle,FF}$ is the nvPM emissions index in mg/kg of the gas turbine engine if operating at around 7% available thrust for the same given operating conditions at which $EI_{idle,SAF}$ is calculated, and if a fuel provided to the combustor is a fossil-based hydrocarbon fuel;

$EI_{maxTO,FF}$ is the nvPM emissions index in mg/kg of the gas turbine engine if operating at around 100% available thrust for the same given operating conditions at which $EI_{idle,SAF}$ is calculated, and if a fuel provided to the combustor is a fossil-based hydrocarbon fuel;

the second idle-MTO nvPM emissions index ratio of the gas turbine engine is less than 1; and the gas turbine engine is configured to provide fuel comprising a sustainable aviation fuel (SAF) to the plurality of fuel spray nozzles.

The second idle-MTO nvPM emissions index ratio defined in the second aspect may be as defined above in connection with the first aspect.

According to a third aspect, there is provided a method of operating the gas turbine engine of the first aspect or the second aspect, the method comprising providing fuel comprising a sustainable aviation fuel to the plurality of fuel spray nozzles.

According to a fourth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a first idle-MTO nvPM emissions index ratio may be defined as:

$$\frac{EI_{idle}}{EI_{maxTO}}$$

where:

$EI_{idle}$ is the nvPM emissions index in mg/kg of the gas turbine engine if operating at around 7% available thrust for given operating conditions; and $EI_{maxTO}$ is the nvPM emissions index in mg/kg of the gas turbine engine if operating at around 100% available thrust for the given operating conditions;

the first idle-MTO nvPM emissions index ratio of the gas turbine engine is less than 60; and the method comprises providing fuel comprising a sustainable aviation fuel to the plurality of fuel spray nozzles.

The first idle-MTO nvPM emissions index ratio may be as defined above in connection with the first aspect.

A second idle-MTO nvPM emissions index ratio may be defined as:

$$\frac{EI_{idle,SAF}/EI_{maxTO,SAF}}{EI_{idle,FF}/EI_{maxTO,FF}}$$

where:

$EI_{idle,SAF}$ is the nvPM emissions index in mg/kg of the gas turbine engine if operating at around 7% available thrust for the given operating conditions, or for other different operating conditions, and if a fuel provided to the combustor comprises a sustainable aviation fuel;

$EI_{maxTO,SAF}$ is the nvPM emissions index in mg/kg of the gas turbine engine if operating at around 100% available thrust for the same given operating conditions at which $EI_{idle,SAF}$ is calculated, and if a fuel provided to the combustor comprises a sustainable aviation fuel;

$EI_{idle,FF}$ is the nvPM emissions index in mg/kg of the gas turbine engine if operating at around 7% available thrust for the same given operating conditions at which $EI_{idle,SAF}$ is calculated, and if a fuel provided to the combustor is a fossil-based hydrocarbon fuel;

$EI_{maxTO,FF}$ is the nvPM emissions index in mg/kg of the gas turbine engine if operating at around 100% available thrust for the same given operating conditions at which $EI_{idle,SAF}$ is calculated, and if a fuel provided to the combustor is a fossil-based hydrocarbon fuel; and wherein the second idle-MTO nvPM emissions index ratio of the gas turbine engine may be less than 1.

The second idle-MTO nvPM emissions index ratio may be as defined above in connection with the first aspect.

According to a fifth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a second idle-MTO nvPM emissions index ratio may be defined as:

$$\frac{EI_{idle,SAF}/EI_{maxTo,SAF}}{EI_{idle,FF}/EI_{maxTo,FF}}$$

where:

$EI_{idle,SAF}$ is the nvPM emissions index in mg/kg of the gas turbine engine if operating at around 7% available thrust for given operating conditions and if a fuel provided to the combustor comprises a sustainable aviation fuel;

$EI_{maxTO,SAF}$ is the nvPM emissions index in mg/kg of the gas turbine engine if operating at around 100% available thrust for the same given operating conditions at which $EI_{idle,SAF}$ is calculated, and if a fuel provided to the combustor comprises a sustainable aviation fuel;

$EI_{idle,FF}$ is the nvPM emissions index in mg/kg of the gas turbine engine if operating at around 7% available thrust for the same given operating conditions at which $EI_{idle,SAF}$ is calculated, and if a fuel provided to the combustor is a fossil-based hydrocarbon fuel;

$EI_{maxTO,FF}$ is the nvPM emissions index in mg/kg of the gas turbine engine if operating at around 100% available thrust for the same given operating conditions at which $EI_{idle,SAF}$ is calculated, and if a fuel provided to the combustor is a fossil-based hydrocarbon fuel;

the second idle-MTO nvPM emissions index ratio of the gas turbine engine is less than 1; and the method comprises providing fuel comprising a sustainable aviation fuel to the plurality of fuel spray nozzles.

The second idle-MTO nvPM emissions index ratio may be as defined above in connection with the first aspect.

According to a sixth aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a fuel-flow nvPM emissions index ratio may be defined as:

$$\frac{EI_{idle} \times W_{f,idle}}{EI_{maxTO} \times W_{f,maxTO}}$$

where:

$EI_{idle}$ is the nvPM emissions index in mg/kg of the gas turbine engine if operating at around 7% available thrust for given operating conditions;

$EI_{maxTO}$ is the nvPM emissions index in mg/kg of the gas turbine engine if operating at around 100% available thrust for the given operating conditions;

$W_{f,idle}$ is the rate of fuel flow to the fuel spray nozzles in kg/s at around 7% available thrust for the given operating conditions; and $W_{f,maxTO}$ is the rate of fuel flow to the fuel spray nozzles in kg/s at around 100% available thrust for the given operating conditions;

the fuel-flow nvPM emissions index ratio of the gas turbine engine is less than 6; and the gas turbine engine is configured to provide fuel comprising a sustainable aviation fuel (SAF) to the plurality of fuel spray nozzles.

The fuel-flow nvPM emissions index ratio may be less than 5.93 and preferably may be less than 5.44 and more preferably may be less than 4.94.

The fuel-flow nvPM emissions index ratio may be less than or equal to 4.5 and preferably may be less than or equal to 3 and more preferably may be less than or equal to 1.5.

The fuel-flow nvPM emissions index ratio may be less than or equal to 0.879 and preferably may be less than or equal to 0.806 and more preferably may be less than or equal to 0.733.

The fuel-flow nvPM emissions index ratio may be less than or equal to 0.0181 and preferably may be less than or equal to 0.0166 and more preferably may be less than or equal to 0.0151.

The fuel-flow nvPM emissions index ratio may be greater than or equal to 0.00351 and preferably may be greater than or equal to 0.00395 and more preferably may be greater than or equal to 0.00439.

The fuel-flow nvPM emissions index ratio may be greater than or equal to 0.109 and preferably may be greater than or equal to 0.123 and more preferably may be greater than or equal to 0.137.

The fuel-flow nvPM emissions index ratio may be in the range of 0.00351 to 0.879 and preferably may be in the range of 0.00395 to 0.806 and more preferably may be in the range of 0.00439 to 0.733.

The fuel-flow nvPM emissions index ratio may be in the range of 0.00351 to 0.0181 and preferably may be in the range of 0.00395 to 0.0166 and more preferably may be in the range 0.00439 to 0.0151.

The fuel-flow nvPM emissions index ratio may be in the range of 0.109 to 0.879 and preferably may be in the range of 0.123 to 0.806 and more preferably may be in the range 0.137 to 0.733.

The fuel-flow nvPM emissions index ratio may be 0.003, 0.004, 0.005, 0.01, 0.015, 0.02, 0.025, 0.03, 0.035, 0.04, 0.045, 0.05, 0.055, 0.06, 0.065, 0.07, 0.1, 0.2, 0.3, 0.4, 0.5, 0.6, 0.7, 0.8, 0.9, 1, 1.5, 2, 2.5, 3, 3.5, 4, 4.5, 5, 5.5, 6 or any range defined between any two of these values.

$W_{f,maxTO}$ may be in the range 0.595 to 1.29 kg/s and preferably may be in the range of 0.670 to 1.19 kg/s and more preferably may be in the range of 0.744 to 1.08 kg/s.

$W_{f,idle}$ may be in the range of 0.0695 to 0.118 kg/s and preferably may be in the range of 0.0782 to 0.108 kg/s and more preferably may be in the range of 0.0869 to 0.0981 kg/s.

$W_{f,idle}$ may be in the range of 0.0712 to 0.117 kg/s and preferably may be in the range of 0.0801 to 0.107 kg/s and more preferably may be the range of 0.0890 to 0.0970 kg/s.

$W_{f,maxTO}$ may be in the range of 0.595 to 1.28 kg/s and preferably may be in the range of 0.670 to 1.17 kg/s and more preferably may be in the range of 0.744 to 1.07 kg/s.

$W_{f,maxTO}$ may be in the range of 0.701 to 1.29 kg/s and preferably may be in the range of 0.788 to 1.19 kg/s and more preferably may be in the range of 0.876 to 1.08 kg/s.

According to a seventh aspect, there is provided a method of operating the gas turbine engine of the sixth aspect, the method comprising providing fuel comprising a sustainable aviation fuel to the plurality of fuel spray nozzles.

According to an eighth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a fuel-flow nvPM emissions index ratio may be defined as:

$$\frac{EI_{idle} \times W_{f,idle}}{EI_{maxTO} \times W_{f,maxTO}}$$

where:

$EI_{idle}$ is the nvPM emissions index in mg/kg of the gas turbine engine if operating at around 7% available thrust for given operating conditions; and $EI_{maxTO}$ is the nvPM emissions index in mg/kg of the gas turbine engine if operating at around 100% available thrust for the given operating conditions;

$W_{f,idle}$ is the rate of fuel flow to the fuel spray nozzles in kg/s at around 7% available thrust for the given operating conditions; and $W_{f,maxTO}$ is the rate of fuel flow to the fuel spray nozzles in kg/s at around 100% available thrust for the given operating conditions;

the fuel-flow nvPM emissions index ratio of the gas turbine engine is less than 6; and the method comprises providing fuel comprising a sustainable aviation fuel to the plurality of fuel spray nozzles.

Any of the fuel-flow nvPM emissions index ratio, $W_{f,idle}$ and $W_{f,maxTO}$ may be as defined above in connection with the sixth aspect.

According to a ninth aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a thrust nvPM emissions index ratio may be defined as:

$$\frac{EI_{maxTO}/F_{maxTO}}{EI_{idle}/F_{idle}}$$

where:

$EI_{idle}$ is the nvPM emissions index in mg/kg of the gas turbine engine if operating at around 7% available thrust for given operating conditions;

$EI_{maxTO}$ is the nvPM emissions index in mg/kg of the gas turbine engine if operating at around 100% available thrust for the given operating conditions;

$F_{maxTO}$ is the thrust of the gas turbine engine at around 100% available thrust in kN for the given operating conditions; and $F_{idle}$ is the thrust of the gas turbine engine at around 7% available thrust in kN for the given operating conditions;

the thrust nvPM emissions index ratio is greater than 0.001; and the gas turbine engine is configured to provide fuel comprising a sustainable aviation fuel (SAF) to the plurality of fuel spray nozzles.

The thrust nvPM emissions index ratio may be greater than 0.00115 and preferably may be greater than 0.00129 and more preferably may be greater than 0.00144.

The thrust nvPM emissions index ratio may be greater than 0.0644 and preferably may be greater than 0.0724 and more preferably may be greater than 0.0805.

The thrust nvPM emissions index ratio may be greater than or equal to 0.003 and preferably may be greater than or equal to 0.005 and more preferably may be greater than or equal to 0.007.

The thrust nvPM emissions index ratio may be greater than or equal to 0.00776 and preferably may be greater than or equal to 0.00874 and more preferably may be greater than or equal to 0.00971.

The thrust nvPM emissions index ratio may be greater than or equal to 0.434 and preferably may be greater than or equal to 0.488 and more preferably may be greater than or equal to 0.542.

The thrust nvPM emissions index ratio may be less than or equal to 1.77 and preferably may be less than or equal to 1.62 and more preferably may be less than or equal to 1.48.

The thrust nvPM emissions index ratio may be less than or equal to 0.0553 and preferably may be less than or equal to 0.0507 and more preferably may be less than or equal to 0.0461.

The thrust nvPM emissions index ratio may be in the range of 0.00776 to 1.77 and preferably may be in the range of 0.00874 to 1.62 and more preferably may be in the range of 0.00971 to 1.48.

The thrust nvPM emissions index ratio may be greater than 0.001, 0.0015, 0.002, 0.0025, 0.003, 0.0035, 0.004, 0.0045, 0.005, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2 or any range defined between any two of these values.

The thrust nvPM emissions index ratio may be in the range of 0.434 to 1.77 and preferably may be in the range of 0.488 to 1.62 and more preferably may be the range of 0.542 to 1.48.

The thrust nvPM emissions index ratio may be in the range of 0.00776 to 0.0553 and preferably may be in the range of 0.00874 to 0.0507 and more preferably may be in the range of 0.00971 to 0.0461.

$F_{maxTO}$ may be in the range 85.4 kN to 172 kN and preferably may be in the range 96.1 kN to 158 kN and preferably may be in the range 106 kN to 144 kN.

$F_{idle}$ may be in the range 5.98 kN to 12.1 kN and preferably may be in the range 6.72 kN to 11.1 kN and more preferably may be in the range 7.47 kN to 10.1 kN.

$F_{maxTO}$ may be in the range 89.0 kN to 157 kN and preferably may be in the range 100 kN to 144 kN and more preferably may be in the range 111 kN to 131 kN.

$F_{idle}$ may be the range 6.23 kN to 11.0 kN and preferably may be in the range 7.00 kN to 10.1 kN and more preferably may be in the range 7.78 kN to 9.13 kN.

According to a tenth aspect, there is provided a method of operating the gas turbine engine of the ninth aspect, the method comprising providing fuel comprising a sustainable aviation fuel to the plurality of fuel spray nozzles.

According to an eleventh aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a thrust nvPM emissions index ratio may be defined as:

$$\frac{EI_{maxTO}/F_{maxTO}}{EI_{idle}/F_{idle}}$$

where:

$EI_{idle}$ is the nvPM emissions index in mg/kg of the gas turbine engine if operating at around 7% available thrust for given operating conditions; and $EI_{maxTO}$ is the nvPM emissions index in mg/kg of the gas turbine engine if operating at around 100% available thrust for the given operating conditions;

$F_{maxTO}$ is the thrust of the gas turbine engine at around 100% available thrust in kN for the given operating conditions, $F_{idle}$ is the thrust of the gas turbine engine at around 7% available thrust in kN for the given operating conditions; and the thrust nvPM emissions index ratio is greater than 0.001; and the method comprises providing fuel comprising a sustainable aviation fuel to the plurality of fuel spray nozzles.

Any of the thrust nvPM emissions index ratio, $F_{maxTO}$ and $F_{idle}$ may be as defined in connection with the ninth aspect.

According to a twelfth aspect, there is provided a gas turbine engine for an aircraft, comprising any one or more of the follow features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a lean cruise-MTO nvPM emissions index ratio may be defined as:

$$\frac{EI_{cruise(lean)}/EI_{maxTO}}{BPR}$$

where:

$EI_{cruise\,(lean)}$ may be defined as:

$$\frac{EI_{maxTO}+EI_{climb}}{2}$$

$EI_{maxTO}$ is the nvPM emissions index in mg/kg of the gas turbine engine when operating at around 100% available thrust for given operating conditions;

$EI_{climb}$ is the nvPM emissions index in mg/kg of the gas turbine engine when operating at around 85% available thrust for the given operating conditions; and BPR is the bypass ratio of the gas turbine engine;

the lean cruise-MTO nvPM emissions index ratio is less than 0.2; and the gas turbine engine is configured to provide fuel comprising a sustainable aviation fuel (SAF) to the plurality of fuel spray nozzles.

The lean cruise-MTO nvPM emissions index ratio may be less than 0.119 and preferably may be less than 0.109 and more preferably may be less than 0.0989.

The lean cruise-MTO nvPM emissions index ratio may be less than 0.101 and preferably may be less than 0.0922 and more preferably may be less than 0.0838.

The lean cruise-MTO nvPM emissions index ratio may be less than or equal to 0.095 and preferably may be less than or equal to 0.092 and further preferably may be less than or equal to 0.089.

The lean cruise-MTO nvPM emissions index ratio may be less than or equal to 0.106 and preferably may be less than or equal to 0.0972 and further preferably may be less than or equal to 0.0883.

The lean cruise-MTO nvPM emissions index ratio may be less than or equal to 0.0887 and preferably may be less than or equal to 0.0813, and further preferably may be less than or equal to 0.0739.

The lean cruise-MTO nvPM emissions index ratio may be greater than or equal to 0.0519 and preferably may be greater than or equal to 0.0584, and further preferably may be greater than or equal to 0.0649.

The lean cruise-MTO nvPM emissions index ratio may be greater than or equal to 0.0578 and preferably may be greater than or equal to 0.0651, and further preferably may be greater than or equal to 0.0723.

The lean cruise-MTO nvPM emissions index ratio may be in the range of 0.0519 to 0.106 and preferably may be in the range of 0.0584 to 0.0972 and further preferably may be in the range of 0.0649 to 0.0883.

The lean cruise-MTO nvPM emissions index ratio may be in the range of 0.0519 to 0.0887 and preferably may be in the range of 0.0584 to 0.0813 and further preferably may be in the range of 0.0649 to 0.0739.

The lean cruise-MTO nvPM emissions index ratio may be in the range of 0.0578 to 0.106 and preferably may be in the range of 0.0651 to 0.0972 and more preferably may be in the range of 0.0723 to 0.0883.

The lean cruise-MTO nvPM emissions index ratio may less than 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, or 0.2, or within any range defined between any two of these values.

BPR may be in the range of 6.63 to 13.4 and preferably may be in the range of 7.46 to 12.3 and further preferably may be in the range of 8.29 to 11.1.

BPR may be in the range of 8.36 to 13.4 and preferably may be in the range of 9.40 to 12.3 and further preferably may be in the range of 10.4 to 11.1.

BPR may be in the range of 6.63 to 10.3 and preferably may be in the range of 7.46 to 9.38 and further preferably may be in the range of 8.29 to 8.53.

A rich cruise-MTO nvPM emissions index ratio may be defined as:

$$\frac{EI_{cruise(rich)}/EI_{maxTO}}{BPR}$$

where:

$EI_{cruise\ (rich)}$ may be defined as:

$$\frac{EI_{climb} + EI_{approach}}{2}$$

$EI_{climb}$ is the nvPM emissions index in mg/kg of the gas turbine engine when operating at around 85% available thrust for the given operating conditions, or for other different operating conditions;

$EI_{approach}$ is the nvPM emissions index in mg/kg of the gas turbine engine when operating at around 30% available thrust for the same operating conditions at which $EI_{climb}$ is calculated; and $EI_{maxTO}$ is the nvPM emissions index in mg/kg of the gas turbine engine when operating at around 100% available thrust for the same operating conditions at which $EI_{climb}$ is calculated; and wherein the rich cruise-MTO nvPM emissions index ratio is less than 20.

The rich cruise-MTO nvPM emissions index ratio may be less than 19 and preferably may be less than 17.5 and more preferably may be less than 15.9.

The rich cruise-MTO nvPM emissions index ratio may be less than or equal to 12 and preferably may be less than or equal to 9, and more preferably may be less than or equal to 6.

The rich cruise-MTO nvPM emissions index ratio may be less than or equal to 4.54 and preferably may be less than or equal to 4.17, and further preferably may be less than or equal to 3.79.

The rich cruise-MTO nvPM emissions index ratio may be less than or equal to 0.066 and preferably may be less than or equal to 0.0605, and further preferably may be less than or equal to 0.055.

The rich cruise-MTO nvPM emissions index ratio may be greater than or equal to 0.0374 and preferably may be greater than or equal to 0.0421, and further preferably may be greater than or equal to 0.0468.

The rich cruise-MTO nvPM emissions index ratio may be greater than or equal to 1.41 and preferably may be greater than or equal to 1.58, and further preferably may be greater than or equal to 1.76.

The rich cruise-MTO nvPM emissions index ratio may be in the range of 0.0374 to 4.54 and preferably may be in the range of 0.0421 to 4.17 and further preferably may be in the range of 0.0468 to 3.79.

The rich cruise-MTO nvPM emissions index ratio may be in the range of 0.0374 to 0.0660 and preferably may be in the range of 0.0421 to 0.0605 and further preferably may be in the range of 0.0468 to 0.0550.

The rich cruise-MTO nvPM emissions index ratio may be in the range of 1.41 to 4.54 and preferably may be in the range of 1.58 to 4.17 and further preferably may be in the range of 1.76 to 3.79.

The rich cruise-MTO nvPM emissions index ratio may be less than 1, 2, 3, 4, 5, 6, 7, 8, 9, 10, 11, 12, 13, 14, 15, 16, 17, 18, 19, or 20, or within any range defined between any two of these values.

The rich cruise-MTO nvPM emissions index ratio may be less than 0.03, 0.33, 0.63, 0.93, 1.23, 1.53, 1.83, 2.13, 2.43, 2.73, 3.03, 3.33, 3.63, 3.93, 4.23, 4.53, 4.83, 5.13, 5.43, 5.73, or 6.03, or within any range defined between any two of these values.

According to a thirteenth aspect, there is provided a gas turbine engine for an aircraft, comprising any one or more of the follow features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a rich cruise-MTO nvPM emissions index ratio may be defined as:

$$\frac{EI_{cruise(rich)}/EI_{maxTO}}{BPR}$$

where:

$EI_{cruise\ (rich)}$ may be defined as:

$$\frac{EI_{climb} + EI_{approach}}{2}$$

$EI_{climb}$ is the nvPM emissions index in mg/kg of the gas turbine engine when operating at around 85% available thrust for given operating conditions;

$EI_{approach}$ is the nvPM emissions index in mg/kg of the gas turbine engine when operating at around 30% available thrust for the same operating conditions at which $EI_{climb}$ is calculated;

$EI_{maxTO}$ is the nvPM emissions index in mg/kg of the gas turbine engine when operating at around 100% available thrust for the same operating conditions at which $EI_{climb}$ is calculated;

BPR is the bypass ratio of the gas turbine engine;

the rich cruise-MTO nvPM emissions index ratio is less than 20; and the gas turbine engine is configured to provide fuel comprising a sustainable aviation fuel (SAF) to the plurality of fuel spray nozzles.

The rich cruise-MTO nvPM emissions index ratio and/or the BPR may be as defined above in connection with the twelfth aspect.

According to a fourteenth aspect, there is provided a method of operating the gas turbine engine of the twelfth or thirteenth aspect, the method comprising providing fuel comprising a sustainable aviation fuel to the plurality of fuel spray nozzles.

According to a fifteenth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a lean cruise-MTO nvPM emissions index ratio may be defined as:

$$\frac{EI_{cruise(lean)}/EI_{maxTO}}{BPR}$$

where:

$EI_{cruise\ (lean)}$ may be defined as:

$$\frac{EI_{maxTO} + EI_{climb}}{2}$$

$EI_{maxTO}$ is the nvPM emissions index in mg/kg of the gas turbine engine when operating at around 100% available thrust for given operating conditions;

$EI_{climb}$ is the nvPM emissions index in mg/kg of the gas turbine engine when operating at around 85% available thrust for the given operating conditions; and BPR is the bypass ratio of the gas turbine engine;

the lean cruise-MTO nvPM emissions index ratio is less than 0.2; and the method comprises providing fuel comprising a sustainable aviation fuel to the plurality of fuel spray nozzles.

The lean cruise-MTO nvPM emissions index ratio and/or the BPR may be as defined above in connection with the twelfth aspect.

A rich cruise-MTO nvPM emissions index ratio may be defined as:

$$\frac{EI_{cruise(rich)}/EI_{maxTO}}{BPR}$$

where:

$EI_{cruise\ (rich)}$ may be defined as:

$$\frac{EI_{climb} + EI_{approach}}{2}$$

$EI_{climb}$ is the nvPM emissions index in mg/kg of the gas turbine engine when operating at around 85% available thrust for the given operating conditions, or for other different operating conditions;

$EI_{approach}$ is the nvPM emissions index in mg/kg of the gas turbine engine when operating at around 30% available thrust for the same operating conditions at which $EI_{climb}$ is calculated;

$EI_{maxTO}$ is the nvPM emissions index in mg/kg of the gas turbine engine when operating at around 100% available thrust for the same operating conditions at which $EI_{climb}$ is calculated; and wherein he rich cruise-MTO nvPM emissions index ratio may be less than 20.

The rich cruise-MTO nvPM emissions index ratio and/or the BPR may be as defined above in connection with the twelfth aspect.

According to a sixteenth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a rich cruise-MTO nvPM emissions index ratio may be defined as:

$$\frac{EI_{cruise(rich)}/EI_{maxTO}}{BPR}$$

where:

$EI_{cruise\ (rich)}$ may be defined as:

$$\frac{EI_{climb} + EI_{approach}}{2}$$

$EI_{climb}$ is the nvPM emissions index in mg/kg of the gas turbine engine when operating at around 85% available thrust for given operating conditions;

$EI_{approach}$ is the nvPM emissions index in mg/kg of the gas turbine engine when operating at around 30% available thrust for the same operating conditions at which $EI_{climb}$ is calculated;

$EI_{maxTO}$ is the nvPM emissions index in mg/kg of the gas turbine engine when operating at around 100% available thrust for the same operating conditions at which $EI_{climb}$ is calculated;

BPR is the bypass ratio of the gas turbine engine;

the rich cruise-MTO nvPM emissions index ratio may be less than 20; and the method comprises providing fuel comprising a sustainable aviation fuel to the plurality of fuel spray nozzles.

The rich cruise-MTO nvPM emissions index ratio and/or the BPR may be as defined above in connection with the twelfth aspect.

According to a seventeenth aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a MTO nvPM emissions index ratio may be defined as:

$$\frac{EI_{maxTO,SAF}}{EI_{maxTO,FF}}$$

where:

$EI_{maxTO,SAF}$ is the nvPM emissions index in mg/kg of the gas turbine engine when operating at around 100% available thrust for given operating conditions if a fuel provided to the plurality of fuel spray nozzles comprises a sustainable aviation fuel (SAF); and $EI_{maxTO,FF}$ is the nvPM emissions index in mg/kg of the gas turbine engine when operating at around 100% available thrust for the given operating conditions if a fuel provided to the plurality of fuel spray nozzles is a fossil-based hydrocarbon fuel;

the MTO nvPM emissions index ratio of the gas turbine engine is less than 1; and the gas turbine engine is configured to provide fuel comprising a SAF to the plurality of fuel spray nozzles.

The MTO nvPM emissions index ratio may be greater than zero.

The MTO nvPM emissions index ratio may be less than or equal to 0.93, and preferably may be less than or equal to 0.86, and more preferably may be less than or equal to 0.79.

The MTO nvPM emissions index ratio may be less than or equal to 0.776, and preferably may be less than or equal to 0.711, and more preferably may be less than or equal to 0.646.

The MTO nvPM emissions index ratio may be greater than or equal to 0.15, and preferably may be greater than or equal to 0.3, and more preferably may be greater than or equal to 0.45.

The MTO nvPM emissions index ratio may be greater than or equal to 0.516, and preferably may be greater than or equal to 0.581, and more preferably may be greater than or equal to 0.645.

The MTO nvPM emissions index ratio may be in the range of 0.516 to 0.776, and preferably may be in the range of 0.581 to 0.711, and more preferably may be in the range of 0.645 to 0.646.

The MTO nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

The MTO nvPM emissions index ratio may be 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, or within any range defined between any two of these values.

A climb nvPM emissions index ratio may be defined as:

$$\frac{EI_{climb,SAF}}{EI_{climb,FF}}$$

where:

$EI_{climb,SAF}$ is the nvPM emissions index in mg/kg of the gas turbine engine when operating at around 85% available thrust for the given operating conditions, or for different given operating conditions, if a fuel provided to the plurality of fuel spray nozzles comprises a sustainable aviation fuel (SAF); and $EI_{climb,FF}$ is the nvPM emissions index in mg/kg of the gas turbine engine when operating at around 85% available thrust for the same given operating conditions at which $EI_{climb,SAF}$ is calculated and if a fuel provided to the plurality of fuel spray nozzles is a fossil-based hydrocarbon fuel;

and wherein the climb nvPM emissions index ratio of the gas turbine engine may be less than 1.

The climb nvPM emissions index ratio may be greater than zero.

The climb nvPM emissions index ratio may be less than or equal to 0.9, and preferably may be less than or equal to 0.75, and more preferably may be less than or equal to 0.6.

The climb nvPM emissions index ratio may be less than or equal to 0.57, and preferably may be less than or equal to 0.523, and more preferably may be less than or equal to 0.475.

The climb nvPM emissions index ratio may be greater than or equal to 0.1, and preferably may be greater than or equal to 0.2, and more preferably may be greater than or equal to 0.3.

The climb nvPM emissions index ratio may be greater than or equal to 0.379, and preferably may be greater than or equal to 0.427, and more preferably may be greater than or equal to 0.474.

The climb nvPM emissions index ratio may be in the range of 0.379 to 0.570, and preferably may be in the range of 0.427 to 0.523, and more preferably may be in the range of 0.474 to 0.475.

The climb nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

The climb nvPM emissions index ratio may be 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, or within any range defined between any two of these values.

An approach nvPM emissions index ratio may be defined as:

$$\frac{EI_{approach,SAF}}{EI_{approach,FF}}$$

where:

$EI_{approach,SAF}$ is the nvPM emissions index in mg/kg of the gas turbine engine when operating at around 30% available thrust for the given operating conditions, or for different given operating conditions, if a fuel provided to the plurality of fuel spray nozzles comprises a sustainable aviation fuel (SAF); and $EI_{approach,FF}$ is the nvPM emissions index in mg/kg of the gas turbine engine when operating at around 30% available thrust for the same given operating conditions at which $EI_{approach,SAF}$ is calculated and if a fuel provided to the plurality of fuel spray nozzles is a fossil-based hydrocarbon fuel; and wherein the approach nvPM emissions index ratio of the gas turbine engine may be less than 1.

The approach nvPM emissions index ratio may be greater than zero.

The approach nvPM emissions index ratio may be less than or equal to 0.8, and preferably may be less than or equal to 0.5, and more preferably may be less than or equal to 0.2.

The approach nvPM emissions index ratio may be less than or equal to 0.185, and preferably may be less than or equal to 0.169, and more preferably may be less than or equal to 0.154.

The approach nvPM emissions index ratio may be greater than or equal to 0.03, and preferably may be greater than or equal to 0.06, and more preferably may be greater than or equal to 0.09.

The approach nvPM emissions index ratio may be greater than or equal to 0.122, and preferably may be greater than or equal to 0.138, and more preferably may be greater than or equal to 0.153.

The approach nvPM emissions index ratio may be in the range of 0.122 to 0.185, and preferably may be in the range of 0.138 to 0.169, and more preferably may be in the range of 0.153 to 0.154.

The approach nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

The approach nvPM emissions index ratio may be 0.1, 0.11, 0.12, 0.13, 0.14, 0.15, 0.16, 0.17, 0.17, 0.18, 0.19, 0.2, or within any range defined between any two of these values.

An idle nvPM emissions index ratio may be defined as:

$$\frac{EI_{idle,SAF}}{EI_{idle,FF}}$$

where:

$EI_{idle,SAF}$ is the nvPM emissions index in mg/kg of the gas turbine engine when operating at around 7% available thrust for the given operating conditions, or for different given operating conditions, and if a fuel provided to the plurality of fuel spray nozzles comprises a sustainable aviation fuel (SAF); and $EI_{idle,FF}$ is the nvPM emissions index in mg/kg of the gas turbine engine when operating at around 7% available thrust for the same given operating conditions at which $EI_{idle,SAF}$ is calculated and if a fuel provided to the plurality of fuel spray nozzles is a fossil-based hydrocarbon fuel; and wherein the idle nvPM emissions index ratio of the gas turbine engine may be less than 1.

The idle nvPM emissions index ratio may be greater than zero.

The idle nvPM emissions index ratio may be less than or equal to 0.8, and preferably may be less than or equal to 0.5, and more preferably may be less than or equal to 0.2.

The idle nvPM emissions index ratio may be less than or equal to 0.115, and preferably may be less than or equal to 0.106, and more preferably may be less than or equal to 0.0959.

The idle nvPM emissions index ratio may be greater than or equal to 0.02, and preferably may be greater than or equal to 0.04, and more preferably may be greater than or equal to 0.06.

The idle nvPM emissions index ratio may be greater than or equal to 0.0766, and preferably may be greater than or equal to 0.0862, and more preferably may be greater than or equal to 0.0958.

The idle nvPM emissions index ratio may be in the range of 0.0766 to 0.115, and preferably may be in the range of 0.0862 to 0.106, and more preferably may be in the range of 0.0958 to 0.0959.

The idle nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

The idle nvPM emissions index ratio may be 0.08, 0.09, 0.1, 0.11, 0.12, 0.13, 0.14, 0.15, 0.16, 0.17, 0.18, 0.19, 0.2 or within any range defined between any two of these values.

According to an eighteenth aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a climb nvPM emissions index ratio may be defined as:

$$\frac{EI_{climb,SAF}}{EI_{climb,FF}}$$

where:

$EI_{climb,SAF}$ is the nvPM emissions index in mg/kg of the gas turbine engine when operating at around 85% available thrust for given operating conditions, if a fuel provided to the plurality of fuel spray nozzles comprises a sustainable aviation fuel (SAF); and $EI_{climb,FF}$ is the nvPM emissions index in mg/kg of the gas turbine engine when operating at around 85% available thrust for the same given operating conditions at which $EI_{climb,SAF}$ is calculated and if a fuel provided to the plurality of fuel spray nozzles is a fossil-based hydrocarbon fuel;

the climb nvPM emissions index ratio of the gas turbine engine is less than 1; and the gas turbine engine is configured to provide fuel comprising a SAF to the plurality of fuel spray nozzles.

The climb nvPM emissions index ratio may be as defined in connection with the seventeenth aspect.

According to a nineteenth aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

an approach nvPM emissions index ratio may be defined as:

$$\frac{EI_{approach,SAF}}{EI_{approach,FF}}$$

where:

$EI_{approach,SAF}$ is the nvPM emissions index in mg/kg of the gas turbine engine when operating at around 30% available thrust for given operating conditions if a fuel provided to the plurality of fuel spray nozzles comprises a sustainable aviation fuel (SAF); and $EI_{approach,FF}$ is the nvPM emissions index in mg/kg of the gas turbine engine when operating at around 30% available thrust for the same given operating conditions at which $EI_{approach,SAF}$ is calculated and if a fuel provided to the plurality of fuel spray nozzles is a fossil-based hydrocarbon fuel;

the approach nvPM emissions index ratio of the gas turbine engine is less than 1; and the gas turbine engine is configured to provide fuel comprising a SAF to the plurality of fuel spray nozzles.

The approach nvPM emissions index ratio may be as defined above in connection with the seventeenth aspect.

According to a twentieth aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

an idle nvPM emissions index ratio may be defined as:

$$\frac{EI_{idle,SAF}}{EI_{idle,FF}}$$

where:

$EI_{idle,SAF}$ is the nvPM emissions index in mg/kg of the gas turbine engine when operating at around 7% available thrust for given operating conditions, and if a fuel provided to the plurality of fuel spray nozzles comprises a sustainable aviation fuel (SAF); and $EI_{idle,FF}$ is the nvPM emissions index in mg/kg of the gas turbine engine when operating at around 7% available thrust for the same given operating conditions at which $EI_{idle,SAF}$ is calculated and if a fuel provided to the plurality of fuel spray nozzles is a fossil-based hydrocarbon fuel;

the idle nvPM emissions index ratio of the gas turbine engine is less than 1; and the gas turbine engine is configured to provide fuel comprising a SAF to the plurality of fuel spray nozzles.

The idle nvPM emissions index ratio may be as defined above in connection with the seventeenth aspect.

According to a twenty first aspect, there is provided a method of operating the gas turbine engine of any of the seventeenth, eighteenth, nineteenth or twentieth aspects, the method comprising providing fuel comprising a sustainable aviation fuel to the plurality of fuel spray nozzles.

According to a twenty second aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a MTO nvPM emissions index ratio may be defined as:

$$\frac{EI_{maxTO,SAF}}{EI_{maxTO,FF}}$$

where:

$EI_{maxTO,SAF}$ is the nvPM emissions index in mg/kg of the gas turbine engine when operating at 100% available thrust for given operating conditions if a fuel provided to the plurality of fuel spray nozzles comprises a sustainable aviation fuel (SAF); and $EI_{maxTO,FF}$ is the nvPM emissions index in mg/kg of the gas turbine engine when operating at 100% available thrust for the given operating conditions if a fuel provided to the plurality of fuel spray nozzles is a fossil-based hydrocarbon fuel;

the MTO nvPM emissions index ratio of the gas turbine engine is less than 1; and the method comprises providing fuel comprising a sustainable aviation fuel to the plurality of fuel spray nozzles.

The MTO nvPM emissions index ratio may be as defined in connection with the seventeenth aspect.

A climb nvPM emissions index ratio may be defined as:

$$\frac{EI_{climb,SAF}}{EI_{climb,FF}}$$

where:

$EI_{climb,SAF}$ is the nvPM emissions index in mg/kg of the gas turbine engine when operating at around 85% available thrust for the given operating conditions, or for different given operating conditions, if a fuel provided to the plurality of fuel spray nozzles comprises a sustainable aviation fuel (SAF); and $EI_{climb,FF}$ is the nvPM emissions index in mg/kg of the gas turbine engine when operating at around 85% available thrust for the same given operating conditions at which $EI_{climb,SAF}$ is determined and if a fuel provided to the plurality of fuel spray nozzles is a fossil-based hydrocarbon fuel; and wherein the climb nvPM emissions index ratio of the gas turbine engine may be less than 1.

The climb nvPM emissions index ratio may be as defined in connection with the seventeenth aspect.

An approach nvPM emissions index ratio may be defined as:

$$\frac{EI_{approach,SAF}}{EI_{approach,FF}}$$

where:

$EI_{approach,SAF}$ is the nvPM emissions index in mg/kg of the gas turbine engine when operating at around 30% available thrust for the given operating conditions, or for different given operating conditions, if a fuel provided to the plurality of fuel spray nozzles comprises a sustainable aviation fuel (SAF); and $EI_{approach,FF}$ is the nvPM emissions index in mg/kg of the gas turbine engine when operating at around 30% available thrust for the same given operating conditions at which $EI_{approach,SAF}$ is determined and if a fuel provided to the plurality of fuel spray nozzles is a fossil-based hydrocarbon fuel; and wherein the approach nvPM emissions index ratio of the gas turbine engine may be less than 1.

The approach nvPM emissions index ratio may be as defined in connection with the seventeenth aspect.

An idle nvPM emissions index ratio may be defined as:

$$\frac{EI_{idle,SAF}}{EI_{idle,FF}}$$

where:

$EI_{idle,SAF}$ is the nvPM emissions index in mg/kg of the gas turbine engine when operating at around 7% available thrust for the given operating conditions, or for different given operating conditions, and if a fuel provided to the plurality of fuel spray nozzles comprises a sustainable aviation fuel (SAF); and $EI_{idle,FF}$ is the nvPM emissions index in mg/kg of the gas turbine engine when operating at around 7% available thrust for the same given operating conditions at which $EI_{idle,SAF}$ is determined and if a fuel provided to the plurality of fuel spray nozzles is a fossil-based hydrocarbon fuel; and wherein the idle nvPM emissions index ratio of the gas turbine engine may be less than 1.

The idle nvPM emissions index ratio may be as defined in connection with the seventeenth aspect.

According to a twenty-third aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a climb nvPM emissions index ratio may be defined as:

$$\frac{EI_{climb,SAF}}{EI_{climb,FF}}$$

where:

$EI_{climb,SAF}$ is the nvPM emissions index in mg/kg of the gas turbine engine when operating at around 85% available thrust for given operating conditions if a fuel provided to the plurality of fuel spray nozzles comprises a sustainable aviation fuel (SAF); and $EI_{climb,FF}$ is the nvPM emissions index in mg/kg of the gas turbine engine when operating at around 85% available thrust for the same given operating conditions at which $EI_{climb,SAF}$ is determined and if a fuel provided to the plurality of fuel spray nozzles is a fossil-based hydrocarbon fuel;

the climb nvPM emissions index ratio of the gas turbine engine may be less than 1; and the method comprises providing fuel comprising a sustainable aviation fuel to the plurality of fuel spray nozzles.

The climb nvPM emissions index ratio may be as defined in connection with the seventeenth aspect.

According to a twenty-fourth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

an approach nvPM emissions index ratio may be defined as:

$$\frac{EI_{approach,SAF}}{EI_{approach,FF}}$$

where:

$EI_{approach,SAF}$ is the nvPM emissions index in mg/kg of the gas turbine engine when operating at around 30% available thrust for given operating conditions if a fuel provided to the plurality of fuel spray nozzles comprises a sustainable aviation fuel (SAF); and $EI_{approach,FF}$ is the nvPM emissions index in mg/kg of the gas turbine engine when operating at around 30% available thrust for the same given operating conditions at which $EI_{approach,SAF}$ is determined and if a fuel provided to the plurality of fuel spray nozzles is a fossil-based hydrocarbon fuel; and the approach nvPM emissions index ratio of the gas turbine engine may be less than 1; and the method comprises providing fuel comprising a sustainable aviation fuel to the plurality of fuel spray nozzles.

The approach nvPM emissions index ratio may be as defined in connection with the seventeenth aspect.

According to a twenty fifth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

an idle nvPM emissions index ratio may be defined as:

$$\frac{EI_{idle,SAF}}{EI_{idle,FF}}$$

where:

$EI_{idle,SAF}$ is the nvPM emissions index in mg/kg of the gas turbine engine when operating at around 7% available thrust for given operating conditions, and if a fuel provided to the plurality of fuel spray nozzles comprises a sustainable aviation fuel (SAF); and $EI_{idle,FF}$ is the nvPM emissions index in mg/kg of the gas turbine engine when operating at around 7% available thrust for the same given operating conditions at which $EI_{idle,SAF}$ is determined and if a fuel provided to the plurality of fuel spray nozzles is a fossil-based hydrocarbon fuel; and the idle nvPM emissions index ratio of the gas turbine engine may be less than 1; and the method comprises providing fuel comprising a sustainable aviation fuel to the plurality of fuel spray nozzles.

The idle nvPM emissions index ratio may be as defined in connection with the seventeenth aspect.

According to a twenty-sixth aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

an MTO nvPM emissions index ratio-modified fuel flow may be defined as:

$$\frac{EI_{maxTO,SAF}}{EI_{maxTO,FF}} \times W_{f,maxTO}$$

where:

$EI_{maxTO,SAF}$ is the nvPM emissions index in mg/kg of the gas turbine engine when operating at around 100% available thrust for given operating conditions if a fuel provided to the plurality of fuel spray nozzles comprises a sustainable aviation fuel (SAF);

$EI_{maxTO,FF}$ is the nvPM emissions index in mg/kg of the gas turbine engine when operating at around 100% available thrust for the given operating conditions if a fuel provided to the plurality of fuel spray nozzles is a fossil-based hydrocarbon fuel; and $W_{f,maxTO}$ is the mass flow rate of fuel provided to the plurality of fuel spray nozzles in kg/s when the gas turbine engine is operating at around 100% available thrust for the given operating conditions;

the MTO nvPM emissions index ratio-modified fuel flow of the gas turbine engine in kg/s is less than 2; and the gas turbine engine is configured to provide fuel comprising a SAF to the plurality of fuel spray nozzles.

The MTO nvPM emissions index ratio-modified fuel flow in kg/s may be greater than zero.

The MTO nvPM emissions index ratio-modified fuel flow in kg/s may be less than 1.29, more preferably may be less than 1.19 and yet even more preferably may be less than 1.08.

The MTO nvPM emissions index ratio-modified fuel flow in kg/s may be greater than or equal to 0.384, and preferably may be greater than or equal to 0.432 and further preferably may be greater than or equal to 0.481.

The MTO nvPM emissions index ratio-modified fuel flow in kg/s may be less than or equal to 0.834, more preferably may be less than or equal to 0.764 and further preferably may be less than or equal to 0.695.

The MTO nvPM emissions index ratio-modified fuel flow in kg/s may be the range 0.384 to 0.834, and preferably may be in the range 0.432 to 0.764 and further preferably may be in the range 0.481 to 0.695.

The MTO nvPM emissions index ratio-modified fuel flow in kg/s may be greater than or equal to 0.453, and preferably may be greater than or equal to 0.509 and further preferably may be greater than or equal to 0.566.

The MTO nvPM emissions index ratio-modified fuel flow in kg/s may be in the range 0.453 to 0.834, and preferably may be in the range 0.509 to 0.764 and further preferably may be in the range 0.566 to 0.695.

The MTO nvPM emissions index ratio-modified fuel flow in kg/s may be 0.38, 0.384, 0.4, 0.42, 0.44, 0.46, 0.48, 0.5, 0.52, 0.54, 0.56, 0.58, 0.6, 0.62, 0.64, 0.66, 0.68, 0.7, 0.72, 0.74, 0.76, 0.78, 0.8, 0.82, 0.83, 0.834, or within any range defined between any two of these values.

$W_{f,maxTO}$ may be in the range of 0.595 to 1.29 kg/s, and preferably may be in the range of 0.670 to 1.19 kg/s, and more preferably may be in the range of 0.744 to 1.08 kg/s.

$W_{f,maxTO}$ may be in the range of 0.595 to 1.28 kg/s, and preferably may be in the range of 0.670 to 1.17 kg/s, and more preferably may be in the range of 0.744 to 1.07 kg/s.

$W_{f,maxTO}$ may be in the range of 0.701 to 1.29 kg/s, and preferably may be in the range of 0.788 to 1.19 kg/s, and more preferably may be in the range of 0.876 to 1.08 kg/s.

A climb nvPM emissions index ratio-modified fuel flow may be defined as:

$$\frac{EI_{climb,SAF}}{EI_{climb,FF}} \times W_{f,climb}$$

where:

$EI_{climb,SAF}$ is the nvPM emissions index in mg/kg of the gas turbine engine when operating at around 85% available thrust for the given operating conditions, or for other different operating conditions, if a fuel provided to the plurality of fuel spray nozzles comprises a sustainable aviation fuel; and $EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel; and $W_{f,climb}$ is the mass flow rate of fuel provided to the plurality of fuel spray nozzles in kg/s when the gas turbine engine is operating at around 85% available thrust for the same operating conditions at which $EI_{climb,SAF}$ and $EI_{climb,FF}$ are calculated; and wherein the climb nvPM emissions index ratio-modified fuel flow of the gas turbine engine in kg/s may be less than 2.

The climb nvPM emissions index ratio-modified fuel flow in kg/s may be greater than zero.

The climb nvPM emissions index ratio-modified fuel flow in kg/s may be less than 1.05, more preferably may be less than 0.96 and yet even more preferably may be less than 0.873.

The climb nvPM emissions index ratio-modified fuel flow in kg/s may be greater than or equal to 0.234, and preferably may be greater than or equal to 0.263 and further preferably may be greater than or equal to 0.292.

The climb nvPM emissions index ratio-modified fuel flow in kg/s may be less than or equal to 0.498, more preferably may be less than or equal to 0.456 and further preferably may be less than or equal to 0.415.

The climb nvPM emissions index ratio-modified fuel flow in kg/s may be in the range 0.234 to 0.498, and preferably may be in the range 0.263 to 0.456 and further preferably may be in the range 0.292 to 0.415.

The climb nvPM emissions index ratio-modified fuel flow in kg/s may be less than or equal to 0.496, and preferably may be less than or equal to 0.455 and further preferably may be less than or equal to 0.413.

The climb nvPM emissions index ratio-modified fuel flow in kg/s may be in the range 0.234 to 0.496, and preferably may be in the range 0.263 to 0.455 and further preferably may be in the range 0.292 to 0.413.

The climb nvPM emissions index ratio-modified fuel flow in kg/s may be greater than or equal to 0.274, and preferably may be greater than or equal to 0.308 and further preferably may be greater than or equal to 0.342.

The climb nvPM emissions index ratio-modified fuel flow in kg/s may be less than or equal to 0.498, and preferably may be less than or equal to 0.456 and further preferably may be less than or equal to 0.415.

The climb nvPM emissions index ratio-modified fuel flow in kg/s may be in the range 0.274 to 0.498, and preferably may be in the range 0.308 to 0.456 and further preferably may be in the range 0.342 to 0.415.

The climb nvPM emissions index ratio-modified fuel flow may be less than or equal to 0.23, 0.234, 0.24, 0.26, 0.28, 0.3, 0.32, 0.34, 0.36, 0.38, 0.4, 0.42, 0.44, 0.46, 0.48, 0.498, 0.5, or any range defined between any two of these values.

$W_{f,climb}$ may be in the range of 0.492 to 1.05 kg/s, and preferably may be in the range of 0.554 to 0.960 kg/s, and more preferably may be in the range of 0.616 to 0.873 kg/s.

$W_{f,climb}$ may be in the range of 0.492 to 1.05 kg/s, and preferably may be in the range of 0.554 to 0.957 kg/s, and more preferably may be in the range of 0.616 to 0.870 kg/s.

$W_{f,climb}$ may be in the range of 0.577 to 1.05 kg/s, and preferably may be in the range of 0.649 to 0.960 kg/s, and more preferably may be in the range of 0.721 to 0.873 kg/s.

An approach nvPM emissions index ratio-modified fuel flow may be defined as:

$$\frac{EI_{approach,SAF}}{EI_{approach,FF}} \times W_{f,approach}$$

where:

$EI_{approach,SAF}$ is the nvPM emissions index in mg/kg of the gas turbine engine when operating at around 30% available thrust for the given operating conditions, or for other different operating conditions, if a fuel provided to the plurality of fuel spray nozzles comprises a sustainable aviation fuel; and $EI_{approach,FF}$ is the nvPM emissions index in mg/kg of the gas turbine engine when operating at around 30% available thrust for the same operating conditions at which $EI_{approach,SAF}$ is calculated if a fuel provided to the plurality of fuel spray nozzles is a fossil-based hydrocarbon fuel; and $W_{f,approach}$ is the mass flow rate of fuel provided to the plurality of fuel spray nozzles in kg/s when the gas turbine engine is operating at around 30% available thrust for the same operating conditions at which $EI_{approach,SAF}$ and $EI_{approach,FF}$ are calculated; and wherein the approach nvPM emissions index ratio-modified fuel flow of the gas turbine engine in kg/s may be less than 0.4.

The approach nvPM emissions index ratio-modified fuel flow in kg/s may be greater than zero.

The approach nvPM emissions index ratio-modified fuel flow in kg/s may be less than 0.343, more preferably may be less than 0.314 and yet even more preferably may be less than 0.286.

The approach nvPM emissions index ratio-modified fuel flow in kg/s may be greater than or equal to 0.0269, and preferably may be greater than or equal to 0.0302 and further preferably may be greater than or equal to 0.0336.

The approach nvPM emissions index ratio-modified fuel flow in kg/s may be less than or equal to 0.0526, more preferably may be less than or equal to 0.0482 and further preferably may be less than or equal to 0.0439.

The approach nvPM emissions index ratio-modified fuel flow in kg/s may be in the range 0.0269 to 0.0526, and preferably may be in the range 0.0302 to 0.0482 and further preferably may be in the range 0.0336 to 0.0439.

The approach nvPM emissions index ratio-modified fuel flow in kg/s may be less than or equal to 0.0524, and preferably may be less than or equal to 0.0480 and further preferably may be less than or equal to 0.0437.

The approach nvPM emissions index ratio-modified fuel flow in kg/s may be in the range 0.0269 to 0.0524, and preferably may be in the range 0.0302 to 0.0480 and further preferably may be in the range 0.0336 to 0.0437.

The approach nvPM emissions index ratio-modified fuel flow in kg/s may be greater than or equal to 0.0301, and preferably may be greater than or equal to 0.0339 and further preferably may be greater than or equal to 0.0376.

The approach nvPM emissions index ratio-modified fuel flow in kg/s may be less than or equal to 0.0526, and preferably may be less than or equal to 0.0482 and further preferably may be less than or equal to 0.0439.

The approach nvPM emissions index ratio-modified fuel flow in kg/s may be in the range 0.0301 to 0.0526, and preferably may be in the range 0.0339 to 0.0482 and further preferably may be in the range 0.0376 to 0.0439.

The approach nvPM emissions index ratio-modified fuel flow in kg/s may be 0.026, 0.0269, 0.028, 0.03, 0.032, 0.034, 0.036, 0.038, 0.04, 0.042, 0.044, 0.046, 0.048, 0.05, 0.052, 0.0526, 0.053, or any range defined between any two of these values.

$W_{f,approach}$ may be in the range of 0.175 to 0.343 kg/s, and preferably may be in the range of 0.197 to 0.314 kg/s, and more preferably may be in the range of 0.219 to 0.286 kg/s.

$W_{f,approach}$ may be in the range of 0.175 to 0.341 kg/s, and preferably may be in the range of 0.197 to 0.313 kg/s, and more preferably may be in the range of 0.219 to 0.284 kg/s.

$W_{f,approach}$ may be in the range of 0.196 to 0.343 kg/s, and preferably may be in the range of 0.220 to 0.314 kg/s, and more preferably in the range of 0.245 to 0.286 kg/s.

An idle nvPM emissions index ratio-modified fuel flow may be defined as:

$$\frac{EI_{idle,SAF}}{EI_{idle,FF}} \times W_{f,idle}$$

where:

$EI_{idle,SAF}$ is the nvPM emissions index in mg/kg of the gas turbine engine when operating at around 7% available thrust for the given operating conditions, or for other different operating conditions, if a fuel provided to the plurality of fuel spray nozzles comprises a sustainable aviation fuel; and $EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel; and $W_{f,idle}$ is the mass flow rate of fuel provided to the plurality of fuel spray nozzles in kg/s when the gas turbine engine is operating at around 7% available thrust for the same operating conditions at which $EI_{idle,SAF}$ and $EI_{idle,FF}$ are calculated; and wherein the idle nvPM emissions index ratio-modified fuel flow of the gas turbine engine in kg/s may be less than 0.2.

The idle nvPM emissions index ratio-modified fuel flow in kg/s may be greater than zero.

The idle nvPM emissions index ratio-modified fuel flow in kg/s may be less than 0.118, and more preferably may be less than 0.108 and yet even more preferably may be less than 0.0981.

The idle nvPM emissions index ratio-modified fuel flow in kg/s may be greater than or equal to 0.00666, and preferably may be greater than or equal to 0.00749 and further preferably may be greater than or equal to 0.00833.

The idle nvPM emissions index ratio-modified fuel flow in kg/s may be less than or equal to 0.0113, and more preferably may be less than or equal to 0.0104 and further preferably may be less than or equal to 0.0094.

The idle nvPM emissions index ratio-modified fuel flow in kg/s may be in the range 0.00666 to 0.0113, and preferably may be in the range 0.00749 to 0.0104 and further preferably may be in the range 0.00833 to 0.0094.

The idle nvPM emissions index ratio-modified fuel flow in kg/s may be greater than or equal to 0.00682, and preferably may be greater than or equal to 0.00767 and further preferably may be greater than or equal to 0.00853.

The idle nvPM emissions index ratio-modified fuel flow in kg/s may be less than or equal to 0.0112, and preferably may be less than or equal to 0.0103 and further preferably may be less than or equal to 0.00929.

The idle nvPM emissions index ratio-modified fuel flow in kg/s may be in the range 0.00682 to 0.0112, and preferably may be in the range 0.00767 to 0.0103 and further preferably may be in the range 0.00853 to 0.00929.

The idle nvPM emissions index ratio-modified fuel flow in kg/s may be 0.0065, 0.00666, 0.007, 0.0075, 0.008, 0.0085, 0.009, 0.0095, 0.01, 0.0113, 0.015, or any range defined between any two of these values.

$W_{f,idle}$ may be in the range of 0.0695 to 0.118 kg/s, and preferably may be in the range of 0.0782 to 0.108 kg/s, and more preferably may be in the range of 0.0869 to 0.0981 kg/s.

$W_{f,idle}$ may be in the range of 0.0712 to 0.117 kg/s, and preferably may be in the range of 0.0801 to 0.107 kg/s, and more preferably may be in the range of 0.0890 to 0.0970 kg/s.

According to a twenty-seventh aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a climb nvPM emissions index ratio-modified fuel flow may be defined as:

$$\frac{EI_{climb,SAF}}{EI_{climb,FF}} \times W_{f,climb}$$

where:

$EI_{climb,SAF}$ is the nvPM emissions index in mg/kg of the gas turbine engine when operating at around 85% available thrust for given operating conditions and if a fuel provided to the plurality of fuel spray nozzles comprises a sustainable aviation fuel; and $EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel; and $W_{f,climb}$ is the mass flow rate of fuel provided to the plurality of fuel spray nozzles in kg/s when the gas turbine engine is operating at around 85% available thrust for the same operating conditions at which $EI_{climb,SAF}$ and $EI_{climb,FF}$ are calculated;

the climb nvPM emissions index ratio-modified fuel flow of the gas turbine engine is kg/s is less than 2; and the gas turbine engine is configured to provide fuel comprising a SAF to the plurality of fuel spray nozzles.

The climb nvPM emissions index ratio modified fuel flow and/or $W_{f,climb}$ may be as defined above in connection with the twenty-sixth aspect.

According to a twenty-eighth aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

an approach nvPM emissions index ratio-modified fuel flow may be defined as:

$$\frac{EI_{approach,SAF}}{EI_{approach,FF}} \times W_{f,approach}$$

where:

$EI_{approach,SAF}$ is the nvPM emissions index in mg/kg of the gas turbine engine when operating at around 30% available thrust for the given operating conditions, or for other different operating conditions, if a fuel provided to the plurality of fuel spray nozzles comprises a sustainable aviation fuel; and $EI_{approach,FF}$ is the nvPM emissions index in mg/kg of the gas turbine engine when operating at around 30% available thrust for the same operating conditions at which $EI_{approach,SAF}$ is calculated if a fuel provided to the plurality of fuel spray nozzles is a fossil-based hydrocarbon fuel; and $W_{f,approach}$ is the mass flow rate of fuel provided to the plurality of fuel spray nozzles in kg/s when the gas turbine engine is operating at around 30% available thrust for the same operating conditions at which $EI_{approach,SAF}$ and $EI_{approach,FF}$ are calculated; and wherein the approach nvPM emissions index ratio-modified fuel flow of the gas turbine engine in kg/s is less than 0.4; and the gas turbine engine is configured to provide fuel comprising a SAF to the plurality of fuel spray nozzles.

The approach nvPM emissions index ratio modified fuel flow and/or $W_{f,approach}$ may be as defined above in connection with the twenty sixth aspect.

According to a twenty-ninth aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

an idle nvPM emissions index ratio-modified fuel flow may be defined as:

$$\frac{EI_{idle,SAF}}{EI_{idle,FF}} \times W_{f,idle}$$

where:

$EI_{idle,SAF}$ is the nvPM emissions index in mg/kg of the gas turbine engine when operating at around 7% available thrust for given operating conditions and if a fuel provided to the plurality of fuel spray nozzles comprises a sustainable aviation fuel; and $EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel; and $W_{f,idle}$ is the mass flow rate of fuel provided to the plurality of fuel spray nozzles in kg/s when the gas turbine engine is operating at around 7% available thrust for the same operating conditions at which $EI_{idle,SAF}$ and $EI_{idle,FF}$ are calculated;

the idle nvPM emissions index ratio-modified fuel flow of the gas turbine engine in kg/s is less than 0.2; and the gas turbine engine is configured to provide fuel comprising a SAF to the plurality of fuel spray nozzles.

The idle nvPM emissions index ratio modified fuel flow and/or $W_{f,idle}$ may be as defined above in connection with the twenty sixth aspect.

According to a thirtieth aspect, there is provided a method of operating the gas turbine engine of the twenty-sixth, twenty-seventh, twenty-eight or twenty-ninth aspect, the method comprising providing fuel comprising a sustainable aviation fuel to the plurality of fuel spray nozzles.

According to a thirty-first aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

an MTO nvPM emissions index ratio-modified fuel flow may be defined as:

$$\frac{EI_{maxTO,SAF}}{EI_{maxTO,FF}} \times W_{f,maxTO}$$

where:

$EI_{maxTO,SAF}$ is the nvPM emissions index in mg/kg of the gas turbine engine when operating at around 100% available thrust for given operating conditions if a fuel provided to the plurality of fuel spray nozzles comprises a sustainable aviation fuel (SAF);

$EI_{maxTO,FF}$ is the nvPM emissions index in mg/kg of the gas turbine engine when operating at around 100% available thrust for the given operating conditions if a fuel provided to the plurality of fuel spray nozzles is a fossil-based hydrocarbon fuel; and $W_{f,maxTO}$ is the mass flow rate of fuel provided to the plurality of fuel spray nozzles in kg/s when the gas turbine engine is operating at around 100% available thrust for the given operating conditions;

the MTO nvPM emissions index ratio-modified fuel flow in kg/s is less than 2; and the method comprises providing fuel comprising a sustainable aviation fuel (SAF) to the plurality of fuel spray nozzles.

The MTO nvPM emissions index ratio modified fuel flow and/or $W_{f,maxTO}$ may be as defined above in connection with the twenty-sixth aspect.

A climb nvPM emissions index ratio-modified fuel flow may be defined as:

$$\frac{EI_{climb,SAF}}{EI_{climb,FF}} \times W_{f,climb}$$

where:

$EI_{climb,SAF}$ is the nvPM emissions index in mg/kg of the gas turbine engine when operating at around 85% available thrust for the given operating conditions, or for other different operating conditions, if a fuel provided to the plurality of fuel spray nozzles comprises a sustainable aviation fuel; and $EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel; and $W_{f,climb}$ is the mass flow rate of fuel provided to the plurality of fuel spray nozzles in kg/s when the gas turbine engine is operating at around 85% available thrust for the same operating conditions at which $EI_{climb,SAF}$ and $EI_{climb,FF}$ are calculated; and wherein the climb nvPM emissions index ratio-modified fuel flow of the gas turbine engine in kg/s may be less than 2.

The climb nvPM emissions index ratio modified fuel flow and/or $W_{f,climb}$ may be as defined above in connection with the twenty-sixth aspect.

An approach nvPM emissions index ratio-modified fuel flow may be defined as:

$$\frac{EI_{approach,SAF}}{EI_{approach,FF}} \times W_{f,approach}$$

where:

$EI_{approach,SAF}$ is the nvPM emissions index in mg/kg of the gas turbine engine when operating at around 30% available thrust for the given operating conditions, or for other different operating conditions, if a fuel provided to the plurality of fuel spray nozzles comprises a sustainable aviation fuel; and $EI_{approach,FF}$ is the nvPM emissions index in mg/kg of the gas turbine engine when operating at around 30% available thrust for the same operating conditions at which $EI_{approach,SAF}$ is calculated if a fuel provided to the plurality of fuel spray nozzles is a fossil-based hydrocarbon fuel; and $W_{f,approach}$ is the mass flow rate of fuel provided to the plurality of fuel spray nozzles in kg/s when the gas turbine engine is operating at around 30% available thrust for the same operating conditions at which $EI_{approach,SAF}$ and $EI_{approach,FF}$ are calculated; and wherein the approach nvPM emissions index ratio-modified fuel flow of the gas turbine engine in kg/s may be less than 0.4.

The approach nvPM emissions index ratio modified fuel flow and/or $W_{f,approach}$ may be as defined above in connection with the twenty-sixth aspect.

An idle nvPM emissions index ratio-modified fuel flow may be defined as:

$$\frac{EI_{idle,SAF}}{EI_{idle,FF}} \times W_{f,idle}$$

where:

$EI_{idle,SAF}$ is the nvPM emissions index in mg/kg of the gas turbine engine when operating at around 7% available thrust for the given operating conditions, or for other different operating conditions, if a fuel provided to the plurality of fuel spray nozzles comprises a sustainable aviation fuel; and $EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel; and $W_{f,idle}$ is the mass flow rate of fuel provided to the plurality of fuel spray nozzles in kg/s when the gas turbine engine is operating at around 7% available thrust for the same operating conditions at which $EI_{idle,SAF}$ and $EI_{idle,FF}$ are calculated; and wherein the idle nvPM emissions index ratio-modified fuel flow of the gas turbine engine in kg/s may be less than 0.2.

The idle nvPM emissions index ratio modified fuel flow and/or $W_{f,idleTO}$ may be as defined above in connection with the twenty-sixth aspect.

According to a thirty-second aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a climb nvPM emissions index ratio-modified fuel flow may be defined as:

$$\frac{EI_{climb,SAF}}{EI_{climb,FF}} \times W_{f,climb}$$

where:

$EI_{climb,SAF}$ is the nvPM emissions index in mg/kg of the gas turbine engine when operating at around 85% available thrust for given operating conditions and if a fuel provided to the plurality of fuel spray nozzles comprises a sustainable aviation fuel; and $EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel; and $W_{f,climb}$ is the mass flow rate of fuel provided to the plurality of fuel spray nozzles in kg/s when the gas turbine engine is operating at around 85% available thrust for the same operating conditions at which $EI_{climb,SAF}$ and $EI_{climb,FF}$ are calculated;

the climb nvPM emissions index ratio-modified fuel flow of the gas turbine engine in kg/s is less than 2; and the method comprises providing fuel comprising a sustainable aviation fuel (SAF) to the plurality of fuel spray nozzles.

The climb nvPM emissions index ratio modified fuel flow and/or $W_{f,climb}$ may be as defined above in connection with the twenty-sixth aspect.

According to a thirty-third aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

an approach nvPM emissions index ratio-modified fuel flow may be defined as:

$$\frac{EI_{approach,SAF}}{EI_{approach,FF}} \times W_{f,approach}$$

where:

$EI_{approach,SAF}$ is the nvPM emissions index in mg/kg of the gas turbine engine when operating at around 30% available thrust for given operating conditions, or for other different operating conditions, if a fuel provided to the plurality of fuel spray nozzles comprises a sustainable aviation fuel; and $EI_{approach,FF}$ is the nvPM emissions index in mg/kg of the gas turbine engine when operating at around 30% available thrust for the same operating conditions at which $EI_{approach,SAF}$ is calculated if a fuel provided to the plurality of fuel spray nozzles is a fossil-based hydrocarbon fuel; and $W_{f,approach}$ is the mass flow rate of fuel provided to the plurality of fuel spray nozzles in kg/s when the gas turbine engine is operating at around 30% available thrust for the same operating conditions at which $EI_{approach,SAF}$ and $EI_{approach,FF}$ are calculated;

the approach nvPM emissions index ratio-modified fuel flow of the gas turbine engine in kg/s is less than 0.4; and the method comprises providing fuel comprising a sustainable aviation fuel (SAF) to the plurality of fuel spray nozzles.

The approach nvPM emissions index ratio modified fuel flow and/or $W_{f,approach}$ may be as defined above in connection with the twenty-sixth aspect.

According to a thirty-fourth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

an idle nvPM emissions index ratio-modified fuel flow may be defined as:

$$\frac{EI_{idle,SAF}}{EI_{idle,FF}} \times W_{f,idle}$$

where:

$EI_{idle,SAF}$ is the nvPM emissions index in mg/kg of the gas turbine engine when operating at around 7% available thrust for given operating conditions and if a fuel provided to the plurality of fuel spray nozzles comprises a sustainable aviation fuel; and $EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel; and $W_{f,idle}$ is the mass flow rate of fuel provided to the plurality of fuel spray nozzles in kg/s when the gas turbine engine is operating at around 7% available thrust for the same operating conditions at which $EI_{idle,SAF}$ and $EI_{idle,FF}$ are calculated;

the idle nvPM emissions index ratio-modified fuel flow of the gas turbine engine in kg/s is less than 0.2; and the method comprises providing fuel comprising a sustainable aviation fuel (SAF) to the plurality of fuel spray nozzles.

The idle nvPM emissions index ratio modified fuel flow and/or $W_{f,idle}$ may be as defined above in connection with the twenty-sixth aspect.

According to a thirty-fifth aspect, there is provided gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

a lean cruise nvPM emissions index ratio may be defined as:

$$\frac{EI_{cruise(lean),SAF}}{EI_{cruise(lean),FF}}$$

where:

$EI_{cruise(lean),SAF}$ may be defined as:

$$\frac{EI_{maxTO,SAF} + EI_{climb,SAF}}{2}$$

$EI_{cruise(lean),FF}$ may be defined as:

$$\frac{EI_{maxTO,FF} + EI_{climb,FF}}{2}$$

$EI_{maxTO,SAF}$ is the nvPM emissions index in mg/kg of the gas turbine engine when operating at around 100% available thrust for given operating conditions if a fuel provided to the plurality of fuel spray nozzles comprises a sustainable aviation fuel;

$EI_{climb,SAF}$ is the nvPM emissions index in mg/kg of the gas turbine engine when operating at around 85% available thrust for the given operating conditions if a fuel provided to the plurality of fuel spray nozzles comprises a sustainable aviation fuel;

$EI_{maxTO,FF}$ is the nvPM emissions index in mg/kg of the gas turbine engine when operating at around 100% available thrust for the given operating conditions if a fuel provided to the plurality of fuel spray nozzles is a fossil-based hydrocarbon fuel; and $EI_{climb,FF}$ is the nvPM emissions index in mg/kg of the gas turbine engine when operating at around 85% available thrust for the given operating conditions if a fuel provided to the plurality of fuel spray nozzles is a fossil-based hydrocarbon fuel;

the lean cruise nvPM emissions index ratio of the gas turbine engine is less than 1; and the gas turbine engine is configured to provide fuel comprising a sustainable aviation fuel (SAF) to the plurality of fuel spray nozzles.

The lean cruise nvPM emissions index ratio may be greater than zero.

The lean cruise nvPM emissions index ratio may be less than or equal to 0.9 and preferably less than or equal to 0.8.

The lean cruise nvPM emissions index ratio may be less than or equal to 0.732, and preferably may be less than or equal to 0.671 and further preferably may be less than or equal to 0.61.

The lean cruise nvPM emissions index ratio may be greater than or equal to 0.455, and preferably may be greater than or equal to 0.512 and further preferably may be greater than or equal to 0.569.

The lean cruise nvPM emissions index ratio may be in the range 0.455 to 0.732, and preferably may be in the range 0.512 to 0.671 and further preferably may be in the range 0.569 to 0.610.

The lean cruise nvPM emissions index ratio may be less than 1, 0.95, 0.9, 0.85, 0.8, 0.75, 0.70, 0.65, 0.6, 0.55, 0.5, 0.45, 0.4, 0.35, 0.3, 0.25, 0.2, 0.15, 0.1, or 0.05, or in any range defined between any two of these values.

The lean cruise nvPM emissions index ratio may be 0.45, 0.455, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.732, or within any range defined between any two of these values.

An idle-MTO nvPM emissions index ratio may be defined as:

$$\frac{EI_{idle,SAF}/EI_{maxTO,SAF}}{EI_{idle,FF}/EI_{maxTO,FF}}$$

where:

$EI_{idle,SAF}$ is the nvPM emissions index in mg/kg of the gas turbine engine when operating at around 7% available thrust for the given operating conditions, or for other different operating conditions, if a fuel provided to the plurality of fuel spray nozzles comprises a sustainable aviation fuel;

$EI_{maxTO,SAF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles comprises a sustainable aviation fuel;

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel; and $EI_{maxTO,FF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles is a fossil-based hydrocarbon fuel;

and wherein the idle-MTO nvPM emissions index ratio of the gas turbine engine may be less than 1.

The idle-MTO nvPM emissions index ratio may be greater than zero.

The idle-MTO nvPM emissions index ratio may be less than or equal to 0.8 and preferably may be less than or equal to 0.6, and even preferably may be less than or equal to 0.4 and yet even further preferably may be less than or equal to 0.2.

The idle-MTO nvPM emissions index ratio may be less than or equal to 0.178, and preferably may be less than or equal to 0.164 and further preferably may be less than or equal to 0.149.

The idle-MTO nvPM emissions index ratio may be greater than or equal to 0.118, and preferably may be greater than or equal to 0.133 and further preferably may be greater than or equal to 0.148.

The idle-MTO nvPM emissions index ratio may be in the range 0.118 to 0.178, and preferably may be in the range 0.133 to 0.164 and further preferably may be in the range 0.148 to 0.149.

The idle-MTO nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or in any range defined between any two of these values.

The idle-MTO nvPM emissions index ratio may be 0.118, 0.12, 0.125, 0.13, 0.135, 0.14, 0.145, 0.15, 0.155, 0.16, 0.165, 0.17, 0.175, 0.178, or within any range defined between any two of these values.

A lean cruise/MTO nvPM emissions index ratio may be defined as:

$$\frac{EI_{cruise(lean),SAF}/EI_{maxTO,SAF}}{EI_{cruise(lean),FF}/EI_{maxTO,FF}}$$

where:

$EI_{cruise(lean),SAF}$ may be defined as:

$$\frac{EI_{maxTO,SAF} + EI_{climb,SAF}}{2}$$

$EI_{cruise(lean),FF}$ may be defined as:

$$\frac{EI_{maxTO,FF} + EI_{climb,FF}}{2}$$

$EI_{maxTO,SAF}$ is the nvPM emissions index in mg/kg of the gas turbine engine when operating at around 100% available thrust for the given operating conditions, or for other different operating conditions, if a fuel provided to the plurality of fuel spray nozzles comprises a sustainable aviation fuel;

$EI_{climb,SAF}$ is the nvPM emissions index in mg/kg of the gas turbine engine when operating at around 85% available thrust for the same operating conditions at which $EI_{maxTO,SAF}$ is calculated if a fuel provided to the plurality of fuel spray nozzles comprises a sustainable aviation fuel;

$EI_{maxTO,FF}$ is the nvPM emissions index in mg/kg of the gas turbine engine when operating at around 100% available thrust for the same operating conditions at which $EI_{maxTO,SAF}$ is calculated if a fuel provided to the plurality of fuel spray nozzles is a fossil-based hydrocarbon fuel; and $EI_{climb,FF}$ is the nvPM emissions index in mg/kg of the gas turbine engine when operating at around 85% available thrust for the same operating conditions at which $EI_{maxTO,SAF}$ is calculated if a fuel provided to the plurality of fuel spray nozzles is a fossil-based hydrocarbon fuel;

and wherein the lean cruise/MTO nvPM emissions index ratio of the gas turbine engine may be less than 1.

The lean cruise/MTO nvPM emissions index ratio may be greater than zero.

The lean cruise/MTO nvPM emissions index ratio may be less than or equal to 0.98 and preferably may be less than or equal to 0.96.

The lean cruise/MTO nvPM emissions index ratio may be less than or equal to 0.95, and preferably may be less than or equal to 0.944.

The lean cruise/MTO nvPM emissions index ratio may be greater than or equal to 0.704, preferably greater than or equal to 0.792 and further preferably greater than or equal to 0.88.

The lean cruise/MTO nvPM emissions index ratio may be in the range 0.704 to 0.960, and preferably may be in the range 0.792 to 0.950 and further preferably may be in the range 0.880 to 0.944.

The lean cruise/MTO nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

The lean cruise/MTO nvPM emissions index ratio may be 0.7, 0.704, 0.725, 0.75, 0.775, 0.8, 0.825, 0.85, 0.875, 0.9, 0.925, 0.95, 0.96, or within any range defined between any two of these values.

An idle/lean cruise nvPM emissions index ratio may be defined as:

$$\frac{EI_{idle,SAF}/EI_{cruise(lean),SAF}}{EI_{idle,FF}/EI_{cruise(lean),FF}}$$

where:

$EI_{idle,SAF}$ is the nvPM emissions index in mg/kg of the gas turbine engine when operating at around 7% available thrust for the given operating conditions, or for other different operating conditions, if a fuel provided to the plurality of fuel spray nozzles comprises a sustainable aviation fuel;

$EI_{cruise(lean),SAF}$ may be defined as:

$$\frac{EI_{maxTO,SAF} + EI_{climb,SAF}}{2}$$

$EI_{maxTO,SAF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles comprises a sustainable aviation fuel;

$EI_{climb,SAF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles comprises a sustainable aviation fuel;

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel; $EI_{cruise(lean),FF}$ may be defined as:

$$\frac{EI_{maxTO,FF} + EI_{climb,FF}}{2}$$

$EI_{maxTO,FF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles is a fossil-based hydrocarbon fuel; and $EI_{climb,FF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles is a fossil-based hydrocarbon fuel; and wherein the idle/lean cruise nvPM emissions index ratio of the gas turbine engine may be less than 1.

The idle/lean cruise nvPM emissions index ratio may be greater than zero.

The idle/lean cruise nvPM emissions index ratio may be less than or equal to 0.8, preferably less than or equal to 0.6, even preferably less than or equal to 0.4, and even further preferably less than or equal to 0.3.

The idle/lean cruise nvPM emissions index ratio may be less than or equal to 0.203, and preferably may be less than or equal to 0.186 and further preferably may be less than or equal to 0.169.

The idle/lean cruise nvPM emissions index ratio may be greater than or equal to 0.125, and preferably may be greater than or equal to 0.141 and further preferably may be greater than or equal to 0.157.

The idle/lean cruise nvPM emissions index ratio may be in the range 0.125 to 0.203, and preferably may be in the range 0.141 to 0.186 and further preferably may be in the range 0.157 to 0.169.

The idle/lean cruise nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

The idle/lean cruise nvPM emissions index ratio may be 0.125, 0.13, 0.135, 0.14, 0.145, 0.15, 0.155, 0.16, 0.165, 0.17, 0.175, 0.18, 0.185, 0.19, 0.195, 0.2, 0.203 or within any range defined between any two of these values.

A rich cruise nvPM emissions index ratio may be defined as:

$$\frac{EI_{cruise(rich),SAF}}{EI_{cruise(rich),FF}}$$

where:
$EI_{cruise(rich),SAF}$ may be defined as:

$$\frac{EI_{climb,SAF} + EI_{approach,SAF}}{2}$$

$EI_{cruise(rich),FF}$ may be defined as:

$$\frac{EI_{climb,FF} + EI_{approach,FF}}{2}$$

$EI_{climb,SAF}$ is the nvPM emissions index in mg/kg of the gas turbine engine when operating at around 85% available thrust for the given operating conditions, or for other different operating conditions, if a fuel provided to the plurality of fuel spray nozzles comprises a sustainable aviation fuel;

$EI_{approach,SAF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel; and $EI_{approach,FF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles is a fossil-based hydrocarbon fuel;

and wherein the rich cruise nvPM emissions index ratio of the gas turbine engine may be less than 1.

The rich cruise nvPM emissions index ratio may be greater than zero.

The rich cruise nvPM emissions index ratio may be less than or equal to 0.8, and preferably may be less than or equal to 0.6, and even preferably may be less than or equal to 0.4.

The rich cruise nvPM emissions index ratio may be less than or equal to 0.303, and preferably may be less than or equal to 0.278 and further preferably may be less than or equal to 0.252.

The rich cruise nvPM emissions index ratio may be greater than or equal to 0.123, and preferably may be greater than or equal to 0.138 and further preferably may be greater than or equal to 0.154.

The rich cruise nvPM emissions index ratio may be in the range 0.123 to 0.303, and preferably may be the range 0.138 to 0.278 and further preferably may be in the range 0.154 to 0.252.

The rich cruise nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

The rich cruise nvPM emissions index ratio may be 0.12, 0.123, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.303 or within any range defined between any two of these values.

A rich cruise/MTO nvPM emissions index ratio may be defined as:

$$\frac{EI_{cruise(rich),SAF} / EI_{maxTO,SAF}}{EJ_{cruise(rich),FF} / EI_{maxTO,FF}}$$

where:
$EI_{cruise(rich),SAF}$ may be defined as:

$$\frac{EI_{climb,SAF} + EI_{approach,SAF}}{2}$$

43 and $EI_{cruise(rich),FF}$ may be defined as:

$$\frac{EI_{climb,FF} + EI_{approach,FF}}{2}$$

and where:

$EI_{climb,SAF}$ is the nvPM emissions index in mg/kg of the gas turbine engine when operating at around 85% available thrust for the given operating conditions, or for other different operating conditions, if a fuel provided to the plurality of fuel spray nozzles comprises a sustainable aviation fuel;

$EI_{approach,SAF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel;

$EI_{approach,FF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles is a fossil-based hydrocarbon fuel;

$EI_{maxTO,SAF}$ is the nvPM emissions index in mg/kg of the gas turbine engine when operating at around 100% available thrust for the same operating conditions at which $EI_{climb,SAF}$ is calculated if a fuel provided to the plurality of fuel spray nozzles comprises a sustainable aviation fuel; and $EI_{maxTO,FF}$ is the nvPM emissions index in mg/kg of the gas turbine engine when operating at around 100% available thrust for the same operating conditions at which $EI_{climb,SAF}$ is calculated if a fuel provided to the plurality of fuel spray nozzles is a fossil-based hydrocarbon fuel;

and wherein the rich cruise/MTO nvPM emissions index ratio of the gas turbine engine may be less than 1.

The rich cruise/MTO nvPM emissions index ratio may be greater than zero.

The rich cruise/MTO nvPM emissions index ratio may be less than or equal to 0.8, and preferably may be less than or equal to 0.6 and even preferably may be less than or equal to 0.5.

The rich cruise/MTO nvPM emissions index ratio may be less than or equal to 0.469, and preferably may be less than or equal to 0.43 and further preferably may be less than or equal to 0.391.

The rich cruise/MTO nvPM emissions index ratio may be greater than or equal to 0.191, and preferably may be greater than or equal to 0.214 and further preferably may be greater than or equal to 0.238.

The rich cruise/MTO nvPM emissions index ratio may be in the range 0.191 to 0.469, preferably may be in the range 0.214 to 0.430 and further preferably may be in the range 0.238 to 0.391.

The rich cruise/MTO nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

The rich cruise/MTO nvPM emissions index ratio may be 0.19, 0.191, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.469, 0.47, or within any range defined between any two of these values.

An idle/rich cruise nvPM emissions index ratio may be defined as:

$$\frac{EI_{idle,SAF}/EI_{cruise(rich),SAF}}{EI_{idle,FF}/EI_{cruise(rich),FF}}$$

where:

$EI_{idle,SAF}$ is the nvPM emissions index in mg/kg of the gas turbine engine when operating at around 7% available thrust for the given operating conditions, or for other different operating conditions, and if a fuel provided to the plurality of fuel spray nozzles comprises a sustainable aviation fuel (SAF);

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel;

$EI_{cruise(rich),SAF}$ may be defined as:

$$\frac{EI_{climb,SAF} + EI_{approach,SAF}}{2}$$

$EI_{cruise(rich),FF}$ may be defined as:

$$\frac{EI_{climb,FF} + EI_{approach,FF}}{2}$$

$EI_{climb,SAF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles is a fossil-based hydrocarbon fuel;

$EI_{approach,SAF}$ is the nvPM emissions index in mg/kg of the gas turbine engine when operating at around 30% available thrust for the same operating conditions at which $EI_{idle,SAF}$ is calculated if a fuel provided to the plurality of fuel spray nozzles comprises a sustainable aviation fuel; and $EI_{approach,FF}$ is the nvPM emissions index in mg/kg of the gas turbine engine when operating at around 30% available thrust for the same operating conditions at which $EI_{idle,SAF}$ is calculated if a fuel provided to the plurality of fuel spray nozzles is a fossil-based hydrocarbon fuel;

and wherein the idle/rich cruise nvPM emissions index ratio of the gas turbine engine may be less than 1.

The idle/rich cruise nvPM emissions index ratio may be greater than zero.

The idle/rich cruise nvPM emissions index ratio may be less than or equal to 0.9 and preferably may be less than or equal to 0.8.

The idle/rich cruise nvPM emissions index ratio may be less than or equal to 0.746, and preferably may be less than or equal to 0.683 and further preferably may be less than or equal to 0.621.

The idle/rich cruise nvPM emissions index ratio may be greater than or equal to 0.304, and preferably may be greater than or equal to 0.342 and further preferably may be greater than or equal to 0.38.

The idle/rich cruise nvPM emissions index ratio may be in the range 0.304 to 0.746, and preferably may be in the range 0.342 to 0.683 and further preferably may be in the range 0.380 to 0.621.

The idle/rich cruise nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

The idle/rich cruise nvPM emissions index ratio may be 0.3, 0.304, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.746, 0.75, or within any range defined between any two of these values According to a thirty-sixth aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

an idle-MTO nvPM emissions index ratio may be defined as:

$$\frac{EI_{idle,SAF}/EI_{maxTO,SAF}}{EI_{idle,FF}/EI_{maxTO,FF}}$$

where:

$EI_{idle,SAF}$ is the nvPM emissions index in mg/kg of the gas turbine engine when operating at around 7% available thrust for given operating conditions if a fuel provided to the plurality of fuel spray nozzles comprises a sustainable aviation fuel;

$EI_{maxTO,SAF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles comprises a sustainable aviation fuel;

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel; and $EI_{maxTO,FF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles is a fossil-based hydrocarbon fuel;

the idle-MTO nvPM emissions index ratio of the gas turbine engine may be less than 1; and the gas turbine engine is configured to provide fuel comprising a sustainable aviation fuel (SAF) to the plurality of fuel spray nozzles.

The idle-MTO nvPM emissions index ratio may be as defined above in connection with the thirty-fifth aspect.

According to a thirty-seventh aspect, there is provided gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5;

wherein:

a lean cruise/MTO nvPM emissions index ratio may be defined as:

$$\frac{EI_{cruise(lean),SAF}/EI_{maxTO,SAF}}{EI_{cruise(lean),FF}/EI_{maxTO,FF}}$$

where:

$EI_{cruise(lean),SAF}$ may be defined as:

$$\frac{EI_{maxTO,SAF} + EI_{climb,SAF}}{2}$$

$EI_{cruise(lean),FF}$ may be defined as:

$$\frac{EI_{maxTO,FF} + EI_{climb,FF}}{2}$$

$EI_{maxTO,SAF}$ is the nvPM emissions index in mg/kg of the gas turbine engine when operating at around 100% available thrust for given operating conditions if a fuel provided to the plurality of fuel spray nozzles comprises a sustainable aviation fuel;

$EI_{climb,SAF}$ is the nvPM emissions index in mg/kg of the gas turbine engine when operating at around 85% available thrust for the same operating conditions at which $EI_{maxTO,SAF}$ is calculated if a fuel provided to the plurality of fuel spray nozzles comprises a sustainable aviation fuel;

$EI_{maxTO,FF}$ is the nvPM emissions index in mg/kg of the gas turbine engine when operating at around 100% available thrust for the same operating conditions at which $EI_{maxTO,SAF}$ is calculated if a fuel provided to the plurality of fuel spray nozzles is a fossil-based hydrocarbon fuel; and $EI_{climb,FF}$ is the nvPM emissions index in mg/kg of the gas turbine engine when operating at around 85% available thrust for the same operating conditions at which $EI_{maxTO,SAF}$ is calculated if a fuel provided to the plurality of fuel spray nozzles is a fossil-based hydrocarbon fuel;

the lean cruise/MTO nvPM emissions index ratio of the gas turbine engine may be less than 1; and the gas turbine engine is configured to provide fuel comprising a sustainable aviation fuel (SAF) to the plurality of fuel spray nozzles.

The lean cruise/MTO nvPM emissions index ratio may be as defined above in connection with the thirty-fifth aspect.

According to a thirty-eighth aspect, there is provided gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

an idle/lean cruise nvPM emissions index ratio may be defined as:

$$\frac{EI_{idle,SAF}/EI_{cruise(lean),SAF}}{EI_{idle,FF}/EI_{cruise(lean),FF}}$$

where:

$EI_{idle,SAF}$ is the nvPM emissions index in mg/kg of the gas turbine engine when operating at around 7% available thrust for given operating conditions if a fuel provided to the plurality of fuel spray nozzles comprises a sustainable aviation fuel;

$EI_{cruise(lean),SAF}$ may be defined as:

$$\frac{EI_{maxTO,SAF} + EI_{climb,SAF}}{2}$$

$EI_{maxTO,SAF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles comprises a sustainable aviation fuel;

$EI_{climb,SAF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles comprises a sustainable aviation fuel;

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel;

$EI_{cruise(lean),FF}$ may be defined as:

$$\frac{EI_{maxTO,FF} + EI_{climb,FF}}{2}$$

$EI_{maxTO,FF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles is a fossil-based hydrocarbon fuel; and $EI_{climb,FF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles is a fossil-based hydrocarbon fuel;

the idle/lean cruise nvPM emissions index ratio of the gas turbine engine is less than 1; and the gas turbine engine is configured to provide fuel comprising a sustainable aviation fuel (SAF) to the plurality of fuel spray nozzles.

The idle/lean cruise nvPM emissions index ratio may be as defined above in connection with the thirty-fifth aspect.

According to a thirty-ninth aspect, there is provided gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

a rich cruise nvPM emissions index ratio may be defined as:

$$\frac{EI_{cruise(rich),SAF}}{EI_{cruise(rich),FF}}$$

where:

$EI_{cruise(rich),SAF}$ may be defined as:

$$\frac{EI_{climb,SAF} + EI_{approach,SAF}}{2}$$

$EI_{cruise(rich),FF}$ may be defined as:

$$\frac{EI_{climb,FF} + EI_{approach,FF}}{2}$$

$EI_{climb,SAF}$ is the nvPM emissions index in mg/kg of the gas turbine engine when operating at around 85% available thrust for given operating conditions if a fuel provided to the plurality of fuel spray nozzles comprises a sustainable aviation fuel;

$EI_{approach,SAF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel; and $EI_{approach,FF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles is a fossil-based hydrocarbon fuel;

the rich cruise nvPM emissions index ratio of the gas turbine engine is less than 1; and the gas turbine engine is configured to provide fuel comprising a sustainable aviation fuel (SAF) to the plurality of fuel spray nozzles.

The rich cruise nvPM emissions index ratio may be as defined above in connection with the thirty-fifth aspect.

According to a fortieth aspect, there is provided gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

a rich cruise/MTO nvPM emissions index ratio may be defined as:

$$\frac{EI_{cruise(rich),SAF}/EI_{maxTO,SAF}}{EI_{cruise(rich),FF}/EI_{maxTO,FF}}$$

where:

$EI_{cruise(rich),SAF}$ may be defined as:

$$\frac{EI_{climb,SAF} + EI_{approach,SAF}}{2}$$

and $EI_{cruise(rich),FF}$ may be defined as:

$$\frac{EI_{climb,FF} + EI_{approach,FF}}{2}$$

and where:

$EI_{climb,SAF}$ is the nvPM emissions index in mg/kg of the gas turbine engine when operating at around 85% available thrust for given operating conditions and if a fuel provided to the plurality of fuel spray nozzles comprises a sustainable aviation fuel;

$EI_{approach,SAF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel;

$EI_{approach,FF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles is a fossil-based hydrocarbon fuel;

$EI_{maxTO,SAF}$ is the nvPM emissions index in mg/kg of the gas turbine engine when operating at around 100% available thrust for the same operating conditions at which $EI_{climb,SAF}$ is calculated if a fuel provided to the plurality of fuel spray nozzles comprises a sustainable aviation fuel; and $EI_{maxTO,FF}$ is the nvPM emissions index in mg/kg of the gas turbine engine when operating at around 100% available thrust for the same operating conditions at which $EI_{climb,SAF}$ is calculated if a fuel provided to the plurality of fuel spray nozzles is a fossil-based hydrocarbon fuel;

the rich cruise/MTO nvPM emissions index ratio of the gas turbine engine is less than 1; and the gas turbine engine is configured to provide fuel comprising a sustainable aviation fuel (SAF) to the plurality of fuel spray nozzles.

The rich cruise/MTO nvPM emissions index ratio may be as defined above in connection with the thirty-fifth aspect.

According to a forty-first aspect, there is provided a gas turbine engine for an aircraft, comprising any one or more of the following features:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

an idle/rich cruise nvPM emissions index ratio may be defined as:

$$\frac{EI_{idle,SAF}/EI_{cruise(rich),SAF}}{EI_{idle,FF}/EI_{cruise(rich),FF}}$$

where:

$EI_{idle,SAF}$ is the nvPM emissions index in mg/kg of the gas turbine engine when operating at around 7% available thrust for given operating conditions and if a fuel provided to the plurality of fuel spray nozzles comprises a sustainable aviation fuel (SAF);

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel;

$EI_{cruise(rich),SAF}$ may be defined as:

$$\frac{EI_{climb,SAF} + EI_{approach,SAF}}{2}$$

$EI_{cruise(rich),FF}$ may be defined as:

$$\frac{EI_{climb,FF} + EI_{approach,FF}}{2}$$

$EI_{climb,SAF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles is a fossil-based hydrocarbon fuel;

$EI_{approach,SAF}$ is the nvPM emissions index in mg/kg of the gas turbine engine when operating at around 30% available thrust for the same operating conditions at which $EI_{idle,SAF}$ is calculated if a fuel provided to the plurality of fuel spray nozzles comprises a sustainable aviation fuel; and $EI_{approach,FF}$ is the nvPM emissions index in mg/kg of the gas turbine engine when operating at around 30% available thrust for the same operating conditions at which $EI_{idle,SAF}$ is calculated if a fuel provided to the plurality of fuel spray nozzles is a fossil-based hydrocarbon fuel;

the idle/rich cruise nvPM emissions index ratio of the gas turbine engine is less than 1; and the gas turbine engine is configured to provide fuel comprising a sustainable aviation fuel (SAF) to the plurality of fuel spray nozzles.

The idle/rich cruise nvPM emissions index ratio may be as defined above in connection with the thirty-fifth aspect.

According to a forty-second aspect, there is provided a method of operating the gas turbine engine of any one or more of the thirty-fifth, thirty-sixth, thirty-seventh, thirty-eighth, thirty-ninth, fortieth, or forty-first aspect, the method comprising providing fuel comprising a sustainable aviation fuel to the plurality of fuel spray nozzles.

According to a forty-third aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

a lean cruise nvPM emissions index ratio may be defined as:

$$\frac{EI_{cruise(lean),SAF}}{EI_{cruise(lean),FF}}$$

where:

$EI_{cruise(lean),SAF}$ may be defined as:

$$\frac{EI_{maxTO,SAF} + EI_{climb,SAF}}{2}$$

$EI_{cruise(lean),FF}$ may be defined as:

$$\frac{EI_{maxTO,FF} + EI_{climb,FF}}{2}$$

$EI_{maxTO,SAF}$ is the nvPM emissions index in mg/kg of the gas turbine engine when operating at around 100% available thrust for the given operating conditions and if a fuel provided to the plurality of fuel spray nozzles comprises a sustainable aviation fuel;

$EI_{climb,SAF}$ is the nvPM emissions index in mg/kg of the gas turbine engine when operating at around 85% available thrust for the given operating conditions and if a fuel provided to the plurality of fuel spray nozzles comprises a sustainable aviation fuel;

$EI_{maxTO,FF}$ is the nvPM emissions index in mg/kg of the gas turbine engine when operating at around 100% available thrust for the given operating conditions if a fuel provided to the plurality of fuel spray nozzles is a fossil-based hydrocarbon fuel; and $EI_{climb,FF}$ is the nvPM emissions index in mg/kg of the gas turbine engine when operating at around 85% available thrust for the given operating conditions if a fuel provided to the plurality of fuel spray nozzles is a fossil-based hydrocarbon fuel;

the lean cruise nvPM emissions index ratio is less than 1; and the method comprises providing fuel comprising a sustainable aviation fuel (SAF) to the plurality of fuel spray nozzles.

The lean cruise nvPM emissions index ratio may be as defined above in connection with the thirty-fifth aspect.

An idle-MTO nvPM emissions index ratio may be defined as:

$$\frac{EI_{idle,SAF}/EI_{maxTO,SAF}}{EI_{idle,FF}/EI_{maxTO,FF}}$$

where:

$EI_{idle,SAF}$ is the nvPM emissions index in mg/kg of the gas turbine engine when operating at around 7% available thrust for the given operating conditions, or for other different operating conditions, and if a fuel provided to the plurality of fuel spray nozzles comprises a sustainable aviation fuel;

$EI_{maxTO,SAF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles comprises a sustainable aviation fuel;

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel; and $EI_{maxTO,FF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles is a fossil-based hydrocarbon fuel; and wherein the idle-MTO nvPM emissions index ratio of the gas turbine engine may be less than 1.

The idle-MTO nvPM emissions index ratio may be as defined above in connection with the thirty-fifth aspect.

A lean cruise/MTO nvPM emissions index ratio may be defined as:

$$\frac{EI_{cruise(lean),SAF}/EI_{maxTO,SAF}}{EI_{cruise(lean),FF}/EI_{maxTO,FF}}$$

where:

$EI_{cruise(lean),SAF}$ may be defined as:

$$\frac{EI_{maxTO,SAF} + EI_{climb,SAF}}{2}$$

$EI_{cruise(lean),FF}$ may be defined as:

$$\frac{EI_{maxTO,FF} + EI_{climb,FF}}{2}$$

$EI_{maxTO,SAF}$ is the nvPM emissions index in mg/kg of the gas turbine engine when operating at around 100% available thrust the given operating conditions, or for other different operating conditions, and if a fuel provided to the plurality of fuel spray nozzles comprises a sustainable aviation fuel;

$EI_{climb,SAF}$ is the nvPM emissions index in mg/kg of the gas turbine engine when operating at around 85% available thrust for the same operating conditions at which $EI_{maxTO,SAF}$ is calculated if a fuel provided to the plurality of fuel spray nozzles comprises a sustainable aviation fuel;

$EI_{maxTO,FF}$ is the nvPM emissions index in mg/kg of the gas turbine engine when operating at around 100% available thrust for the same operating conditions at which $EI_{maxTO,SAF}$ is calculated if a fuel provided to the plurality of fuel spray nozzles is a fossil-based hydrocarbon fuel; and $EI_{climb,FF}$ is the nvPM emissions index in mg/kg of the gas turbine engine when operating at around 85% available thrust for the same operating conditions at which $EI_{maxTO,SAF}$ is calculated if a fuel provided to the plurality of fuel spray nozzles is a fossil-based hydrocarbon fuel; and wherein the lean cruise/MTO nvPM emissions index ratio of the gas turbine engine may be less than 1.

The lean cruise/MTO nvPM emissions index ratio may be as defined above in connection with the thirty-fifth aspect.

An idle/lean cruise nvPM emissions index ratio may be defined as:

$$\frac{EI_{idle,SAF}/EI_{cruise(lean),SAF}}{EI_{idle,FF}/EI_{cruise(lean),FF}}$$

where:

$EI_{idle,SAF}$ is the nvPM emissions index in mg/kg of the gas turbine engine when operating at around 7% available thrust for the given operating conditions, or for other different operating conditions, and if a fuel provided to the plurality of fuel spray nozzles comprises a sustainable aviation fuel;

$EI_{cruise(lean),SAF}$ may be defined as:

$$\frac{EI_{maxTO,SAF} + EI_{climb,SAF}}{2}$$

$EI_{maxTO,SAF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles comprises a sustainable aviation fuel;

$EI_{climb,SAF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles comprises a sustainable aviation fuel;

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel;

$EI_{cruise(lean),FF}$ may be defined as:

$$\frac{EI_{maxTO,FF} + EI_{climb,FF}}{2}$$

$EI_{maxTO,FF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles is a fossil-based hydrocarbon fuel; and $EI_{climb,FF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles is a fossil-based hydrocarbon fuel; and wherein the idle/lean cruise nvPM emissions index ratio of the gas turbine engine may be less than 1.

The idle/lean cruise nvPM emissions index ratio may be as defined above in connection with the thirty-fifth aspect.

A rich cruise nvPM emissions index ratio may be defined as:

$$\frac{EI_{cruise(rich),SAF}}{EI_{cruise(rich),FF}}$$

where:
$EI_{cruise(rich),SAF}$ may be defined as:

$$\frac{EI_{climb,SAF} + EI_{approach,SAF}}{2}$$

$EI_{cruise(rich),FF}$ may be defined as:

$$\frac{EI_{climb,FF} + EI_{approach,FF}}{2}$$

$EI_{climb,SAF}$ is the nvPM emissions index in mg/kg of the gas turbine engine when operating at around 85% available thrust for the given operating conditions, or for other different operating conditions, and if a fuel provided to the plurality of fuel spray nozzles comprises a sustainable aviation fuel;

$EI_{approach,SAF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel; and $EI_{approach,FF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles is a fossil-based hydrocarbon fuel; and wherein the rich cruise nvPM emissions index ratio of the gas turbine engine may be less than 1.

The rich cruise nvPM emissions index ratio may be as defined above in connection with the thirty-fifth aspect.

A rich cruise/MTO nvPM emissions index ratio may be defined as:

$$\frac{EI_{cruise(rich),SAF}/EI_{maxTO,SAF}}{EI_{cruise(rich),FF}/EI_{maxTO,FF}}$$

where:
$EI_{cruise(rich),SAF}$ may be defined as:

$$\frac{EI_{climb,SAF} + EI_{approach,SAF}}{2}$$

and $EI_{cruise(rich),FF}$ may be defined as:

$$\frac{EI_{climb,FF} + EI_{approach,FF}}{2}$$

and where:
$EI_{climb,SAF}$ is the nvPM emissions index in mg/kg of the gas turbine engine when operating at around 85% available thrust the given operating conditions, or for other different operating conditions, and if a fuel provided to the plurality of fuel spray nozzles comprises a sustainable aviation fuel;

$EI_{approach,SAF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel;

$EI_{approach,FF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles is a fossil-based hydrocarbon fuel;

$EI_{maxTO,SAF}$ is the nvPM emissions index in mg/kg of the gas turbine engine when operating at around 100% available thrust for the same operating conditions at which $EI_{climb,SAF}$ is calculated if a fuel provided to the plurality of fuel spray nozzles comprises a sustainable aviation fuel; and $EI_{maxTO,FF}$ is the nvPM emissions index in mg/kg of the gas turbine engine when operating at around 100% available thrust for the same operating conditions at which $EI_{climb,SAF}$ is calculated if a fuel provided to the plurality of fuel spray nozzles is a fossil-based hydrocarbon fuel;

and wherein the rich cruise/MTO nvPM emissions index ratio of the gas turbine engine may be less than 1.

The rich cruise/MTO nvPM emissions index ratio may be as defined above in connection with the thirty-fifth aspect.

An idle/rich cruise nvPM emissions index ratio may be defined as:

$$\frac{EI_{idle,SAF}/EI_{cruise(rich),SAF}}{EI_{idle,FF}/EI_{cruise(rich),FF}}$$

57 where:

$EI_{idle,SAF}$ is the nvPM emissions index in mg/kg of the gas turbine engine when operating at around 7% available thrust for the given operating conditions, or for other different operating conditions, and if a fuel provided to the plurality of fuel spray nozzles comprises a sustainable aviation fuel (SAF);

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel;

$EI_{cruise(rich),SAF}$ may be defined as:

$$\frac{EI_{climb,SAF} + EI_{approach,SAF}}{2}$$

$EI_{cruise(rich),FF}$ may be defined as:

$$\frac{EI_{climb,FF} + EI_{approach,FF}}{2}$$

$EI_{climb,SAF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles is a fossil-based hydrocarbon fuel;

$EI_{approach,SAF}$ is the nvPM emissions index in mg/kg of the gas turbine engine when operating at around 30% available thrust for the same operating conditions at which $EI_{idle,SAF}$ is calculated if a fuel provided to the plurality of fuel spray nozzles comprises a sustainable aviation fuel; and $EI_{approach,FF}$ is the nvPM emissions index in mg/kg of the gas turbine engine when operating at around 30% available thrust for the same operating conditions at which $EI_{idle,SAF}$ is calculated if a fuel provided to the plurality of fuel spray nozzles is a fossil-based hydrocarbon fuel;

and wherein the idle/rich cruise nvPM emissions index ratio of the gas turbine engine may be less than 1.

The idle/rich cruise nvPM emissions index ratio may be as defined above in connection with the thirty-fifth aspect.

According to a forty-fourth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

an idle-MTO nvPM emissions index ratio may be defined as:

$$\frac{EI_{idle,SAF}/EI_{maxTO,SAF}}{EI_{idle,FF}/EI_{maxTO,FF}}$$

where:

$EI_{idle,SAF}$ is the nvPM emissions index in mg/kg of the gas turbine engine when operating at around 7% available thrust for given operating conditions if a fuel provided to the plurality of fuel spray nozzles comprises a sustainable aviation fuel;

$EI_{maxTO,SAF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles comprises a sustainable aviation fuel;

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel; and $EI_{maxTO,FF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles is a fossil-based hydrocarbon fuel;

the idle-MTO nvPM emissions index ratio of the gas turbine engine may be less than 1; and the method comprises providing fuel comprising a sustainable aviation fuel (SAF) to the plurality of fuel spray nozzles.

The idle-MTO nvPM emissions index ratio may be as defined above in connection with the thirty-fifth aspect.

According to a forty-fifth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

a lean cruise/MTO nvPM emissions index ratio may be defined as:

$$\frac{EI_{cruise(lean),SAF}/EI_{maxTO,SAF}}{EI_{cruise(lean),FF}/EI_{maxTO,FF}}$$

where:

$EI_{cruise(lean),SAF}$ may be defined as:

$$\frac{EI_{maxTO,SAF} + EI_{climb,SAF}}{2}$$

$EI_{cruise(lean),FF}$ may be defined as:

$$\frac{EI_{maxTO,FF} + EI_{climb,FF}}{2}$$

$EI_{maxTO,SAF}$ is the nvPM emissions index in mg/kg of the gas turbine engine when operating at around 100% available thrust for given operating conditions if a fuel provided to the plurality of fuel spray nozzles comprises a sustainable aviation fuel;

$EI_{climb,SAF}$ is the nvPM emissions index in mg/kg of the gas turbine engine when operating at around 85% available thrust for the same operating conditions at which $EI_{maxTO,SAF}$ is calculated if a fuel provided to the plurality of fuel spray nozzles comprises a sustainable aviation fuel;

$EI_{maxTO,FF}$ is the nvPM emissions index in mg/kg of the gas turbine engine when operating at around 100% available thrust for the same operating conditions at which $EI_{maxTO,SAF}$ is calculated if a fuel provided to the plurality of fuel spray nozzles is a fossil-based hydrocarbon fuel; and $EI_{climb,FF}$ is the nvPM emissions index in mg/kg of the gas turbine engine when operating at around 85% available thrust for the same operating conditions at which $EI_{maxTO,SAF}$ is calculated if a fuel provided to the plurality of fuel spray nozzles is a fossil-based hydrocarbon fuel;

the lean cruise/MTO nvPM emissions index ratio of the gas turbine engine may be less than 1; and the method comprises providing fuel comprising a sustainable aviation fuel (SAF) to the plurality of fuel spray nozzles.

The lean cruise/MTO nvPM emissions index ratio may be as defined above in connection with the thirty-fifth aspect.

According to a forty-sixth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

an idle/lean cruise nvPM emissions index ratio may be defined as:

$$\frac{EI_{idle,SAF}/EI_{cruise(lean),SAF}}{EI_{idle,FF}/EI_{cruise(lean),FF}}$$

where:

$EI_{idle,SAF}$ is the nvPM emissions index in mg/kg of the gas turbine engine when operating at around 7% available thrust for given operating conditions if a fuel provided to the plurality of fuel spray nozzles comprises a sustainable aviation fuel;

$EI_{cruise(lean),SAF}$ may be defined as:

$$\frac{EI_{maxTO,SAF} + EI_{climb,SAF}}{2}$$

$EI_{maxTO,SAF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles comprises a sustainable aviation fuel;

$EI_{climb,SAF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles comprises a sustainable aviation fuel;

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel;

$EI_{cruise(lean),FF}$ may be defined as:

$$\frac{EI_{maxTO,FF} + EI_{climb,FF}}{2}$$

$EI_{maxTO,FF}$ is the nvPM emissions index in mg/kg of the gas turbine engine when operating at around 100% available thrust for the same operating conditions at which $EI_{idle,SAF}$ is calculated if a fuel provided to the plurality of fuel spray nozzles is a fossil-based hydrocarbon fuel; and $EI_{climb,FF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles is a fossil-based hydrocarbon fuel;

the idle/lean cruise nvPM emissions index ratio of the gas turbine engine is less than 1; and the method comprises providing fuel comprising a sustainable aviation fuel (SAF) to the plurality of fuel spray nozzles.

The idle/lean cruise nvPM emissions index ratio may be as defined above in connection with the thirty-fifth aspect.

According to a forty-seventh aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

a rich cruise nvPM emissions index ratio may be defined as:

$$\frac{EI_{cruise(rich),SAF}}{EI_{cruise(rich),FF}}$$

where:

$EI_{cruise(rich),SAF}$ may be defined as:

$$\frac{EI_{climb,SAF} + EI_{approach,SAF}}{2}$$

$EI_{cruise(rich),FF}$ may be defined as:

$$\frac{EI_{climb,FF} + EI_{approach,FF}}{2}$$

$EI_{climb,SAF}$ is the nvPM emissions index in mg/kg of the gas turbine engine when operating at around 85% available thrust for given operating conditions if a fuel provided to the plurality of fuel spray nozzles comprises a sustainable aviation fuel;

$EI_{approach,SAF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel; and $EI_{approach,FF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles is a fossil-based hydrocarbon fuel;

the rich cruise nvPM emissions index ratio of the gas turbine engine is less than 1; and the method comprises providing fuel comprising a sustainable aviation fuel (SAF) to the plurality of fuel spray nozzles.

The rich cruise nvPM emissions index ratio may be as defined above in connection with the thirty-fifth aspect.

According to a forty-eighth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

a rich cruise/MTO nvPM emissions index ratio may be defined as:

$$\frac{EI_{cruise(rich),SAF} \,/\, EI_{maxTO,SAF}}{EI_{cruise(rich),FF} \,/\, EI_{maxTO,FF}}$$

where:

$EI_{cruise(rich),SAF}$ may be defined as:

$$\frac{EI_{climb,SAF} + EI_{approach,SAF}}{2}$$

and $EI_{cruise(rich),FF}$ may be defined as:

$$\frac{EI_{climb,FF} + EI_{approach,FF}}{2}$$

and where:

$EI_{climb,SAF}$ is the nvPM emissions index in mg/kg of the gas turbine engine when operating at around 85% available thrust for given operating conditions and if a fuel provided to the plurality of fuel spray nozzles comprises a sustainable aviation fuel;

$EI_{approach,SAF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{climb,SAF}$ is calculated if a fuel provided to the plurality of fuel spray nozzles is a fossil-based hydrocarbon fuel;

$EI_{approach,FF}$ is the nvPM emissions index in mg/kg of the gas turbine engine when operating at around 30% available thrust for the same operating conditions at which $EI_{climb,SAF}$ is calculated if a fuel provided to the plurality of fuel spray nozzles is a fossil-based hydrocarbon fuel;

$EI_{maxTO,SAF}$ is the nvPM emissions index in mg/kg of the gas turbine engine when operating at around 100% available thrust for the same operating conditions at which $EI_{climb,SAF}$ is calculated if a fuel provided to the plurality of fuel spray nozzles comprises a sustainable aviation fuel; and $EI_{maxTO,FF}$ is the nvPM emissions index in mg/kg of the gas turbine engine when operating at around 100% available thrust for the same operating conditions at which $EI_{climb,SAF}$ is calculated if a fuel provided to the plurality of fuel spray nozzles is a fossil-based hydrocarbon fuel;

the rich cruise/MTO nvPM emissions index ratio of the gas turbine engine is less than 1; and the method comprises providing fuel comprising a sustainable aviation fuel (SAF) to the plurality of fuel spray nozzles.

The rich cruise/MTO nvPM emissions index ratio may be as defined above in connection with the thirty-fifth aspect.

According to a forty-ninth aspect, there is provided a method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; wherein:

an idle/rich cruise nvPM emissions index ratio may be defined as:

$$\frac{EI_{idle,SAF} / EI_{cruise(rich),SAF}}{EI_{idle,FF} / EI_{cruise(rich),FF}}$$

where:

$EI_{idle,SAF}$ is the nvPM emissions index in mg/kg of the gas turbine engine when operating at around 7% available thrust for given operating conditions and if a fuel provided to the plurality of fuel spray nozzles comprises a sustainable aviation fuel (SAF);

$EI_{idle,FF}$ is the nvPM emissions index in mg/kg of the gas turbine engine when operating at around 7% available thrust for the same operating conditions at which $EI_{idle,SAF}$ is calculated if a fuel provided to the plurality of fuel spray nozzles is a fossil-based hydrocarbon fuel;

$EI_{cruise(rich),SAF}$ may be defined as:

$$\frac{EI_{climb,SAF} + EI_{approach,SAF}}{2}$$

$EI_{cruise(rich),FF}$ may be defined as:

$$\frac{EI_{climb,FF} + EI_{approach,FF}}{2}$$

$EI_{climb,SAF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles comprises a sustainable aviation fuel;

$EI_{climb,FF}$ is the nvPM emissions index in mg/kg of the gas turbine engine when operating at around 85% available thrust for the same operating conditions at which $EI_{idle,SAF}$ is calculated if a fuel provided to the plurality of fuel spray nozzles is a fossil-based hydrocarbon fuel;

$EI_{approach,SAF}$ is the nvPM emissions index in mg/kg of the gas turbine engine when operating at around 30% available thrust for the same operating conditions at which $EI_{idle,SAF}$ is calculated if a fuel provided to the plurality of fuel spray nozzles comprises a sustainable aviation fuel; and $EI_{approach,FF}$ is the nvPM emissions index in mg/kg of the gas turbine engine when operating at around 30% available thrust for the same operating conditions at which $EI_{idle,SAF}$ is calculated if a fuel provided to the plurality of fuel spray nozzles is a fossil-based hydrocarbon fuel;

the idle/rich cruise nvPM emissions index ratio of the gas turbine engine is less than 1; and the method comprises providing fuel comprising a sustainable aviation fuel (SAF) to the plurality of fuel spray nozzles.

The idle/rich cruise nvPM emissions index ratio may be as defined above in connection with the thirty-fifth aspect.

In any of the aspects defined above, any one or more of the emission indices of the gas turbine engine may be defined as follows:

$EI_{maxTO}$ may be in the range of 0.00893 to 4.72 mg/kg and preferably in the range of 0.0100 to 4.33 mg/kg and more preferably in the range of 0.0111 to 3.94 mg/kg.

$EI_{maxTO}$ may be in the range of 0.767 to 4.72 mg/kg and preferably in the range of 0.863 to 4.33 mg/kg and more preferably in the range of 0.959 to 3.94 mg/kg.

$EI_{maxTO}$ may be in the range of 0.00893 to 0.0809 mg/kg and preferably in the range of 0.0100 to 0.0741 mg/kg and more preferably in the range of 0.0111 to 0.0674 mg/kg.

$EI_{maxTO,SAF}$ may be in the range of 0.00893 to 3.05 mg/kg and preferably in the range of 0.0100 to 2.80 mg/kg and more preferably in the range of 0.0111 to 2.54 mg/kg.

$EI_{maxTO,SAF}$ may be in the range of 0.767 to 3.05 mg/kg and preferably in the range of 0.863 to 2.80 mg/kg and more preferably in the range of 0.959 to 2.54 mg/kg.

$EI_{maxTO,SAF}$ may be in the range of 0.00893 to 0.0523 mg/kg and preferably in the range of 0.0100 to 0.0479 mg/kg and more preferably in the range of 0.0111 to 0.0436 mg/kg.

$EI_{maxTO,SAF}$ may be in the range of 0.00893 to 4.71 mg/kg and preferably in the range of 0.0100 to 4.32 mg/kg and more preferably in the range of 0.0111 to 3.93 mg/kg.

$EI_{maxTO,SAF}$ may be in the range of 0.767 to 4.71 mg/kg and preferably in the range of 0.863 to 4.32 mg/kg and more preferably in the range of 0.959 to 3.93 mg/kg.

$EI_{maxTO,SAF}$ may be in the range of 0.00893 to 0.0808 mg/kg and preferably in the range of 0.0100 to 0.0740 mg/kg and more preferably in the range of 0.0111 to 0.0673 mg/kg.

$EI_{maxTO,FF}$ may be in the range of 0.0138 to 4.72 mg/kg and preferably in the range of 0.0155 to 4.33 mg/kg and more preferably in the range of 0.0172 to 3.94 mg/kg.

$EI_{maxTO,FF}$ may be in the range of 1.18 to 4.72 mg/kg and preferably in the range of 1.33 to 4.33 mg/kg and more preferably in the range of 1.48 to 3.94 mg/kg.

$EI_{maxTO,FF}$ may be in the range of 0.0138 to 0.0809 mg/kg and preferably in the range of 0.0155 to 0.0741 mg/kg and more preferably in the range of 0.0172 to 0.0674 mg/kg.

$EI_{climb}$ may be in the range of 0.00438 to 2.30 mg/kg and preferably in the range of 0.00493 to 2.11 mg/kg and more preferably in the range of 0.00548 to 1.92 mg/kg.

$EI_{climb}$ may be in the range of 0.460 to 2.30 mg/kg and preferably in the range of 0.517 to 2.11 mg/kg and more preferably in the range of 0.575 to 1.92 mg/kg.

$EI_{climb}$ may be in the range of 0.00438 to 0.0221 mg/kg and preferably in the range of 0.00493 to 0.0202 mg/kg and more preferably in the range of 0.00548 to 0.0184 mg/kg.

$EI_{climb,SAF}$ may be in the range of 0.00438 to 1.09 mg/kg and preferably in the range of 0.00493 to 0.999 mg/kg and more preferably in the range of 0.00548 to 0.909 mg/kg.

$EI_{climb,SAF}$ may be in the range of 0.460 to 1.09 mg/kg and preferably in the range of 0.517 to 0.999 mg/kg and more preferably in the range of 0.575 to 0.909 mg/kg.

$EI_{climb,SAF}$ may be in the range of 0.00438 to 0.0105 mg/kg and preferably in the range of 0.00493 to 0.00959 mg/kg and more preferably in the range of 0.00548 to 0.00872 mg/kg.

$EI_{climb,SAF}$ may be in the range of 0.00438 to 2.29 mg/kg and preferably in the range of 0.00493 to 2.10 mg/kg and more preferably in the range of 0.00548 to 1.91 mg/kg.

$EI_{climb,SAF}$ may be in the range of 0.460 to 2.29 mg/kg and preferably in the range of 0.517 to 2.10 mg/kg and more preferably in the range of 0.575 to 1.91 mg/kg.

$EI_{climb,SAF}$ may be in the range of 0.00438 to 0.0220 mg/kg and preferably in the range of 0.00493 to 0.0201 mg/kg and more preferably in the range of 0.00548 to 0.0183 mg/kg.

$EI_{climb,FF}$ may be in the range of 0.00923 to 2.30 mg/kg and preferably in the range of 0.0103 to 2.11 mg/kg and more preferably in the range of 0.0115 to 1.92 mg/kg.

$EI_{climb,FF}$ may be in the range of 0.969 to 2.30 mg/kg and preferably in the range of 1.09 to 2.11 mg/kg and more preferably in the range of 1.21 to 1.92 mg/kg.

$EI_{climb,FF}$ may be in the range of 0.00923 to 0.0221 mg/kg and preferably in the range of 0.0103 to 0.0202 mg/kg and more preferably in the range of 0.0115 to 0.0184 mg/kg.

$EI_{approach}$ may be in the range of 0.337 to 12.6 mg/kg and preferably in the range of 0.379 to 11.6 mg/kg and more preferably in the range of 0.421 to 10.5 mg/kg.

$EI_{approach}$ may be in the range of 0.571 to 9.89 mg/kg and preferably in the range of 0.643 to 9.07 mg/kg and more preferably in the range of 0.714 to 8.25 mg/kg.

$EI_{approach,SAF}$ may be in the range of 0.337 to 1.94 mg/kg and preferably in the range of 0.379 to 1.78 mg/kg and more preferably in the range of 0.421 to 1.62 mg/kg.

$EI_{approach,SAF}$ may be in the range of 0.571 to 1.52 mg/kg and preferably in the range of 0.643 to 1.40 mg/kg and more preferably in the range of 0.714 to 1.27 mg/kg.

$EI_{approach,SAF}$ may be in the range of 0.337 to 12.5 mg/kg and preferably in the range of 0.379 to 11.5 mg/kg and more preferably in the range of 0.421 to 10.4 mg/kg.

$EI_{approach,SAF}$ may be in the range of 0.571 to 9.88 mg/kg and preferably in the range of 0.643 to 9.06 mg/kg and more preferably in the range of 0.714 to 8.24 mg/kg.

$EI_{approach,FF}$ may be in the range of 2.19 to 12.6 mg/kg and preferably in the range of 2.47 to 11.6 mg/kg and more preferably in the range of 2.74 to 10.5 mg/kg.

$EI_{approach,FF}$ may be in the range of 3.72 to 9.89 mg/kg and preferably in the range of 4.18 to 9.07 mg/kg and more preferably in the range of 4.65 to 8.25 mg/kg.

$EI_{idle}$ may be in the range of 0.0525 to 1.55 mg/kg and preferably in the range of 0.0591 to 1.43 mg/kg and more preferably in the range of 0.0657 to 1.30 mg/kg.

$EI_{idle}$ may be in the range of 0.0858 to 1.55 mg/kg and preferably in the range of 0.0966 to 1.43 mg/kg and more preferably in the range of 0.107 to 1.30 mg/kg.

$EI_{idle}$ may be in the range of 0.0525 to 1.01 mg/kg and preferably in the range of 0.0591 to 0.925 mg/kg and more preferably in the range of 0.0657 to 0.841 mg/kg.

$EI_{idle,SAF}$ may be in the range of 0.0525 to 0.149 mg/kg and preferably in the range of 0.0591 to 0.137 mg/kg and more preferably in the range of 0.0657 to 0.124 mg/kg.

$EI_{idle,SAF}$ may be in the range of 0.0858 to 0.149 mg/kg and preferably in the range of 0.0966 to 0.137 mg/kg and more preferably in the range of 0.107 to 0.124 mg/kg.

$EI_{idle,SAF}$ may be in the range of 0.0525 to 0.0967 mg/kg and preferably in the range of 0.0591 to 0.0886 mg/kg and more preferably in the range of 0.0657 to 0.0806 mg/kg.

$EI_{idle,SAF}$ may be in the range of 0.0525 to 1.54 mg/kg and preferably in the range of 0.0591 to 1.42 mg/kg and more preferably in the range of 0.0657 to 1.29 mg/kg.

$EI_{idle,SAF}$ may be in the range of 0.0858 to 1.54 mg/kg and preferably in the range of 0.0966 to 1.42 mg/kg and more preferably in the range of 0.107 to 1.29 mg/kg.

$EI_{idle,SAF}$ may be in the range of 0.0525 to 1.00 mg/kg and preferably in the range of 0.0591 to 0.924 mg/kg and more preferably in the range of 0.0657 to 0.840 mg/kg.

$EI_{idle,FF}$ may be in the range of 0.548 to 1.55 mg/kg and preferably in the range of 0.617 to 1.43 mg/kg and more preferably in the range of 0.686 to 1.30 mg/kg.

$EI_{idle,FF}$ may be in the range of 0.896 to 1.55 mg/kg and preferably in the range of 1.00 to 1.43 mg/kg and more preferably in the range of 1.12 to 1.30 mg/kg.

$EI_{idle,FF}$ may be in the range of 0.548 to 1.01 mg/kg and preferably in the range of 0.617 to 0.925 mg/kg and more preferably in the range of 0.686 to 0.841 mg/kg.

The following statements may apply to any of the first to forty-ninth aspects defined above:

The ratio of the number of fuel spray nozzles in the first subset of fuel spray nozzles to the number of fuel spray nozzles in the second subset of fuel spray nozzles may be in the range of 1:3 to 1:4, or preferably it may be in the range of 1:3.5 to 1:4.

The first subset of fuel spray nozzles may include between 1 and 10 fuel spray nozzles. The first subset of fuel spray nozzles may include between 3 and 5 fuel spray nozzles.

The second subset of fuel spray nozzles may include between 10 and 25 fuel spray nozzles. The second subset of fuel spray nozzles may include between 13 and 20 fuel spray nozzles. The second subset of fuel spray nozzles may include between 13 and 17 fuel spray nozzles.

The combustor may comprise one or more ignitors.

Each of the first subset of fuel spray nozzles may be located nearer a respective one or more of the ignitors than the second subset. Additionally or alternatively, one or more of the ignitors may be arranged diametrically opposite another one or more of the ignitors.

The fuel provided to the combustor may comprise a % SAF in the range of 50% to 100% The fuel provided to the combustor may comprise a % SAF in the range of 70% to 100%. The fuel provided to the combustor may comprise a % SAF in the range of 90% to 100%.

Any of the features disclosed above in connection with one aspect may be combined with the feature of another aspect unless mutually exclusive.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

An engine according to the present disclosure may be a gas turbine engine. Such an engine may be a direct drive turbofan engine in which the fan is directly connected to the fan-drive turbine, for example without a gearbox, via a core shaft. In such a direct drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor. The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared gas turbine engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired gear ratio (defined as the rotational speed of the input shaft divided by the rotational speed of the output shaft). For example the gear ratio may be greater than, or may be any of, the following: 2.5, 2.6, 2.7, 2.8, 2.9, 3.0, 3.1, 3.2, 3.3, 3.4, 3.5, 3.6, 3.7, 3.8, 3.9, 4.0, 4.1 or 4.2. The gear ratio may be in an inclusive range bounded by any two of the values in the previous sentence (i.e. the values may form upper or lower bounds). The gear ratio may be, for example, greater than 2.5, for example in the range of from 3.0 to 4.2, or from 3.2 to 3.8. Purely by way of example, the gearbox may be a "star" gearbox having a gear ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range of from 3.3 to 3.6, or from 3.6 to 4.2. Purely by way of further example, the gearbox may be a compound gearbox, for example a compound star gearbox, having a gear ratio of, or at least: 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0. The gear ratio of a compound gearbox, for example a compound star gearbox, may be in an inclusive range bounded by any two of the values in the previous sentence (i.e. the values may form upper or lower bounds), for example in the range of from 4.0 to 14.0, or 6.0 to 12.0, or 8.0 to 10.0. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. Alternatively, such an engine may, for example, comprise 4 stages in the first (or "low pressure") compressor and 10 stages in the second (or "high pressure") compressor. Alternatively, such an engine may, for example, comprise 7, 8 or 9 stages in a first (or "intermediate pressure") compressor and 5, 6 or 7 stages in the second (or "high pressure") compressor. By way of further example, the gas turbine engine may be a "geared" gas turbine engine (in which the fan is driven by a first core shaft via a reduction gearbox) comprising 11, 12, 13, 14 or 15 compressor stages (in addition to the fan). Such an engine may comprise 3 or 4 stages in the first (or "low pressure") compressor and 8, 9, or 10 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes. The respective rows of rotor blades and stator vanes may be axially offset from each other. In each stage, the row of rotor blades may be arranged downstream from the respective row of stator vanes. By way of example, the gas turbine engine may comprise 5, 6, 7, 8, or 9 turbine stages. For example, the gas turbine engine may be a "geared" gas turbine engine comprising 5, 6, or 7 turbine stages. Such a geared gas turbine engine may comprise a second ("high pressure") turbine having 2 stages. Such a geared gas turbine engine may comprise a first (or "low pressure") turbine having 3, or 4 stages. By way of further example, the gas turbine engine may be a direct drive gas turbine engine comprising a first (or "low pressure") turbine having 5, 6 or 7 stages. Such a direct drive gas turbine engine may comprise a second (or "high pressure") turbine having 2 stages. Alternatively, such an engine may, for example, comprise a second (or "intermediate pressure") turbine having 1, 2 or 3 stages. Such a direct drive gas turbine engine may also comprise a third (or "high pressure") turbine having 1, 2 or 3 stages Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than, or may be any of: 0.50, 0.49, 0.48, 0.47, 0.46, 0.45, 0.44, 0.43, 0.42, 0.41, 0.40, 0.39, 0.38, 0.37, 0.36, 0.35, 0.34, 0.33, 0.32, 0.31, 0.30, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32, or from 0.29 to 0.30. These ratios may commonly be referred to as the hub-to-tip ratio. Purely by way of non-limitative example, the hub-to-tip ratio may be in the range of from 0.40 to 0.50, from 0.42 to 0.48, or from 0.43 to 0.47. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than, or may be any of: 140 cm, 170 cm, 180 cm, 190 cm, 200 cm, 205 cm, 206 cm, 207 cm, 208 cm, 209 cm, 210 cm, 211 cm, 212 cm, 213 cm, 214 cm, 215 cm, 216 cm, 217 cm, 218 cm, 219 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 345 cm, 350 cm, 355 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, from 250 cm to 280 cm, from 320 cm to 380 cm, or 380 cm to 420 cm. Purely by way of non-limitative example, the fan diameter may be in the range of from 170 cm to 180 cm, 190 cm to 200 cm, 200 cm to 210 cm, 210 cm to 220 cm, 220 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than, or may be any of the following: 3500 rpm, 3450 rpm, 3400 rpm, 3350 rpm, 3300 rpm, 3250 rpm, 3200 rpm, 3150 rpm, 3100 rpm, 3050 rpm, 3000 rpm, 2950 rpm, 2900 rpm, 2850 rpm, 2800 rpm, 2750 rpm, 2700 rpm, 2650 rpm, 2600 rpm, 2550 rpm, 2500 rpm, 2450 rpm, 2400 rpm, 2350 rpm, 2300 rpm, 2250 rpm, 2200 rpm, 2150 rpm, 2100 rpm, 2050 rpm, 2000 rpm, 1950 rpm, 1900 rpm, 1850 rpm, 1800 rpm, 1750 rpm, 1700 rpm, 1650 rpm, 1600 rpm, 1550 rpm, 1500 rpm, 1450 rpm, 1400 rpm, 1350 rpm, 1300 rpm, 1250 rpm, 1200 rpm, 1150 rpm, 1100 rpm, 1050 rpm, 1000 rpm, or 950 rpm. The rotational speed of the fan at cruise conditions may be in an inclusive range bounded by any two of the values in the previous sentence (i.e. the values may form upper or lower bounds). Purely by way of further non-limitative example, the rotational speed of the fan at cruise conditions for a "geared" gas turbine engine having a fan diameter in the range of from 200 cm to 210 cm may be in the range of from 2750 to 2900 rpm, from 2750 rpm to 2800 rpm, or 2800 rpm to 2900 rpm. Purely by way of further non-limitative example, the rotational speed of the fan at cruise conditions for a "geared" gas turbine engine having a fan diameter in the range of from 210 cm to 230 cm may be in the range of from 2500 rpm to 2800 rpm, or from 2500 rpm to 2750 rpm. Purely by way of further non-limitative example, the rotational speed of the fan at cruise conditions for a "geared" gas turbine engine having a fan diameter in the range of from 340 cm to 360 cm may be in the range of from 1500 rpm to 1800 rpm, or from 1500 rpm to 1700 rpm. Purely by way of further non-limitative example, the rotational speed of the fan at cruise conditions for a "geared" gas turbine engine having a fan diameter in the range of from 380 cm to 420 cm may be in the range of from 950 rpm to 1500 rpm, from 950 rpm to 1200 rpm, from 950 rpm to 1100 rpm, from 950 rpm to 1050 rpm, from 950 rpm to 1000 rpm, or from 1000 rpm to 1050 rpm. Purely by way of further non-limitative example, the rotational speed of the fan at cruise conditions for a direct drive engine having a fan diameter in the range of from 170 cm to 200 cm may be in the range of from 3400 to 4600 rpm, for example from 3600 to 4600 rpm, or from 3600 to 3900 rpm. Purely by way of further non-limitative example, the rotational speed of the fan at cruise conditions for a direct drive engine having a fan diameter in the range of from 300 cm to 350 cm may be in the range of from 1800 to 2800 rpm, or from 1950 to 2550 rpm. Purely by way of further non-limitative example, the rotational speed of the fan at cruise conditions for a direct drive engine having a fan diameter in the range of from 270 cm to 290 cm may be in the range of from 1800 to 2800 rpm, or from 2050 to 2450 rpm. Purely by way of further non-limitative example, the rotational speed of the fan at cruise conditions for a direct drive engine having a fan diameter in the range of from 290 cm to 310 cm may be in the range of from 1800 to 2800 rpm, or from 2100 to 2500 rpm.

In use of the gas turbine engine, the fan (with associated fan blades) rotates about a rotational axis. This rotation results in the tip of the fan blade moving with a velocity Utip. The work done by the fan blades on the flow results in a rise dH in specific enthalpy of the flow. A fan tip loading may be defined as $dH/Utip2$, where dH is the rise in specific enthalpy (for example the 1-D average specific enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than, or may be any of the following: 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39 or 0.40 (all values being dimensionless). The fan tip loading may be in an inclusive range bounded by any two of the values in the previous sentence (i.e. the values may form upper or lower bounds), for example in the range of from 0.15 to 0.20, from 0.28 to 0.35, from 0.29 to 0.35, from 0.29 to 0.30, or from 0.30 to 0.35 (for example for a geared gas turbine engine).

Gas turbine engines in accordance with the present disclosure may have any desired bypass ratio (BPR), where the bypass ratio may be defined as the ratio of the mass flow rate of the flow through the bypass duct to the mass flow rate of the flow through the core. In some arrangements the bypass ratio at cruise conditions may be greater than, or may be any of the following: 8, 8.5, 9, 9.5, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct drive gas turbine engine according to the present disclosure may be in the range of from 8 to 11, from 8 to 10, from 9 to 11, from 9 to 10, from 10 to 16, from 12 to 16, from 13 to 15, or from 13 to 14. Purely by way of further non-limitative example, the bypass ratio at cruise conditions of a geared gas turbine engine according to the present disclosure may be in the range of from 10 to 12, from 12 to 15, or from 12.5 to 15. The bypass duct may be at least substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than, or may be any of the following: 25, 30, 35, 36, 37, 38, 39, 40, 41, 42, 43, 44, 45, 46, 47, 48, 49, 50, 51, 52, 53, 54, 55, 56, 57, 58, 59, 60, 65, 70, 75. The overall pressure ratio at cruise conditions may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 44. Purely by way of non-limitative example, the overall pressure ratio at cruise conditions of a geared gas turbine engine having a fan diameter in the range of from 210 cm to 230 cm may be in the range of from 44 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct drive gas turbine engine having a fan diameter in the range of from 170 cm to 200 cm may be in the range of from 35 to 60, or from 40 to 50. Purely by way of non-limitative example, the overall pressure ratio at cruise conditions of a direct drive gas turbine engine having a fan diameter in the range of from 300 cm to 350 cm may be in the range of from 35 to 60, or from 40 to 50. Purely by way of non-limitative example, the overall pressure ratio cruise conditions of a direct drive gas turbine engine having a fan diameter in the range of from 260 cm to 285 cm may be in the range of from 35 to 60, or from 35 to 50. Purely by way of further non-limitative example, the overall pressure ratio at cruise conditions for a direct drive engine having a fan diameter in the range of from 270 cm to 290 cm may be in the range of from 35 to 60, or from 37 to 47. Purely by way of further non-limitative example, the overall pressure ratio at cruise conditions for a direct drive engine having a fan diameter in the range of from 290 cm to 310 cm may be in the range of from 35 to 60, or from 37 to 47.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than, or may be any of the following: 150 $Nkg^{-1}$ s, 145 $Nkg^{-1}$ s, 140 $Nkg^{-1}$ s, 135 $Nkg^{-1}$ s, 130 $Nkg^{-1}$ s, 125 $Nkg^{-1}$ s, 120 $Nkg^{-1}$ s, 115 $Nkg^{-1}$ s, 110 Nkg-1s, 105 Nkg-1s, 100 Nkg-1s, 99 Nkg-1s, 98 Nkg-1s, 97 Nkg-1s, 96 Nkg-1s, 95 Nkg-1s, 94 Nkg-1s, 93 Nkg-1s, 92 Nkg-1s, 91 Nkg-1s, 90 Nkg-1s, 89 Nkg-1s, 88 Nkg-1s, 87 Nkg-1s, 86 Nkg-1s, 85 Nkg-1s, 80 Nkg-1s, 75 $Nkg^{-1}$ s, 70 $Nkg^{-1}$ s, 65 $Nkg^{-1}$ s, 60 $Nkg^{-1}$ s, 55 $Nkg^{-1}$ s, 50 $Nkg^{-1}$ s, 45 $Nkg^{-1}$ s, 40 $Nkg^{-1}$ s, 35 $Nkg^{-1}$ s, 30 $Nkg^{-1}$ s, 25 $Nkg^{-1}$ s, 20 $Nkg^{-1}$ s or 15 $Nkg^{-1}$ s. The specific thrust at cruise conditions may be in an inclusive range bounded by any two of the values in the previous sentence (i.e. the values may form upper or lower bounds), for example in the range of from 80 Nkg-1s to 100 Nkg-1s, from 85 Nkg-1s to 100 Nkg-1s, or from 92 Nkg-1s to 100 Nkg-1s. Such engines may be particularly efficient in comparison with conventional gas turbine engines. Purely by way of non-limitative example, the specific thrust at cruise conditions of a geared gas turbine engine having a fan diameter in the range of from 200 cm to 210 cm may be in the range of from 90 Nkg-1s to 98 Nkg-1s, or from 92 Nkg-1s to 98 Nkg-1s. Purely by way of non-limitative example, the specific thrust at cruise conditions of a geared gas turbine engine having a fan diameter in the range of from 210 cm to 230 cm may be in the range of from 90 Nkg-1s to 100 Nkg-1s, or from 95 Nkg-1s to 100 Nkg-1s. Purely by way of non-limitative example, the specific thrust at cruise conditions of a geared gas turbine engine having a fan diameter in the range of from 340 cm to 360 cm may be in the range of from 70 Nkg-1s to 95 Nkg-1s, from 80 Nkg-1s to 95 Nkg-1s, or from 85 Nkg-1s to 95 Nkg-1s. Purely by way of non-limitative example, the specific thrust at cruise conditions of a direct drive gas turbine engine having a fan diameter in the range of from 170 cm to 200 cm may be in the range of from 20 Nkg-1s to 90 Nkg-1s, from 20 Nkg-1s to 80 Nkg-1s, or from 25 Nkg-1s to 70 Nkg-1s. Purely by way of non-limitative example, the specific thrust at cruise conditions of a direct drive gas turbine engine having a fan diameter in the range of from 300 cm to 350 cm may be in the range of from 90 Nkg-1s to 120 Nkg-1s, or from 100 Nkg-1s to 115 Nkg-1s. Purely by way of non-limitative example, the specific thrust at cruise conditions of a direct drive gas turbine engine having a fan diameter in the range of from 260 cm to 285 cm may be in the range of from 20 Nkg-1s to 120 Nkg-1s, from 30 Nkg-1s to 115 Nkg-1s, or from 40 Nkg-1s to 115 Nkg-1s. Purely by way of non-limitative example, the specific thrust at cruise conditions of a direct drive gas turbine engine having a fan diameter in the range of from 270 cm to 290 cm may be in the range of from 90 Nkg-1s to 120 Nkg-1s, or from 95 Nkg-1s to 115 Nkg-1s. Purely by way of non-limitative example, the specific thrust at cruise conditions of a direct drive gas turbine engine having a fan diameter in the range of from 290 cm to 310 cm may be in the range of from 95 $Nkg^{-1}$ s to 130 Nkg-1s, or from 105 Nkg-1s to 125 Nkg-1s.

A gas turbine engine as described and/or claimed herein may have any desired maximum thrust. Purely by way of non-limitative example, a gas turbine as described and/or claimed herein may be capable of producing a maximum thrust of at least, or may be any of the following: 60 kN, 70 kN, 80 kN, 90 kN, 100 kN, 105 kN, 110 kN, 115 kN, 120 kN, 125 kN, 130 kN, 131 kN, 132 kN, 133 kN, 134 kN, 135 kN, 136 kN, 137 kN, 138 kN, 139 kN, 140 kN, 141 kN, 142 kN, 143 kN, 144 kN, 145 kN, 146 kN, 147 kN, 148 kN, 149 kN, 150 kN, 151 kN, 152 kN, 153 kN, 154 kN, 155 kN, 160 kN, 170 kN, 180 kN, 190 kN, 200 kN, 250 kN, 300 kN, 350 kN, 375 kN, 400 kN, 425 kN, 450 kN, 475 kN, 500 kN, 525 kN, 550 kN, 600 kN, 650 kN, or 700 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 65 kN to 150 kN, from 105 kN to 150 kN, from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 130 kN to 160 kN, or from 130 kN to 150 kN. Purely by way of non-limitative example, the maximum thrust of a geared gas turbine engine having a fan diameter in the range of from 210 cm to 230 cm may be in the range of from 130 kN to 200 kN, or 135 kN to 180 kN, or 135 kN to 170 kN, or 135 kN to 160 kN, or 135 kN to 150 kN, or 135 kN or 145 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 170 cm to 200 cm may be in the range of from 100 kN to 200 kN, from 110 kN to 180 kN, or from 120 kN to 170 kN. Purely by way of non-limitative example, the maximum thrust of a direct drive gas turbine engine having a fan diameter in the range of from 300 cm to 350 cm may be in the range of from 250 kN to 600 kN, from 270 kN to 550 kN, from 300 kN to 500 kN, from 300 kN to 400 kN or from 425 kN to 525 kN. Purely by way of non-limitative example, the maximum thrust of a direct drive gas turbine engine having a fan diameter in the range of from 260 cm to 285 cm may be in the range of from 250 kN to 450 kN, from 275 kN to 400 kN, or from 275 kN to 375 kN. Purely by way of non-limitative example, the maximum thrust of a direct drive gas turbine engine having a fan diameter in the range of from 270 cm to 290 cm may be in the range of from 250 kN to 500 kN, from 275 kN to 400 kN, or from 300 kN to 375 kN. Purely by way of non-limitative example, the maximum thrust of a direct drive gas turbine engine having a fan diameter in the range of from 290 cm to 310 cm may be in the range of from 250 kN to 550 kN, from 300 kN to 525 kN, or from 325 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor.

At cruise conditions, the TET may be at least, or may be any of the following: 1400K, 1450K, 1455K, 1460K, 1465K, 1470K, 1475K, 1480K, 1490K, 1495K, 1500K, 1505K, 1510K, 1515K, 1520K, 1525K, 1530K, 1535K, 1540K, 1545K, 1550K, 1555K, 1560K, 1565K, 1570K, 1575K, 1580K, 1585K, 1590K, 1595K, 1600K, 1650K, 1700K, or 1750K. The TET at cruise conditions may be in an inclusive range bounded by any two of the values in the previous sentence (i.e. the values may form upper or lower bounds). Thus, purely by way of non-limitative example, the TET at cruise conditions of a geared gas turbine engine having a fan diameter in the range of from 200 cm to 210 cm may be in the range of from 1540K to 1600K, or 1570K to 1590K. Purely by way of non-limitative example, the TET at cruise conditions of a geared gas turbine engine having a fan diameter in the range of from 210 cm to 230 cm may be in the range of from 1525K to 1650K. Purely by way of non-limitative example, the TET at cruise conditions of a geared gas turbine engine having a fan diameter in the range of from 340 cm to 360 cm may be in the range of from 1550K to 1660K, or 1550K to 1600K. Purely by way of non-limitative example, the TET at cruise conditions of a direct drive gas turbine engine having a fan diameter in the range of from 170 cm to 200 cm may be in the range of from 1400K to 1650K, or from 1425K to 1625K. Purely by way of non-limitative example, the TET at cruise conditions of a direct drive gas turbine engine having a fan diameter in the range of from 300 cm to 350 cm may be in the range of from 1400K to 1650K, from 1425K to 1575K, from 1425K to 1525K, or from 1475K to 1550K. Purely by way of non-limitative example, the TET at cruise conditions of a direct drive gas turbine engine having a fan diameter in the range of from 260 cm to 285 cm may be in the range of from 1400K to 1650K, or from 1425K to 1625K. Purely by way of non-limitative example, the TET at cruise conditions of a direct drive gas turbine engine having a fan diameter in the range of from 270 cm to 290 cm may be in the range of from 1400K to 1600K, from 1425K to 1575K, or from 1450K to 1550K. Purely by way of non-limitative example, the TET at cruise conditions of a direct drive gas turbine engine having a fan diameter in the range of from 290 cm to 310 cm may be in the range of from 1400K to 1650K, from 1450K to 1600K, or from 1475K to 1575K. The TET at cruise conditions may be in an inclusive range bounded by any two of the values of TET in the present paragraph (i.e. the values may form upper or lower bounds), for example 1530K to 1600K.

The maximum TET in use of the engine may be at least, or may be any of the following: 1700K, 1750K, 1755K, 1760K, 1765K, 1770K, 1775K, 1780K, 1785K, 1790K, 1795K, 1800K, 1805K, 1810K, 1815K, 1820K, 1825K, 1830K, 1835K, 1840K, 1845K, 1850K, 1855K, 1860K, 1865K, 1870K, 1875K, 1880K, 1885K, 1890K, 1895K, 1900K, 1905K, 1910K, 1915K, 1920K, 1925K, 1930K, 1935K, 1940K, 1945K, 1950K, 1955K, 1960K, 1965K, 1970K, 1975K, 1980K, 1985K, 1990K, 1995K, 2000K, 2050K, or 2100K. The maximum TET in use of the engine may be in an inclusive range bounded by any two of the values of TET in the present paragraph (i.e. the values may form upper or lower bounds). Thus, purely by way of non-limitative example, the maximum TET of a geared gas turbine engine having a fan diameter in the range of from 200 cm to 210 cm may be in the range of from 1800K to 1960K, from 1850K to 1960K, from 1875K to 1960K, from 1900K to 1960K, or from 1900K to 1950K. Purely by way of non-limitative example, the maximum TET of a geared gas turbine engine having a fan diameter in the range of from 210 cm to 230 cm may be in the range of from 1700K to 1960K, from 1750K to 1900K, from 1750K to 1850K, or from 1750K to 1800K. Purely by way of non-limitative example, the maximum TET of a geared gas turbine engine having a fan diameter in the range of from 340 cm to 360 cm may be in the range of from 1800K to 1960K, from 1800K to 1900K, or from 1850K to 1900K. Purely by way of non-limitative example, the maximum TET of a direct drive gas turbine engine having a fan diameter in the range of from 170 cm to 200 cm may be in the range of from 1700K to 1950K, or from 1750K to 1900K. Purely by way of non-limitative example, the maximum TET of a direct drive gas turbine engine having a fan diameter in the range of from 300 cm to 350 cm may be in the range of from 1700K to 1950K, from 1750K to 1900K, or from 1775K to 1900K. Purely by way of non-limitative example, the maximum TET of a direct drive gas turbine engine having a fan diameter in the range of from 260 cm to 285 cm may be in the range of from 1700K to 1950K, or from 1750K to 1900K. Purely by way of non-limitative example, the maximum TET of a direct drive gas turbine engine having a fan diameter in the range of from 270 cm to 290 cm may be in the range of from 1750K to 1950K, or from 1800K to 1900K. Purely by way of non-limitative example, the maximum TET of a direct drive gas turbine engine having a fan diameter in the range of from 290 cm to 310 cm may be in the range of from 1750K to 2000K, or from 1800K to 1950K. The maximum TET may occur, for example, at a high thrust condition, for example at a maximum take-off (MTO) condition.

A gas turbine engine as described and/or claimed herein may have any desired high-pressure compressor size, also known as core size. The core size defines the size of the core of the engine. Engine core size can be defined as:

$$\text{Core size} = \dot{m}_2 \frac{\sqrt{T_3}}{P_3}$$

Where $\dot{m}_2$=the mass flow rate, in lbs per second, of air on entry to the high-pressure compressor, $T_3$=the temperature, in Kelvin, of air on exit from the high-pressure compressor, and $P_3$=the pressure, in lb inches per second squared per inch squared, of air on exit from the high-pressure compressor. A unit of core size is therefore expressed as:

$$s \cdot K^{\frac{1}{2}} \cdot in$$

At cruise conditions, the core size may be at least, or may be any of the following: 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20. The core size at cruise conditions may be in an inclusive range bounded by any two of the values in the previous sentence (i.e. the values may form upper or lower bounds). Thus, purely by way of non-limitative example, the core size at cruise conditions of a geared gas turbine engine having a fan diameter in the range of from 200 cm to 210 cm may be in the range of from 3 to 8, 3.5 to 7, 4 to 6.5, 4.5 to 6.5, or 5 to 6. Purely by way of non-limitative example, the core size at cruise conditions of a geared gas turbine engine having a fan diameter in the range of from 210 cm to 230 cm may be in the range of from 7 to 15, 8 to 14, 9 to 13, 10 to 12.5 or 11 to 12. Purely by way of non-limitative example, the core size at cruise conditions of a geared gas turbine engine having a fan diameter in the range of from 340 cm to 360 cm may be in the range of from 5 to 13, 6.5 to 12.5, 7.5 to 11.5, 8.5 to 10.5, or 9 to 10.

Purely by way of non-limitative example, the core size at cruise conditions of a direct drive gas turbine engine having a fan diameter in the range of from 170 cm to 200 cm may be in the range of from 3 to 12, 3.5 to 11, 3.5 to 10, 3.5 to 9, 3.5 to 8, 4 to 7, 4 to 6.5, 4.5 to 6.5, or 5 to 6. Purely by way of non-limitative example, the core size at cruise conditions of a direct drive gas turbine engine having a fan diameter in the range of from 300 cm to 350 cm may be in the range of from 9 to 17, 10 to 16, 11 to 16, 13 to 14.5 or 13 to 14. Purely by way of non-limitative example, the core size at cruise conditions of a direct drive gas turbine engine having a fan diameter in the range of from 260 cm to 285 cm may be in the range of from 3 to 12, 3.5 to 11, 3.5 to 10, 3.5 to 9, 3.5 to 8, 4 to 7, 4 to 6.5, 4.5 to 6.5, or 5 to 6. Purely by way of non-limitative example, the core size at cruise conditions of a direct drive gas turbine engine having a fan diameter in the range of from 270 cm to 290 cm may be in the range of from may be in the range of from 9 to 13, 10.5 to 12.5, or 11 to 12. Purely by way of non-limitative example, the core size at cruise conditions of a direct drive gas turbine engine having a fan diameter in the range of from 290 cm to 310 cm may be in the range of from 11 to 16, 12 to 15, 13 to 15, or 13 to 14.5. The core size at cruise conditions may be in an inclusive range bounded by any two of the values of core size above (i.e. the values may form upper or lower bounds), for example 4.5 to 9.5.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge. The fan blade may have a weight of at least, or may be any of the following: 3.0 kg, 3.5 kg, 4.0 kg, 4.5 kg, 5.0 kg, 5.5 kg, 6.0 kg, 6.5 kg, 7.0 kg, 7.5 kg, 8.0 kg, 8.5 kg, 9.0 kg, 9.5 kg, 10.0 kg, 10.5 kg, 11.0 kg, 11.5 kg, 12.0 kg, 12.5 kg, 13.0 kg, 13.5 kg, 14.0 kg, 14.5 kg, 15.0 kg, 15.5 kg, 16.0 kg, 16.5 kg, 17.0 kg, 17.5 kg, 18.0 kg, 18.5 kg, 19.0 kg, 19.5 kg, or 20.0 kg. The weight of the fan blade may be in an inclusive range bounded by any two of the values of fan blade weight in the previous sentence (i.e. the values may form upper or lower bounds). For example, the weight of the fan blade for a "geared" gas turbine engine having a fan diameter in the range of from 200 cm to 230 may be in the range of from 3.0 kg to 6.0 kg, or 4.0 kg to 6.0 kg, or from 5.0 kg to 5.5 kg.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 14, 16 or 18 fan blades. Where the fan blades have a metallic body (for example aluminium-lithium or titanium-alloy), there may be 18, 20 or 22 fan blades.

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propeller stages may be driven by a gearbox. The gearbox may be of the type described herein.

As used herein, the terms idle, taxi, take-off, climb, cruise, descent, approach, and landing (or one or more portions thereof) have the conventional meaning and would be readily understood by the skilled person. Thus, for a given gas turbine engine for an aircraft, the skilled person would immediately recognise each term to refer to the entirety, or one or more portions, of an operating phase of the engine within a given mission of an aircraft to which the gas turbine engine is designed to be attached.

Purely by way of non-limitative example, ground idle may refer to an operating phase of the engine where the aircraft is stationary and in contact with the ground, but where there is a requirement for the engine to be running. For example, during idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Purely by way of non-limitative example, taxi may refer to an operating phase of the engine where the aircraft is being propelled along the ground by the thrust produced by the engine. For example, during taxi, the engine may be producing between 5% and 15% of available thrust. In further non-limitative examples, the engine may be producing between 6% and 12% of available thrust. In further non-limitative examples, the engine may be producing between 7% and 10% of available thrust. Purely by way of non-limitative example, take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. For example, during take-off, the engine may be producing between 90% and 100% of available thrust. In further non-limitative examples, the engine may be producing between 95% and 100% of available thrust. In further non-limitative examples, the engine may be producing 100% of available thrust.

Purely by way of non-limitative example, climb may refer to an operating phase of the engine where the aircraft is being propelled by the thrust produced by the engine. For example, during climb, the engine may be producing between 75% and 100% of available thrust. In further non-limitative examples, the engine may be producing between 80% and 95% of available thrust. In further non-limitative examples, the engine may be producing between 85% and 90% of available thrust. For example, climb may refer to an operating phase within an aircraft flight cycle between take-off and the arrival at cruise conditions, the arrival at cruise conditions thus defining the onset of the cruise phase, or a portion thereof, of the aircraft flight. Additionally or alternatively, climb may refer to, for example, a nominal point in, or one or more nominal periods during, an aircraft flight cycle between take-off and landing, where a relative increase in altitude is required, which may require an additional thrust demand of the engine.

As used herein, cruise conditions, which may define the cruise phase, have the conventional meaning and would be readily understood by the skilled person. Thus for a given gas turbine engine for an aircraft, cruise conditions may refer to the operating point of the engine at mid-cruise of a given mission (which may be referred to in the industry as the "economic mission") of an aircraft to which the gas turbine engine is designed to be attached. In this regard, mid-cruise may be regarded as the point in an aircraft flight cycle at which 50% of the total fuel that is burned between top of climb and start of descent has been burned (which may be approximated by the midpoint—in terms of time and/or distance—between top of climb and start of descent). Cruise conditions may thus define an operating point of the gas turbine engine that provides a thrust that would ensure steady state operation (i.e. maintaining a constant altitude and/or a constant Mach Number), or at least a substantially steady state operation (i.e. maintaining an at least substantially constant altitude and/or an at least substantially constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine may provide half of the total thrust that would be required for steady state operation, or at least a substantially steady state operation, of that aircraft at mid-cruise.

In other words, for a given gas turbine engine for an aircraft, cruise conditions may be defined as the operating point of the engine that provides a specified thrust (required to provide—in combination with any other engines on the aircraft—a steady state operation, or at least a substantially steady state operation, of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions may be clearly defined.

Purely by way of non-limitative example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.78, 0.79, or 0.8, on the order of Mach 0.85 or in the range of from 0.8 to 0.85. Any single speed within these ranges may be part of the cruise condition. For some aircraft, the cruise conditions may be outside these ranges, for example, below Mach 0.7 or above Mach 0.9.

Purely by way of non-limitative example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of non-limitative example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft, with approach in particular forming part of the landing and take-off (LTO) phase. Purely by way of non-limitative example, during either or both of descent and approach, the engine may be producing less than 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, cruise conditions according to this aspect may correspond to the mid-cruise of the aircraft, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

In use, at any one of more of the operating conditions and/or thrust settings disclosed or described herein, a reduction in percentage $CO_2$ mass emissions index (EI), provided by any one or more of the gas turbine engine configurations disclosed or described herein, may be greater than or equal to any of the following: 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.22, 0.24, 0.26, 0.28, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.5, 5, 5.5, or 6, when the fuel provided to the combustor comprises sustainable aviation fuel, or a sustainable aviation fuel blend comprising up to 100% sustainable aviation fuel. The percentage $CO_2$ emissions index (EI) may be expressed in kg of $CO_2$ per kg of fuel. The percentage reduction provided may be in an inclusive range bounded by any two of the values in the previous sentence (i.e. the values may form upper or lower bounds), for example in the range of from 0.4 to 2.5, from 0.42 to 2.08, or from 0.43 to 2.08.

Purely by way of non-limitative example, the reduction in percentage $CO_2$ emissions index (EI) may result from the fuel provided to the combustor comprising a hydrogen mass fraction percentage of greater than any one of the following: 13.4, 13.41, 13.42, 13.43, 13.44, 13.45, 13.46, 13.47, 13.48, 13.49, 13.5, 13.51, 13.52, 13.53, 13.54, 13.55, 13.56, 13.57, 13.58, 13.59, 13.6, 13.65, 13.7, 13.75, 13.8, 13.85, 13.9, 13.95, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.5, 17, or 17.5. The hydrogen mass fraction % of the fuel may be in an inclusive range bounded by any two of the values in the previous sentence (i.e. the values may form upper or lower bounds), for example in the range of from 13.41 to 15.3, or from 13.42 to 15.3.

In use, at any one of more of the operating conditions and/or thrust settings disclosed or described herein, a reduction in percentage $CO_2$ per MJ of fuel energy, provided by any one or more of the gas turbine engine configurations disclosed or described herein, may be greater than or equal to any of the following: 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.22, 0.24, 0.26, 0.28, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.5, 6.5, 7, or 7.5, when the fuel provided to the combustor comprises sustainable aviation fuel, or a sustainable aviation fuel blend comprising up to 100% sustainable aviation fuel. The percentage reduction provided may be in an inclusive range bounded by any two of the values in the previous sentence (i.e. the values may form upper or lower bounds), for example in the range of from 0.8 to 5, from 0.88 to 4.75, or from 0.89 to 4.75.

Purely by way of non-limitative example, the reduction in percentage $CO_2$ per MJ of fuel energy may result from the fuel provided to the combustor comprising a specific fuel energy (in MJ per kg) of greater than any one of the following: 41.5, 41.6, 41.7, 41.8, 41.9, 42, 42.1, 42.2, 42.3, 42.4, 42.5, 42.6, 42.7, 42.8, 42.9, 43, 43.1, 43.2, 43.3, 43.4, 43.5, 43.6, 43.7, 43.8, 43.9, 44, 44.5, 45, 45.5, or 46. The specific fuel energy of the fuel may be in an inclusive range bounded by any two of the values in the previous sentence (i.e. the values may form upper or lower bounds), for example in the range of from 42.8 to 45, from 43 to 44.5, or from 43 to 44.

As used herein, unless otherwise stated, a range "from value X to value Y" or "between value X and value Y", or the likes, denotes an inclusive range; including the bounding values of X and Y.

The skilled person will appreciate that except where mutually exclusive, a feature or parameter described in relation to any one of the above aspects may be applied to any other aspect. Furthermore, except where mutually exclusive, any feature or parameter contained or described herein may be applied to any aspect and/or combined with any other feature or parameter contained or described herein.

Except where mutually exclusive, any parameter or value contained or described herein may be applied to and/or combined with any one or more further parameters and/or or values contained or described herein. For example, a first parameter or value contained or described herein (for example, parameter A) may be applied to and/or combined with any one or more further parameters and/or values contained or described herein (for example, any one or more of parameter B; parameter C; and parameter D, and so on) to express their relationship. For example, the Skilled Person would understand that where parameter A is disclosed in separation to parameter B, their relationship may be expressed as, for example, A+B, B−A, A−B, A/B, B/A, B*A, or any such further product, application, combination, function, or expression of parameter A relative to parameter B, or vice-versa, as required.

Except where mutually exclusive, any parameters or values related to those contained or described herein or determinable and/or inferable therefrom may be applied to and/or combined with any one or more further parameters or values contained or described herein and/or any such further parameters or values related to those contained or described herein or determinable and/or inferable therefrom, to express their relationship in relation to engine emissions and/or nvPM. For example, utilising related determinable and/or inferable temperatures, pressures, operating parameters, rotational speeds, flow rates, or engine operating conditions, a first parameter or value (for example, parameter A) may be applied to and/or combined with any one or more further parameters or values (for example, any one or more of parameter B; parameter C; and parameter D, and so on), to express their relationship in relation to engine emissions and/or nvPM. For example, the Skilled Person would understand that where parameter C may be considered in separation to parameter D, their relationship may be expressed as, for example, C+D, C−D, C−D, C/D, C/D, C*D, or any such further product, application, combination, function, or expression of parameter C relative to parameter D, or vice-versa, as required.

BRIEF DESCRIPTION OF THE DRAWINGS

Embodiments will now be described by way of example only, with reference to the Figures, in which.

DETAILED DESCRIPTION OF THE DISCLOSURE

Figure 1:
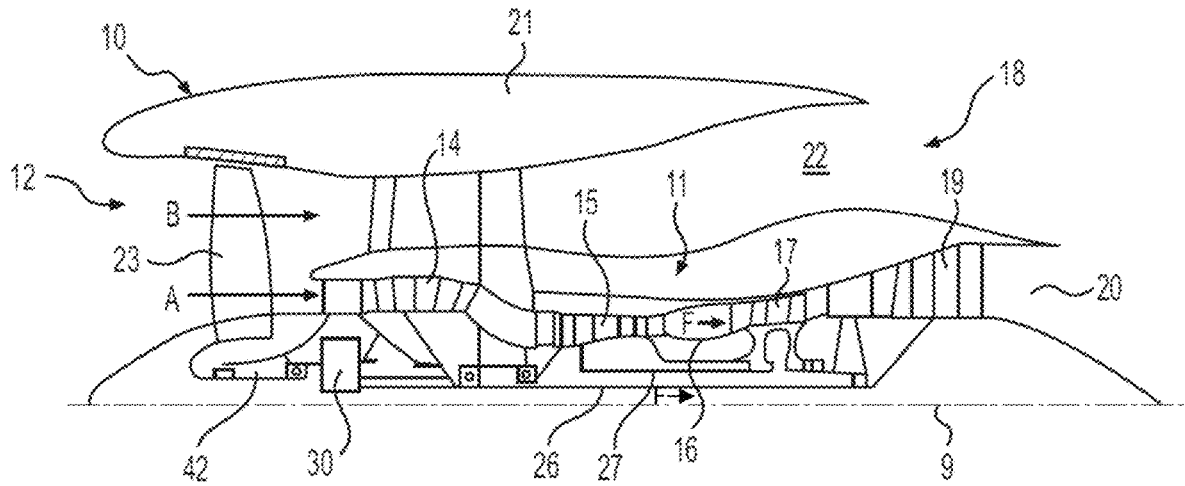
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a first, low pressure shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting second, high pressure shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

Figure 2:
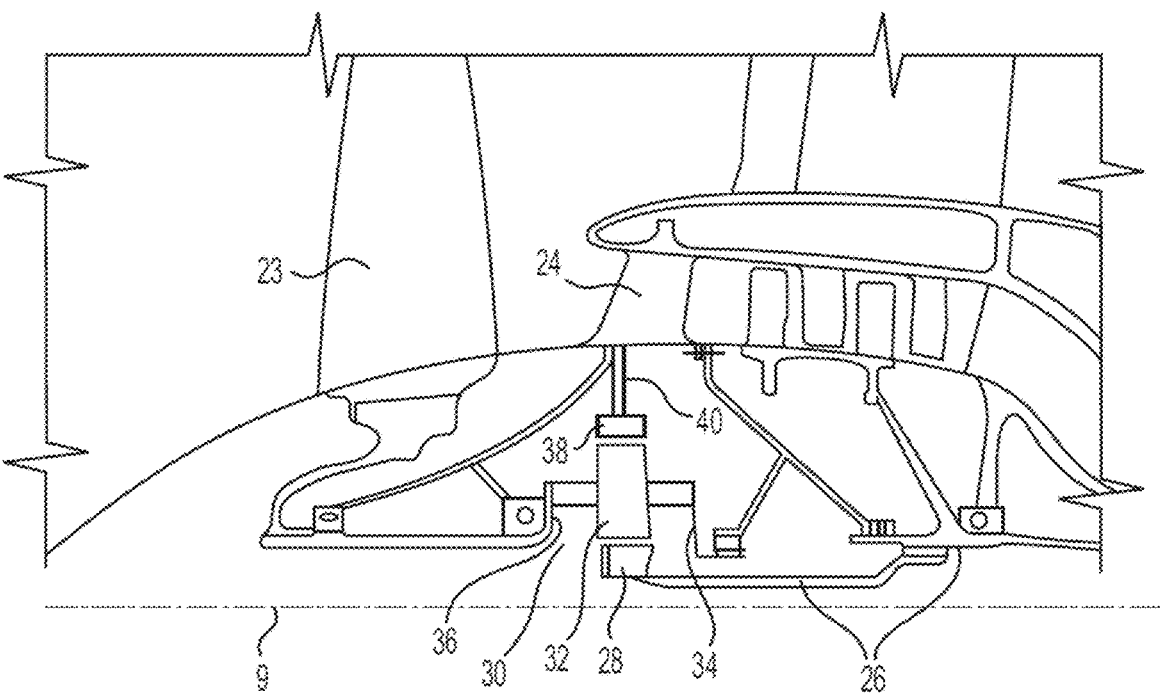
FIG. 2 is a close up sectional side view of an upstream portion of a geared gas turbine engine.

An exemplary arrangement for a geared fan gas turbine engine 10 is shown in FIG. 2. The low pressure turbine 19 (see FIG. 1) drives the low pressure shaft 26, which is coupled to a sun wheel, or sun gear, 28 of the epicyclic gearbox 30. The low pressure shaft 26 may be referred to as an input shaft for the epicyclic gearbox 30. Radially outward of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 through an output fan shaft 42 in order to drive the fan 23 in rotation about the engine axis 9. Radially outward of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft (26) with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
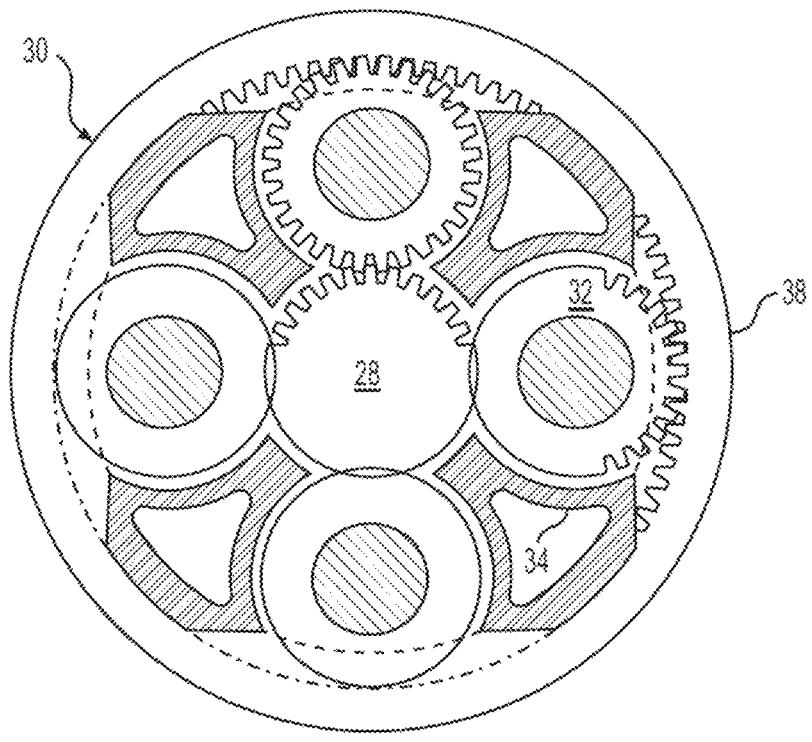
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32, for example five planet gears 32.

The epicyclic gearbox 30 illustrated by way of example in FIGS. 2 and 3 is of the planetary type, in that the planet carrier 34 is coupled to the output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIG. 2 and FIG. 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the stationary supporting structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle (the bypass exhaust nozzle 18) that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

By way of further example, other gas turbine engines to which the present disclosure may be applied may have no gearbox for the main shaft(s), instead being direct drive engines. A cross-sectional view of one such engine is shown in FIG. 4.

Figure 4:
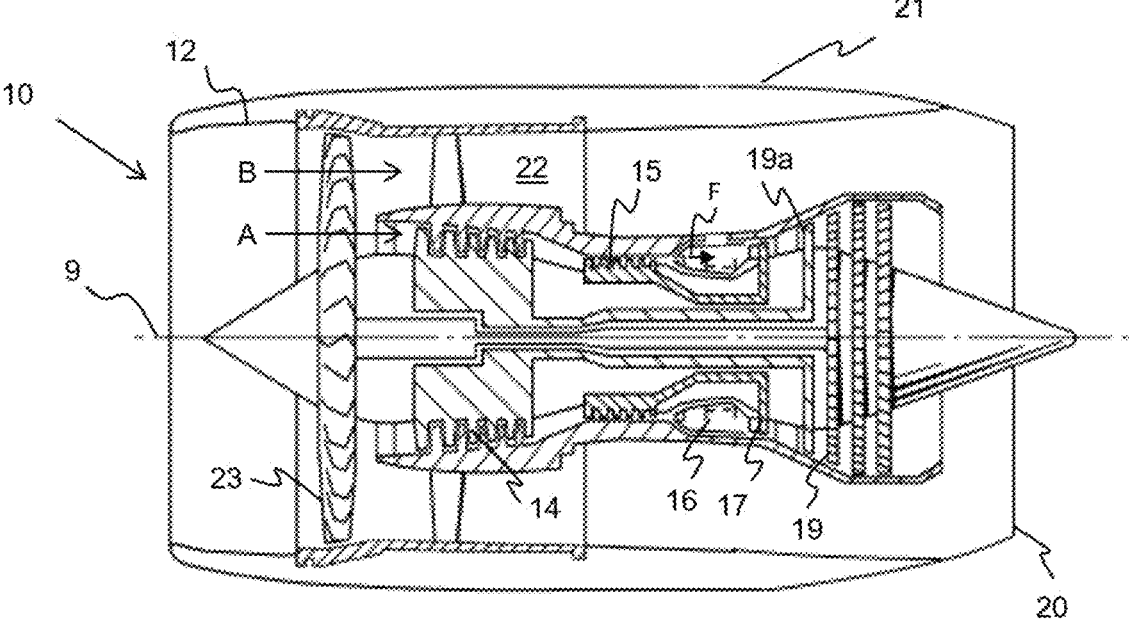
FIG. 4 is a close up sectional side view of a direct drive gas turbine engine.

With reference to FIG. 4, a gas turbine engine is generally indicated at 10, having a principal rotational axis 9. The engine 10 comprises, in axial flow series, an air intake 12, a propulsive fan 23, an intermediate pressure compressor 14, a high pressure compressor 15, combustion equipment 16, a high pressure turbine 17, an intermediate pressure turbine 19a, a low-pressure turbine 19 and an exhaust nozzle 20. A nacelle 21 surrounds the engine 10 and defines both the intake 12 and the exhaust nozzle 20.

In use, air entering the intake 12 is accelerated by the fan 23 to produce two air flows: a core airflow A and a bypass airflow B. The core airflow A flows into the intermediate pressure compressor 14, and the bypass air flow B passes through a bypass duct 22 to provide propulsive thrust. The intermediate pressure compressor 14 compresses the airflow A before delivering that air to the high pressure compressor 15 where further compression takes place.

The compressed air exhausted from the high-pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high, intermediate, and low-pressure turbines 17, 19a, 19 before being exhausted through the nozzle 20 to provide additional propulsive thrust. The high 17, intermediate 19a and low 19 pressure turbines drive respectively the high pressure compressor 15, intermediate pressure compressor 14 and fan 23, each by a suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial and circumferential directions are mutually perpendicular.

Figure 5:
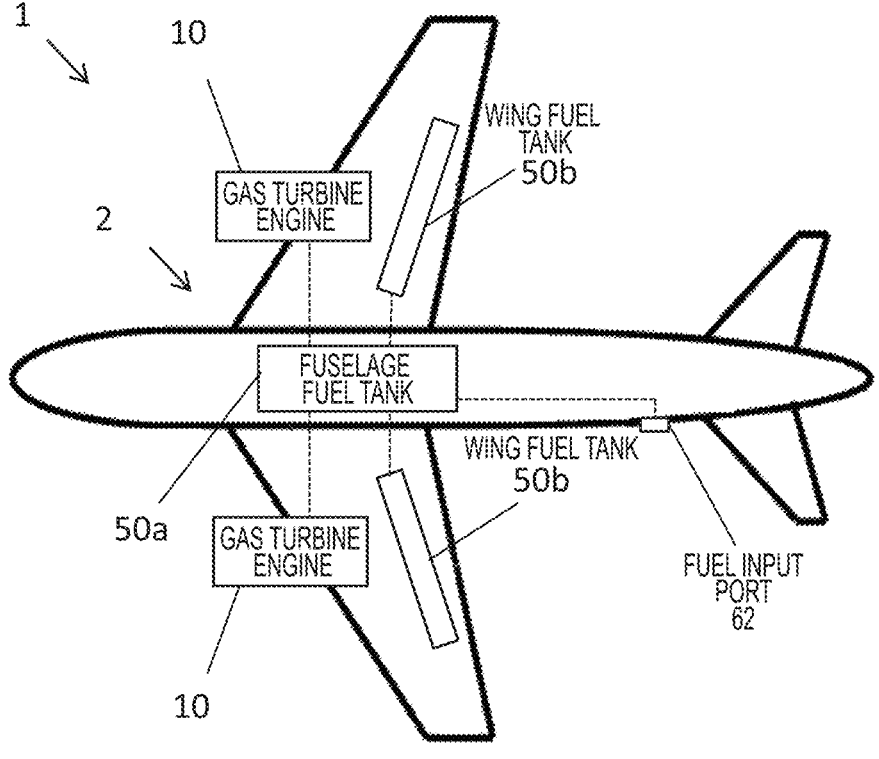
FIG. 5 is a schematic view of an aircraft having two gas turbine engines of the present application mounted thereon.

FIG. 5 shows an aircraft 1 on which two gas turbine engines 10 of the present disclosure are mounted, one on each wing. The aircraft 1 comprises a fuel system 2 which comprises a fuselage fuel tank 50a and two wing fuel tanks 50b. Fuel F is provided from the fuel system to the gas turbine engines. The fuel tanks 50a, 50b are supplied with fuel from a fuel input port 62. Other fuel systems may be used with other layouts of fuel tank.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. As there is an expectation in the aviation industry of a trend towards the use of fuels different from the traditional kerosene-based jet fuels generally used at present, when blended with, mixed with, or replaced by an alternative fuel, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

SAF is understood by the Skilled Person to refer to, for example, a biofuel, renewable aviation fuel, renewable jet fuel, alternative fuel or biojet fuel, produced from biological or non-biological resources. SAF is understood to be commonly synthesised from carbon-containing gasses drawn out of the atmosphere and/or captured from industrial processes; or from a wide range of sustainable feedstocks such as, for example, waste oil and fats; municipal solid waste; cellulosic waste (such as corn stalks); cover crops such as camelina, *carinata*, and pennycress; non-biogenic alternative fuels; jatropha; halophytes and algae, rather than from fossil-based hydrocarbons. SAF is understood as not encompassing fossil fuels.

Functional performance of a given fuel composition, or blend of fuel F for use in a given mission, may be defined, at least in part, by the ability of the fuel to service the Brayton cycle of the gas turbine engine 10. Parameters defining functional performance may include, for example, specific energy; energy density; thermal stability; and, emissions including gaseous and/or particulate matter. In this regard, particulate matter emissions may include soot particles created by the combustion of said fuel F, also known as non-volatile particulate matter (nvPM). Any reference herein to soot or smoke may apply equally to other types of particulate matter emissions known within the art. Gaseous emissions may include any one or more of nitrogen oxides (NOx); carbon monoxide (CO); carbon dioxide (CO2); unburned hydrocarbons (UHC); sulphur oxides (SOx) including, for example, sulphur dioxide (SO2) and/or sulphur trioxide (SO3); and, volatile organic compounds (VOC) created by the combustion of said fuel F. Any reference herein to gaseous emissions may apply equally to other types of gaseous emissions known within the art.

A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (C) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. In some examples, fossil-based hydrocarbon fuels may comprise molecules with approximately 7 to 18 carbon atoms, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of up to 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. In some examples, sustainable aviation fuels may comprise either or both of a density of below 100%, for example between 90% and 98%, that of kerosene and a specific energy of above 100%, for example between 101% and 105%, that of kerosene. For example, the calorific value of sustainable aviation fuels may be between 101% and 105% that of kerosene.

In some examples, the sustainable aviation fuel(s), or blend(s) provided to the combustion equipment 16 may be relatively lower in aromatic and/or other non-paraffinic content than that of kerosene. The sustainable aviation fuel may comprise an aromatic content of e.g. 30%, 20%, 15%, 10%, 8%, 5%, or less than 5%; e.g. 4%, 3%, 2%, 1%, or less than 1%; e.g. 0.75%, 0.5%, 0.25%, or less than 0.25%; e.g. 0.2%, 0.1%, or less than 0.1%; e.g. 0.01%, 0.001%, or 0%. The aromatic content of the sustainable aviation fuel may be in an inclusive figure or range bounded by or within any two of the values in the previous sentence (i.e. the values may form upper or lower bounds), e.g. 13.5%, 8.5%, 2.5%, 0.35%, 0.15%, 0.05%, 0.005%, or 0%; or 0% to 0.75%, 0% to 0.5%, or 0.1% to 0.25%; or 0.15% to 0.65%, 0.35% to 0.55%, or 0.035% to 0.055%; according to one or more of preference, fuel stock or supplier, and compositional variation therein.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; lower NOx; and, lower CO2 emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 6:
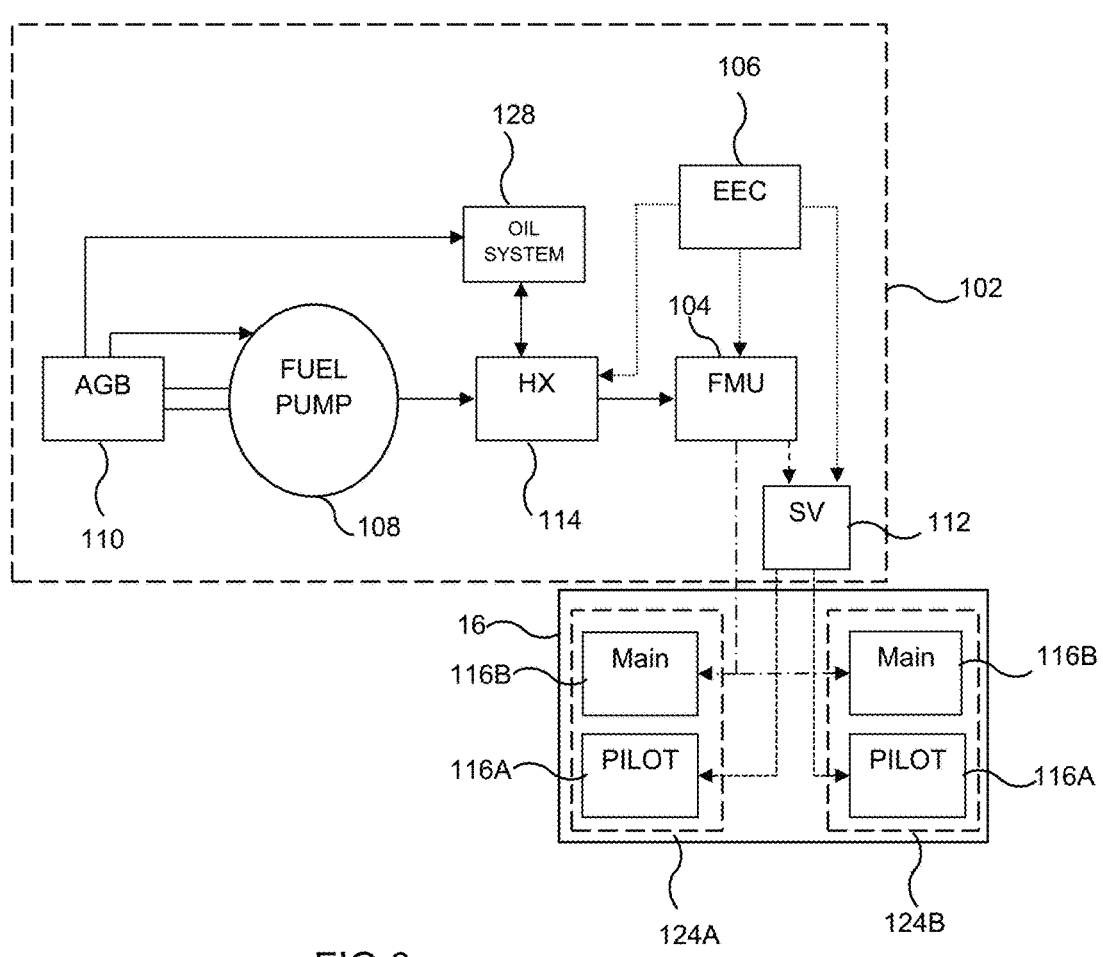
FIG. 6 is a schematic representation of a fuel distribution system and the combustor of a gas turbine engine.

FIG. 6 shows a schematic representation of a fuel distribution system 102 and the combustor 16 of the gas turbine engine 10 of any example described herein. The combustor 16 is configured to utilise staged lean-burn combustion. Fuel is divided amongst pilot fuel injectors and main fuel injectors by means of a fuel system controller, which in the example shown is provided by a fuel metering unit (FMU) 104 under control of an electronic engine controller (EEC) 106. Fuel is delivered to the fuel metering unit 104 by a fuel pump 108. In the example shown, the fuel pump 108 is mechanically driven by an accessory gearbox (AGB) 110, although the fuel pump 108 may alternatively be electrically driven. The fuel pump 108 shown in FIG. 6 may be one of multiple fuel pumps provided within the fuel distribution system 102. For example, the fuel pump 108 may be a high pressure fuel pump provided on the gas turbine engine 10, with one or more additional lower pressure fuel pumps also being provided, optionally onboard the aircraft rather than forming part of the gas turbine engine 10.

High-pressure fuel is delivered by the fuel metering unit 104 into one or more fuel manifolds for distribution to pilot fuel injectors 116A and main fuel injectors 116B. Delivery of fuel via the pilot fuel injectors 116A and main fuel injectors 116B is staged, thus at low powers (and hence low air mass flows) fuel is primarily or wholly delivered by the pilot fuel injectors 116A at a rich fuel-air ratio (i.e. at an equivalence ratio greater than unity) for improved flame stability. As power and mass flow increases, a staging point is reached at which fuel is delivered by some or all of the main fuel injectors 116B, supplementing the fuel flow from the pilot fuel injectors 116A. The main fuel injectors 116B are configured to inject fuel at a lean fuel-air ratio (i.e. at an equivalence ratio less than unity). At this point, air flow is such that the equivalence ratio immediately downstream of the pilot fuel injectors 116A is also fuel-lean. In the example shown, at higher power levels, fuel is injected by all main fuel injectors 116B.

Those skilled in the art will be familiar with such operation of staged combustion systems in order to effect lean burn at high powers whilst also observing flammability limits at lower powers.

The balance of injection of fuel by the pilot fuel injectors 116A and the main fuel injectors 116B is controlled by the electronic engine controller 106, which provides control signals to the fuel metering unit 104. The control signals may be directly or indirectly indicative of the total fuel that must be injected, for example in the form of a fuel flow rate and the ratio of pilot fuel injector fuel flow to main injector fuel flow.

Figure 7:
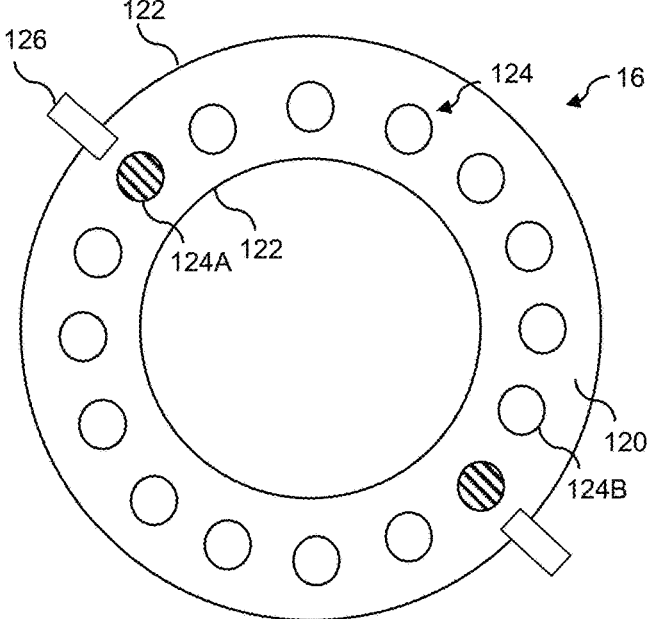
FIG. 7 is a cross-sectional view through the combustor of a gas turbine engine along the principal rotational axis of the engine.

FIG. 7 shows a section through the combustor 16 in a plane normal to the principal rotational axis 9 of the engine 10. The combustor 16 comprises an annular combustion chamber 120, defined by a liner 122. Other combustor configurations may alternatively be used, for example cannular combustors, canned combustors, etc.

The combustor 16 comprises a plurality of fuel spray nozzles 124 arranged about a circumference of the combustor 16 and configured to inject fuel into the combustion chamber 120. In the example shown, the combustor 16 comprises sixteen (16) fuel spray nozzles 124. The combustor 16 may alternatively comprise any suitable number of fuel spray nozzles, for example, 8, 9, 10, 11, 12, 13, 14, 15, 17, 18, 19, 20, 21, 22, 23, 24, 25, 26, 27, 28, 29, 30 fuel spray nozzles, and so on. The combustor may comprise a number of fuel spray nozzles in an inclusive range defined between any two of the values in the previous sentence, the two values forming the upper and lower bounds of the range and being included in the range. For example, the combustor may comprise between 14 and 27 fuel spray nozzles, or between 16 and 25 fuel spray nozzles or between 18 and 23 fuel spray nozzles.

A core size of a gas turbine engine is defined as (with reference to the arrangement shown in FIG. 1):

$$\text{core size} = \dot{m}_2 \cdot \frac{\sqrt{T_3}}{P_3}$$

where $\dot{m}_2$ is the mass flow rate, in lbs per second, of air on entry to the high-pressure compressor 15, $T_3$ is the temperature, in Kelvin, of air on exit from the high pressure compressor 15, and $P_3$ is the pressure, in lb inches per second squared per inch squared, of air on exit from the high-pressure compressor 15. A unit of core size is therefore expressed as:

$$s \cdot K^{\frac{1}{2}} \cdot in$$

The core size (in $s \cdot K^{1/2} \cdot in$) of the engine may be between 4 and 7, for example 4, 4.5, 5, 5.5, 6, 6.5, or 7, or any range defined between any two of these values. In some examples, the engine core size (in $s \cdot K^{1/2} \cdot in$) may be in the range of 5.0, 5.1, 5.2, 5.3, 5.4, 5.5, 5.6, 5.6, 5.7, 5.8, 5.9, or 6, or any range defined between any two of these values. In yet further examples, the engine core size (in $s \cdot K^{1/2} \cdot in$) may be in the range of 5.25, 5.26, 5.27, 5.28, 5.29, 5.30, 5.31, 5.32, 5.33, 5.34, 5.35, 5.36, 5.37, 5.38, 5.39, 5.40, 5.41, 5.42, 5.43, 5.44, or 5.45, or any range defined between any two of these values.

A number of fuel spray nozzles 124 per unit engine core size (in $s \cdot K^{1/2} \cdot in$) may be between 2 and 6. The number may be, for example 2, 3, 4, 5, or 6, or any range defined between any two of those values. In some examples, the number may be between 3 and 4, for example 3.0, 3.1, 3.2, 3.3, 3.4, 3.5, 3.6, 3.7, 3.8, 3.9, or 4.0, or any range defined between any two of these values.

The number of fuel spray nozzles per unit engine core size may be between 2 and 7, or more preferably between 2.1 and 6.5, or more preferably between 2.4 and 3.4.

In yet further examples, the number of fuel spray nozzles per unit engine core size may be 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, or within a range defined between any two of those values.

The core size is defined herein at an engine operation condition corresponding to a maximum value of the semi-non-dimensional flow at high pressure compressor entry, defined as:

$$\dot{m}_2 \frac{\sqrt{T_2}}{P_2}$$

where $\dot{m}_2$ is the mass flow rate (in lbs per second) of air on entry to the high-pressure compressor, $T_2$ is the temperature (in Kelvin) of air on entry to the high pressure compressor, and $P_2$ is the pressure (in lb inches per second squared per inch squared) of air on entry to the high-pressure compressor.

The operating condition corresponding to the maximum semi-non-dimensional flow at high pressure compressor entry may be the top of climb operating condition. The core size referred to herein may therefore be defined at the top of climb operating condition. The top of climb may be as defined in the art and as understood by the skilled person for a specific implementation of a gas turbine engine of the present application. In one specific example, the top of climb may correspond to operating at an altitude of between 30,000 ft to 39,000 ft (more specifically 35,000 ft), a forward speed of Mach Number 0.75 to 0.85, and ambient air temperature (TAMB) of ISA+10K to ISA+15K.

In the example shown, each fuel spray nozzle 124 comprises a duplex fuel spray nozzle (also known as an internally-staged nozzle) in which a pilot fuel injector 116A is integrated in the same fuel spray nozzle 124 as a main fuel injector 116B. However, it is envisaged that other types of staged combustion configurations may be used, for example those with pilot fuel injectors and main fuel injectors in separate fuel spray nozzles rather than both contained in duplex or internally staged fuel spray nozzles. Indeed, it will be understood that the principles disclosed herein may be applied to any staged combustion system comprising pilot fuel injectors and main fuel injectors.

Returning to FIG. 6, the fuel distribution system 102 comprises a splitter valve (SV) 112 configured to split fuel flow between the fuel spray nozzles 124 of the combustor 16 such that pilot injectors 116A of a first subset 124A of the fuel spray nozzles 124 are each supplied with fuel at a greater fuel flow rate than each pilot injector 116A of a second subset 124B of the spray nozzles 124 below a staging point, for example up to a threshold fuel flow rate or engine power. Below the staging point, the pilot injectors of the second subset 124B may receive no fuel, or may be supplied with fuel at a lower fuel flow rate compared to those of the first subset 124A. Below the staging point, no fuel is supplied to the main injectors 116B. Above the staging point, all of the pilot injectors 116A may be supplied with fuel at the same fuel flow rate. In the present example, the first and second subsets 124A, 124B of fuel spray nozzles include all fuel spray nozzles provided in the combustor as shown in FIG. 7. The electronic engine controller 106 is configured to control the splitter valve 112, although the splitter valve 112 may alternatively be mechanically controlled or have a fixed configuration.

In the example shown in FIG. 7, the first subset 124A of fuel spray nozzles 124 comprises 2 fuel spray nozzles 124 (shown in hatched lines). The first subset 124A of fuel spray nozzles 124 may alternatively comprise any suitable number of fuel spray nozzles 124, for example, 1, 3, 4, 5, 6, 7, 8, 9, 10 or more of the fuel spray nozzles 124, or a number within a range defined between any two of those values. For example, the first subset 124A of fuel spray nozzles may comprise between 2 and 6 fuel spray nozzles. The second subset 124B of fuel spray nozzles may comprise between 16 and 20 fuel spray nozzles, or between 13 and 17 fuel spray nozzles. Alternatively, the fuel distribution system 102 may not comprise a splitter valve, and the pilot injectors 116A of the fuel spray nozzles 124 may each receive substantially the same amount of fuel below a staging point.

In some examples, the ratio of the number of fuel spray nozzles in the first subset of fuel spray nozzles to the number of fuel spray nozzles in the second subset of fuel spray nozzles may be in the range of 1:2 to 1:5 and more preferably in the range 1:3 to 1:4.

Even more preferably, in some examples, the ratio of the number of fuel spray nozzles in the first subset of fuel spray nozzles to the number of fuel spray nozzles in the second subset of fuel spray nozzles may be in the range of 1:3.5 to 1:4.

In some examples, the first subset of fuel spray nozzles may include between 1 and 10 fuel spray nozzles, and more preferably between 3 and 5 fuel spray nozzles.

In some examples, the second subset of fuel spray nozzles may include between 10 and 25 fuel spray nozzles, and more preferably between 13 and 20, and yet more preferably between 13 and 17.

In some examples, the total number of fuel spray nozzles may be 8, 9, 10, 11, 12, 13, 14, 15, 16, 17, 18, 19, 20, 21, 22, 23, 24, 25, 26, 27, 28, 29, or 30, or any inclusive range defined between any two of those values, the two values forming the upper and lower bounds of the range and being included in the range.

In some examples, the first subset of fuel spray nozzles may include 1, 2, 3, 4, 5, 6, 7, 8, 9, 10, or any range defined between any two of those values.

In some examples, the second subset of fuel spray nozzles may include 10, 11, 12, 13, 14, 15, 16, 17, 18, 19, 20, 21, 22, 23, 24, 25, or any range defined between any two of those values.

In the example shown in FIG. 7, the fuel spray nozzles 124 of the first subset 124A of fuel spray nozzles 124 are disposed within the combustor 16 such that they are located nearer one or more ignitors 126 of the combustor 16 than those of the second subset 124B of fuel spray nozzles 124. However, that is not essential, and the first subset 124A of fuel spray nozzles 124 may be disposed at any suitable location within the combustor 16. In the example shown, the combustor 16 comprises 2 ignitors arranged substantially diametrically opposite one another. However, the combustor 16 may comprise any suitable number of ignitors, for example, 1, 2, 3, 4, 5, 6, 7, 8, 9, 10, or any range defined between any two of those values, for example between 1 and 6, or between 2 and 6, or between 2 and 4. The one or more ignitors 126 may be disposed at any suitable location in the combustor 16 and need not be symmetrically arranged within the combustor 16.

Figure 8:
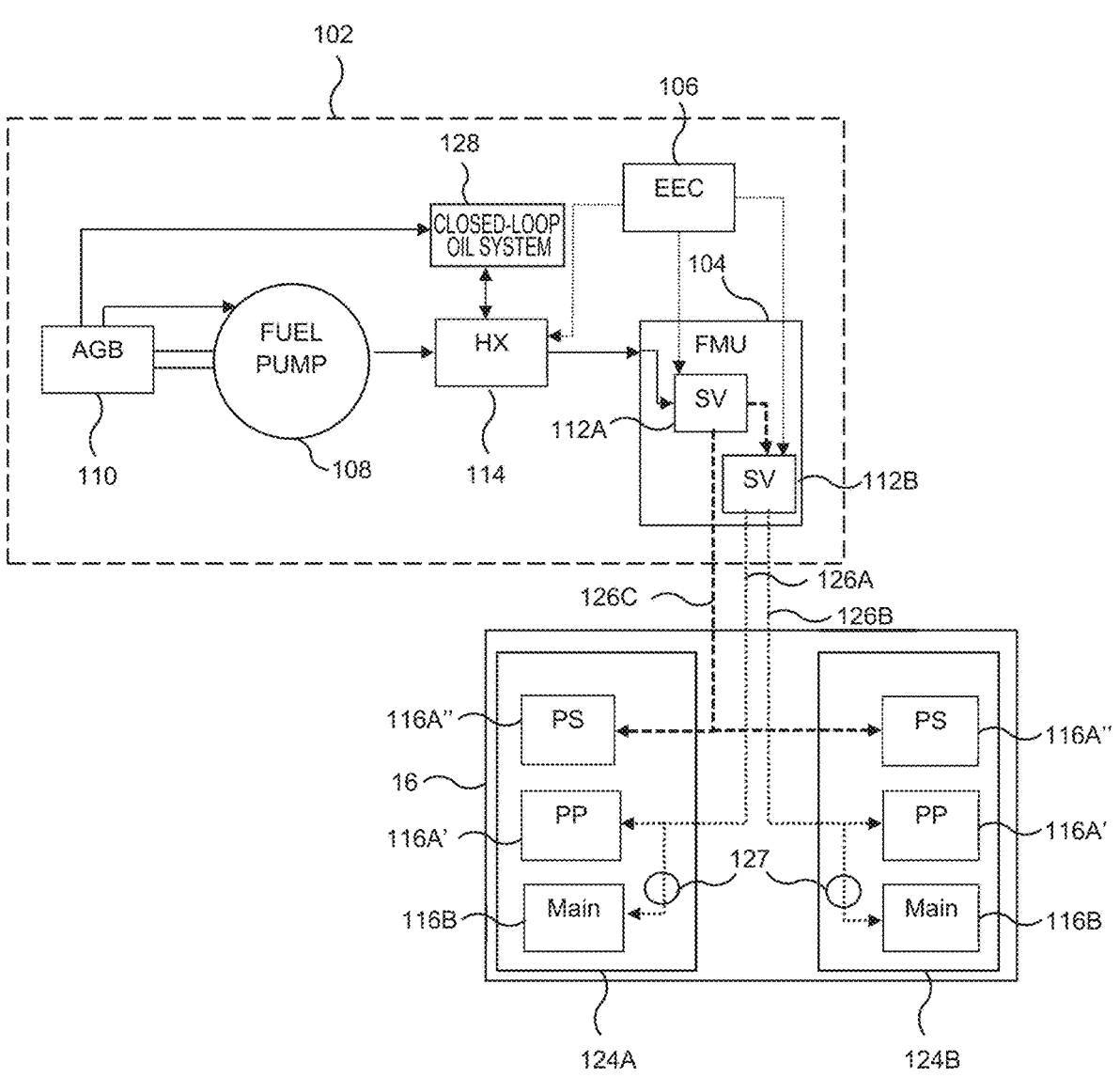
FIG. 8 is another schematic representation of a fuel distribution system and the combustor of a gas turbine engine.

Another example of the fuel distribution system 102 and combustor 16 is shown in FIG. 8. In this example, the combustor comprises a plurality of fuel spray nozzles which are divided into a first subset 124A and a second subset 124B similarly to as described above. Each fuel spray nozzle 124 comprises a primary pilot injector 116A', a secondary pilot injector 116A" and a main injector 116B. The primary pilot injectors 116A' and the main injectors 116B are supplied with fuel from the FMU 104 by a first and second pilot/main manifold 126A, 126B. The primary pilot injectors 116A' and the main injectors 116B of the first subset of nozzles 124A are supplied by the first pilot/main manifold 126A. The primary pilot injectors 116A' and the main injectors 116B of the second subset of nozzles 124B are supplied by the second pilot/main manifold 126B. The secondary pilot injectors 116A" are supplied with fuel from the FMU 104 by a secondary pilot manifold 126C. The first pilot/main manifold 126A is therefore connected between the FMU 104 and the fuel spray nozzles of the first subset 124A, while the second subset 124B are connected to the FMU 104 by the second pilot/main manifold 126B. All of the fuel spray nozzles (i.e. both subsets) are supplied with fuel by the secondary pilot manifold 126C.

The FMU 104 comprises a first splitter valve 112A and a second splitter valve 112B. The first splitter valve 112A is arranged to split fuel flow supplied to the FMU 104 into a first flow of fuel provided to the secondary pilot manifold 126C, and a second flow of fuel supplied to the second splitter valve 112B. The second splitter valve 112B is arranged to provide a flow of fuel to the primary pilot injectors 116A' such that the primary pilot injectors 116A' of the first subset 124A of nozzles receive more fuel below a staging point compared to those of the second subset 124B of fuel spray nozzles. Below the staging point, the splitter valve 112B is arranged to provide less fuel (including no fuel) to the second subset 124B of fuel spray nozzles. At or above the staging point, all of the nozzles of both first and second subsets may be provided with the same amount of fuel by the splitter valve 112B. As described above, the staging point may be a fuel flow threshold, or an engine power.

In the example shown in FIG. 8, staging of the main injectors is provided by passive valves 127 (or other types of valve) provided within each of the fuel spray nozzles 124. For example, each fuel spray nozzle 124 may comprise one or more passive valves arranged to control flow of fuel received from the respective pilot/main manifold 126A, 126B to allow staging between pilot only operation and pilot plus main operation. In other examples, other means for providing staging between pilot only and pilot plus main operation may be provided.

Although FIG. 8 shows a combustor having fuel spray nozzles comprising primary and secondary pilot injectors that may not be the case in other examples. The secondary pilot injectors may be absent in some examples, along with the secondary pilot manifold 126C and first splitter valve 112A.

Referring to the examples of both FIGS. 6 and 8, the fuel distribution system 102 comprises at least one fuel-oil heat exchanger (HX) 114. As is conventional, at least one substantially closed-loop oil system 128 is configured to supply lubricating oil to a plurality of engine components and collect the lubricating oil following lubrication of the engine components. The lubricating oil also acts to remove heat from those engine components, such that a temperature of the lubricating oil is increased following lubrication of the engine components. The fuel-oil heat exchanger 114 is configured to transfer heat from the heated lubricating oil to the fuel prior to the fuel entering the combustor 16. The transfer of heat from the heated lubricating oil to the fuel serves a number of purposes. One purpose is to reduce a temperature of the lubricating oil, such that the lubricating oil may be recirculated to remove heat from the engine components. Another purpose is to increase a temperature of the fuel prior to the fuel entering the combustor 16, in order to alter one or more properties of the fuel prior to entering the combustor 16 and improve or optimise combustion.

In the example shown, the fuel-oil heat exchanger 114 is disposed between the fuel pump 108 and the fuel metering unit 104, although the fuel-oil heat exchanger 114 may be disposed at any suitable location. The electronic engine controller 106 is configured to control operation of the fuel-oil heat exchanger 114, by providing control signals to the fuel-oil heat exchanger 114.

The gas turbine engine 10 of the present application is configured to provide fuel comprising a sustainable aviation fuel (SAF) to the plurality of fuel spray nozzles 124. In other words, the gas turbine engine 10 is configured to inject fuel (F) comprising a sustainable aviation fuel (SAF) into the combustion chamber 120. In use, therefore, fuel provided to the fuel spray nozzles 124 comprises SAF.

By "fuel comprising SAF" we may mean that the fuel provided to the combustor 16 (and to the combustion chamber 120), via the fuel spray nozzles 124, comprises a % SAF in the range of 50% to 100%, preferably in the range 70% to 100%, and more preferably in the range 90% to 100%. More generally, by "fuel comprising SAF" we may mean a fuel comprising any blend of SAF and fossil kerosene fuel, including up to 100% SAF and no fossil kerosene fuel. The fuel comprising SAF may be a fuel comprising a percentage SAF of 1%, 2%, 5%, 10%, 15%, 20%, 30%, 40%, 50%, 60%, 70%, 80%, 90%, 95%, 100%, or within any range defined between any two of those values.

By "SAF" we mean a kerosene-type fuel whose hydrocarbon component is substantially all paraffinic hydrocarbons. By "SAF" we additionally or alternatively mean a kerosene-type fuel with a hydrogen mass fraction in the range of 13.7% to 16.9%, for example 15.3%. By "a fossil-based hydrocarbon fuel" or "fossil fuel" used anywhere herein we mean a fossil derived kerosene with a hydrogen mass fraction in the range of 12.0% to 14.8%, for example 13.4%.

Non-Volatile Particulate Matter (nvPM) Emissions

An nvPM emissions index (EI) is defined herein as the mass of nvPM produced per unit mass of fuel used by the combustor 16 of the gas turbine engine 10 of any example described herein. In the present application, the nvPM emissions index is the mass of nvPM produced by the gas turbine engine in milligrams divided by the corresponding mass of the fuel used by the engine 10 in kilograms.

The nvPM emissions index can be defined at various operating phases of the gas turbine engine 10, for example at idle, max take off, climb and approach. An emissions index may be further defined depending on the type of fuel being provided to the combustor 16.

The following emissions index parameters are defined for the gas turbine engine 10:

i) $EI_{idle}$ is the nvPM emissions index in mg/kg of the gas turbine engine 10 if operating at 7% available thrust for given operating conditions. Operation at 7% available thrust may correspond to operating at an idle operating phase of the gas turbine engine 10;

ii) $EI_{maxTO}$ is the nvPM emissions index in mg/kg of the gas turbine engine 10 if operating at 100% available thrust for given operating conditions. Operation at 100% available thrust may correspond to operating at a max take off operating phase of the gas turbine engine 10;

iii) $EI_{climb}$ is the nvPM emissions index in mg/kg of the gas turbine engine 10 when operating at 85% available thrust for given operating conditions. Operation at 85% available thrust may correspond to operating at a climb operating phase of the gas turbine engine 10;

iv) $EI_{approach}$ is the nvPM emissions index in mg/kg of the gas turbine engine 10 when operating at 30% available thrust for given operating conditions. Operation at 30% available thrust may correspond to operating at an approach operating phase of the gas turbine engine 10.

The available thrust for given operating conditions (i.e. engine power setting) is defined as a percentage of the engine maximum rated thrust (Foo) as defined in the art. In other words, a percentage "available thrust" refers to a percentage of a maximum thrust, where the maximum thrust is "100% available thrust", and "given operating conditions" refers to predetermined operating conditions at which engine maximum rated thrust, i.e., 100% available thrust, is measured. The predetermined operating conditions may be ISA at sea level where the reference absolute humidity is 0.00634 kg water/kg dry air. The predetermined operating conditions may be at sea level static. The predetermined operating conditions may include no customer bleeds and/or no power offtakes. The predetermined operating conditions may be at day conditions. The predetermined operating conditions may be at around 60% relative humidity.

The nvPM emissions indexes defined above may be further defined according to the fuel being supplied to the combustor. Fuel specific values of the nvPM emissions index are defined as follows:

i) $EI_{idle,FF}$ is the nvPM emissions index in mg/kg of the gas turbine engine 10 if operating at 7% available thrust for given operating conditions and if a fuel provided to the combustor 16 is a fossil-based hydrocarbon fuel;

ii) $EI_{maxTO,FF}$ is the nvPM emissions index in mg/kg of the gas turbine engine 10 if operating at 100% available thrust for given operating conditions and if a fuel provided to the combustor 16 is a fossil-based hydrocarbon fuel;

iii) $EI_{climb,FF}$ is the nvPM emissions index in mg/kg of the gas turbine engine 10 when operating at 85% available thrust for given operating conditions and if a fuel provided to the combustor 16 is a fossil-based hydrocarbon fuel;

iv) $EI_{approach,FF}$ is the nvPM emissions index in mg/kg of the gas turbine engine 10 when operating at 30% available thrust for given operating conditions and if a fuel provided to the combustor 16 is a fossil-based hydrocarbon fuel;

v) $EI_{idle,SAF}$ is the nvPM emissions index in mg/kg of the gas turbine engine 10 if operating at 7% available thrust for given operating conditions and if a fuel provided to the combustor 16 comprises a sustainable aviation fuel (SAF);

vi) $EI_{maxTO,SAF}$ is the nvPM emissions index in mg/kg of the gas turbine engine 10 if operating at 100% available thrust for given operating conditions and if a fuel provided to the combustor 16 comprises a sustainable aviation fuel (SAF);

vii) $EI_{climb,SAF}$ is the nvPM emissions index in mg/kg of the gas turbine engine 10 when operating at 85% available thrust for given operating conditions and if a fuel provided to the combustor 16 comprises a sustainable aviation fuel (SAF); and viii) $EI_{approach,SAF}$ is the nvPM emissions index in mg/kg of the gas turbine engine 10 when operating at 30% available thrust for given operating conditions and if a fuel provided to the combustor 16 comprises a sustainable aviation fuel (SAF).

Fuel Flow Rate

A fuel flow rate $W_f$ of the gas turbine engine 10 is defined as the rate of fuel flow to the fuel spray nozzles of the combustor 16 (i.e. when the engine is in use). The fuel flow rate is defined for operation at different percentages of available thrust for given operating conditions as defined above. $W_{f,idle}$ is the rate of fuel flow to the fuel spray nozzles 124 in kg/s at 7% available thrust for given operating conditions and may correspond to operating at an idle operating phase of the gas turbine engine 10. $W_{f,maxTO}$ is the rate of fuel flow to the fuel spray nozzles 124 in kg/s at 100% available thrust for given operating conditions and may correspond to operating at a max take off operating phase of the gas turbine engine 10. $W_{f,climb}$ is defined as the mass flow rate of fuel provided to the plurality of fuel spray nozzles 124 in kg/s when the gas turbine engine 10 is operating at 85% available thrust for given operating conditions and may correspond to operating at a climb operating phase of the gas turbine engine 10. $W_{f,approach}$ is the mass flow rate of fuel provided to the plurality of fuel spray nozzles 124 in kg/s when the gas turbine engine 10 is operating at 30% available thrust for given operating conditions and may correspond to operating at an approach operating phase of the gas turbine engine 10.

In any example defined or claimed anywhere herein, $W_{f,maxTO}$ may be in the range 0.595 to 1.29 kg/s, preferably 0.670 to 1.19 kg/s, more preferably 0.744 to 1.08 kg/s. In any example defined or claimed anywhere herein, $W_{f,maxTO}$ may be in the range of 0.595 to 1.28 kg/s, preferably 0.670 to 1.17 kg/s, more preferably 0.744 to 1.07 kg/s. In any example defined or claimed anywhere herein, $W_{f,maxTO}$ may be in the range of 0.701 to 1.29 kg/s, preferably 0.788 to 1.19 kg/s, more preferably 0.876 to 1.08 kg/s.

In any example defined or claimed anywhere herein, $W_{f,climb}$ may be in the range 0.492 to 1.05 kg/s, preferably 0.554 to 0.960 kg/s, more preferably 0.616 to 0.873 kg/s. In any example defined or claimed anywhere herein, $W_{f,climb}$ may be in the range of 0.492 to 1.05 kg/s, preferably 0.554 to 0.957 kg/s, more preferably 0.616 to 0.870 kg/s. In any example defined or claimed anywhere herein, $W_{f,climb}$ may be in the range of 0.577 to 1.05 kg/s, preferably 0.649 to 0.960 kg/s, more preferably 0.721 to 0.873 kg/s.

In any example defined or claimed anywhere herein, $W_{f,approach}$ may be in the range 0.175 to 0.343 kg/s, preferably 0.197 to 0.314 kg/s, more preferably 0.219 to 0.286 kg/s. In any example defined or claimed anywhere herein, $W_{f,approach}$ may be in the range of 0.175 to 0.341 kg/s, preferably 0.197 to 0.313 kg/s, more preferably 0.219 to 0.284 kg/s. In any example defined or claimed anywhere herein, $W_{f,approach}$ may be in the range of 0.196 to 0.343 kg/s, preferably 0.220 to 0.314 kg/s, more preferably 0.245 to 0.286 kg/s.

In any example defined or claimed anywhere herein, $W_{f,idle}$ may be in the range 0.0695 to 0.118 kg/s, preferably 0.0782 to 0.108 kg/s, more preferably 0.0869 to 0.0981 kg/s. In any example defined or claimed anywhere herein, $W_{f,idle}$ may be in the range of 0.0712 to 0.117 kg/s, preferably 0.0801 to 0.107 kg/s, more preferably 0.0890 to 0.0970 kg/s.

Engine Thrust

The thrust of the gas turbine engine 10 is given the symbol F and is defined for operation at different percentages of available thrust for given operating conditions as defined above. $F_{maxTO}$ is defined as the thrust of the gas turbine engine 10 at 100% available thrust for given operating conditions in kN. $F_{idle}$ is defined as the thrust of the gas turbine engine 10 at 7% available thrust for given operating conditions in kN.

In any of the examples defined or claimed anywhere herein, $F_{maxTO}$ may be in the range 85.4 kN to 172 kN and preferably is in the range 96.1 kN to 158 kN and more preferably in the range 106 kN to 144 kN. In any of the examples defined or claimed anywhere herein, $F_{maxTO}$ may be in the range 89.0 kN to 157 kN and preferably is in the range 100 kN to 144 kN and more preferably in the range 111 kN to 131 kN. The value of $F_{maxTO}$ corresponds to the maximum rated thrust $F_{00}$.

In any of the examples defined or claimed anywhere herein, $F_{idle}$ may be in the range 5.98 kN to 12.1 kN and preferably is in the range 6.72 kN to 11.1 kN and more preferably in the range 7.47 kN to 10.1 kN. In any of the examples defined or claimed anywhere herein, $F_{idle}$ may be the range 6.23 kN to 11.0 kN and preferably is in the range 7.00 kN to 10.1 kN and more preferably in the range 7.78 kN to 9.13 kN.

The thrust at other operating points (e.g. approach and climb) may be defined by taking the relevant percentage value of the maximum rated thrust, $F_{00}$.

Bypass Ratio

The bypass ratio (BPR) is defined as the ratio of the mass flow rate of the flow through the bypass duct to the mass flow rate of the flow through the core.

In any of the examples defined or claimed anywhere herein, the BPR may be in the range of 6.63 to 13.4 and preferably in the range of 7.46 to 12.3 and further preferably in the range of 8.29 to 11.1.

In any of the examples defined or claimed anywhere herein, the BPR may be in the range of 8.36 to 13.4 and preferably in the range of 9.40 to 12.3 and further preferably in the range of 10.4 to 11.1.

In any of the examples defined or claimed anywhere herein, the BPR may be in the range of 6.63 to 10.3 and preferably in the range of 7.46 to 9.38 and further preferably in the range of 8.29 to 8.53.

First and Second Idle-MTO nvPM Emissions Index Ratios

A first idle-MTO nvPM emissions index ratio is defined in equation (1) below:

$$\frac{EI_{idle}}{EI_{maxTO}} \qquad (1)$$

$EI_{idle}$ and $EI_{maxTO}$ are as defined elsewhere herein. The first idle-MTO nvPM emissions index ratio represents the ratio of the nvPM emissions index at idle (e.g. at 7% available thrust) to the nvPM emissions index at max take off (e.g. at 100% available thrust). The first idle-MTO nvPM emissions index ratio of the gas turbine engine 10 may be less than 60.

In other examples, the first idle-MTO nvPM emissions index ratio of the gas turbine engine 10 may be less than 58.4 and preferably less than 53.5 and more preferably less than 48.6.

The first idle-MTO nvPM emissions index ratio of the gas turbine engine 10 may be less than or equal to 45 and preferably less than or equal to 30 and more preferably less than or equal to 15.

The first idle-MTO nvPM emissions index ratio of the gas turbine engine 10 may be less than or equal to 8.65 and preferably less than or equal to 7.93 and more preferably less than or equal to 7.21.

The first idle-MTO nvPM emissions index ratio of the gas turbine engine 10 may be less than or equal to 0.155 and preferably less than or equal to 0.142 and more preferably less than or equal to 0.129.

More generally, the first idle-MTO nvPM emissions index ratio may be less than 0.01, 0.02, 0.03, 0.04, 0.05, 0.06, 0.07, 0.08, 0.09, 0.1, 0.11, 0.12, 0.13, 0.14, 0.16, 0.17, 0.18, 0.19, 0.2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, or in any range defined between any two of these values.

In any of the examples above where an upper bound of the first idle-MTO nvPM emissions index is defined, the first idle-MTO nvPM emissions index may have a lower bound of greater than zero.

In any of the examples above, the first idle-MTO nvPM emissions index ratio of the gas turbine engine 10 may be greater than or equal to 0.038 and preferably greater than or equal to 0.0428 and more preferably greater than or equal to 0.0475.

The first idle-MTO nvPM emissions index ratio of the gas turbine engine 10 may be greater than or equal to 1.21 and preferably greater than or equal to 1.36 and more preferably greater than or equal to 1.52.

In one example, the first idle-MTO nvPM emissions index ratio of the gas turbine engine 10 may be in the range of 0.0380 to 8.65 and preferably in the range of 0.0428 to 7.93 and more preferably in the range of 0.0475 to 7.21.

In another example, the first idle-MTO nvPM emissions index ratio of the gas turbine engine 10 may be in the range of 0.0380 to 0.155 and preferably in the range of 0.0428 to 0.142 and more preferably in the range of 0.0475 to 0.129.

In another example, the first idle-MTO nvPM emissions index ratio may be in the range of 1.21 to 8.65 and preferably in the range of 1.36 to 7.93 and more preferably in the range 1.52 to 7.21.

As the values in the previous paragraphs correspond to where the gas turbine engine 10 is operated using fuel comprising SAF, the first idle-MTO nvPM emissions index ratio equation (1) above is equivalent to $EI_{idle,SAF}/EI_{maxTO,SAF}$ for the values in the previous paragraphs.

A second idle-MTO nvPM emissions index ratio (this is also referred to as a "an idle-MTO nvPM emissions index ratio" elsewhere herein) is defined in equation (2) below:

$$\frac{EI_{idle,SAF}/EI_{maxTO,SAF}}{EI_{idle,FF}/EI_{maxTO,FF}} \qquad (2)$$

$EI_{idle,SAF}$, $EI_{maxTO,SAF}$ $EI_{idle,FF}$ and $EI_{maxTO,FF}$ are as defined elsewhere herein. The second idle-MTO nvPM emissions index ratio represents a ratio of the first idle-MTO nvPM emissions index ratio when the gas turbine engine is operated using fuel comprising SAF compared to if it were operated using a fossil-based hydrocarbon fuel.

Additionally, or alternatively, in any example defined or claimed herein, the second idle-MTO nvPM emissions index ratio of the gas turbine engine 10 may be less than 1.

In some examples, the second idle-MTO nvPM emissions index ratio of the gas turbine engine 10 may be less than or equal to 0.8 and preferably less than or equal to 0.6 and more preferably less than or equal to 0.4 and more preferably less than or equal to 0.2.

The second idle-MTO nvPM emissions index ratio of the gas turbine engine 10 may be less than or equal to 0.178 and preferably less than or equal to 0.164 and more preferably less than or equal to 0.149.

More generally, the second idle-MTO nvPM emissions index ratio may be less than 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or 1, or in any range defined between any two of these values.

In any of the examples above in which an upper bound of the second idle-MTO nvPM emissions index is defined the lower bound may be greater than zero.

In any of the examples above, the second idle-MTO nvPM emissions index ratio of the gas turbine engine 10 may be greater than or equal to 0.03 and preferably greater than or equal to 0.06 and more preferably greater than or equal to 0.09.

The second idle-MTO nvPM emissions index ratio of the gas turbine engine 10 may be greater than or equal to 0.118 and preferably greater than or equal to 0.133 and more preferably greater than or equal to 0.148.

In one example, the second idle-MTO nvPM emissions index ratio of the gas turbine engine 10 may be in the range 0.118 to 0.178 and preferably in the range 0.133 to 0.164 and more preferably in the range 0.148 to 0.149.

In some examples, the second idle-MTO nvPM emissions index ratio of the gas turbine engine 10 may be 0.118, 0.12, 0.125, 0.13, 0.135, 0.14, 0.145, 0.15, 0.155, 0.16, 0.165, 0.17, 0.175, 0.178, or within any range defined between any two of these values.

Fuel-Flow nvPM Emissions Index Ratio

A fuel-flow nvPM emissions index ratio is defined as:

$$\frac{EI_{idle} \times W_{f,idle}}{EI_{maxTo} \times W_{f,maxTO}} \qquad (3)$$

where $W_{f,idle}$ is as defined above i.e. is the mass flow rate of fuel provided to the fuel spray nozzles in kg/s at 7% available thrust for given operating conditions; and $W_{f,maxTO}$ is the mass flow rate of fuel provided to the fuel spray nozzles in kg/s at 100% available thrust for the same given operating conditions. $EI_{idle}$ and $EI_{maxTO}$ are as defined elsewhere herein. The fuel flow nvPM emissions index ratio represents the ratio of the nvPM emissions index at idle (e.g. at 7% available thrust) multiplied by the respective fuel flow rate to the nvPM emissions index at max take off (e.g. at 100% available thrust) multiplied by the respective fuel flow rate. Additionally, or alternatively, in any example defined or claimed herein, the fuel-flow nvPM emissions index ratio of the gas turbine engine 10 may be less than 6.

In other examples, the fuel-flow nvPM emissions index ratio of the gas turbine engine 10 may be less than 5.93 and preferably less than 5.44 and more preferably may be less than 4.94.

The fuel-flow nvPM emissions index ratio of the gas turbine engine 10 may be less than or equal to 4.5 and preferably less than or equal to 3 and more preferably less than or equal to 1.5.

The fuel-flow nvPM emissions index ratio of the gas turbine engine 10 may be less than or equal to 0.879 and preferably less than or equal to 0.806 and more preferably less than or equal to 0.733.

The fuel-flow nvPM emissions index ratio of the gas turbine engine 10 may be less than or equal to 0.0181 and preferably less than or equal to 0.0166 and more preferably less than or equal to 0.0151.

More generally, the fuel-flow nvPM emissions index ratio may be less than 0.003, 0.004, 0.005, 0.01, 0.015, 0.02, 0.025, 0.03, 0.035, 0.04, 0.045, 0.05, 0.055, 0.06, 0.065, 0.07, 0.1, 0.2, 0.3, 0.4, 0.5, 0.6, 0.7, 0.8, 0.9, 1, 1.5, 2, 2.5, 3, 3.5, 4, 4.5, 5, 5.5, 6 or any range defined between any two of these values.

In any of the examples above in which only an upper bound for the fuel-flow nvPM emissions index ratio is defined, the lower bound may be greater than zero.

In any of the above examples, the fuel-flow nvPM emissions index ratio of the gas turbine engine 10 may be greater than or equal to 0.00351 and preferably greater than or equal to 0.00395 and more preferably greater than or equal to 0.00439.

The fuel-flow nvPM emissions index ratio of the gas turbine engine 10 may be greater than or equal to 0.109 and preferably greater than or equal to 0.123 and more preferably greater than or equal to 0.137.

In one example, the fuel-flow nvPM emissions index ratio of the gas turbine engine 10 may be in the range of 0.00351 to 0.879 and preferably in the range of 0.00395 to 0.806 and more preferably in the range of 0.00439 to 0.733.

In another example, the fuel-flow nvPM emissions index ratio may be in the range of 0.00351 to 0.0181 and preferably in the range of 0.00395 to 0.0166 and more preferably in the range of 0.00439 to 0.0151.

In another example, the fuel-flow nvPM emissions index ratio may be in the range of 0.109 to 0.879 and preferably in the range of 0.123 to 0.806 and more preferably in the range of 0.137 to 0.733.

$W_{f,maxTO}$ may be as defined anywhere else herein. In any of the examples above, $W_{f,maxTO}$ may be in the range 0.595 to 1.29 kg/s, preferably 0.670 to 1.19 kg/s, more preferably 0.744 to 1.08 kg/s. In other examples, $W_{f,maxTO}$ may be in the range of 0.595 to 1.28 kg/s, preferably 0.670 to 1.17 kg/s, more preferably 0.744 to 1.07 kg/s. In yet other examples, $W_{f,maxTO}$ may be in the range of 0.701 to 1.29 kg/s, preferably 0.788 to 1.19 kg/s, more preferably 0.876 to 1.08 kg/s.

The $W_{f,idle}$ of the gas turbine engine 10 may be as defined anywhere else herein. In any of the examples above, $W_{f,idle}$ may be in the range 0.0695 to 0.118 kg/s, preferably 0.0782 to 0.108 kg/s, more preferably 0.0869 to 0.0981 kg/s. In some examples, $W_{f,idle}$ may be in the range of 0.0712 to 0.117 kg/s, preferably 0.0801 to 0.107 kg/s, more preferably 0.0890 to 0.0970 kg/s.

Thrust nvPM Emissions Index Ratio

A thrust nvPM emissions index ratio is defined as:

$$\frac{EI_{maxTO}/F_{maxTO}}{EI_{idle}/F_{idle}} \quad (4)$$

where $F_{maxTO}$ is as defined above i.e. is the thrust of the gas turbine engine 10 at 100% available thrust in kN for the given operating conditions (i.e. the maximum rated thrust, $F_{00}$) and $F_{idle}$ is the thrust of the gas turbine engine 10 at 7% available thrust in kN for the given operating conditions (i.e. $F_{00} \times 0.07$). $EI_{idle}$ and $EI_{maxTO}$ are as defined elsewhere herein. The thrust nvPM emissions index ratio represents the ratio of the nvPM emissions index at max take off divided by respective thrust to the nvPM emissions index at idle divided by the respective thrust. Additionally, or alternatively, in any example defined or claimed herein, the thrust nvPM emissions index ratio of the gas turbine engine 10 may be greater than 0.001.

In some examples, the thrust nvPM emissions index ratio of the gas turbine engine 10 may be greater than 0.00115 and preferably greater than 0.00129 and more preferably greater than 0.00144.

The thrust nvPM emissions index ratio of the gas turbine engine 10 may be greater than 0.0644 and preferably greater than 0.0724 and more preferably greater than 0.0805.

The thrust nvPM emissions index ratio of the gas turbine engine 10 may be greater than or equal to 0.003 and preferably greater than or equal to 0.005 and more preferably greater than or equal to 0.007.

The thrust nvPM emissions index ratio of the gas turbine engine 10 may be greater than or equal to 0.00776 and preferably greater than or equal to 0.00874 and more preferably greater than or equal to 0.00971.

The thrust nvPM emissions index ratio of the gas turbine engine 10 may be greater than or equal to 0.434 and preferably greater than or equal to 0.488 and more preferably greater than or equal to 0.542.

More generally, the thrust nvPM emissions index ratio may be greater than 0.001, 0.0015, 0.002, 0.0025, 0.003, 0.0035, 0.004, 0.0045, 0.005, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2 or any range defined between any two of these values.

In any of the examples above in which only a lower bound of the thrust nvPM emissions index ration is defined, the upper bound may be as defined in the following paragraphs.

The thrust nvPM emissions index ratio of the gas turbine engine 10 may be less than or equal to 1.77 and preferably less than or equal to 1.62 and more preferably less than or equal to 1.48.

The thrust nvPM emissions index ratio of the gas turbine engine 10 may be less than or equal to 0.0553 and preferably less than or equal to 0.0507 and more preferably less than or equal to 0.0461.

In one example, the thrust nvPM emissions index ratio of the gas turbine engine 10 may be in the range of 0.00776 to 1.77 and preferably in the range of 0.00874 to 1.62 and even more preferably in the range of 0.00971 to 1.48.

In another example, the thrust nvPM emissions index ratio of the gas turbine engine 10 may be in the range of 0.434 to 1.77 and preferably in the range of 0.488 to 1.62 and even more preferably in the range of 0.542 to 1.48.

In another example, the thrust nvPM emissions index ratio of the gas turbine engine 10 may be in the range of 0.00776 to 0.0553 and preferably in the range of 0.00874 to 0.0507 and even more preferably in the range of 0.00971 to 0.0461.

Lean and Rich Cruise-MTO nvPM Emissions Index Ratio

A lean cruise-MTO nvPM emissions index ratio is defined as:

$$\frac{EI_{cruise(lean)}/EI_{maxTO}}{BPR} \quad (5)$$

where $EI_{cruise\ (lean)}$ is defined as:

$$\frac{EI_{maxTO} + EI_{climb}}{2} \quad (6)$$

$EI_{cruise\ (lean)}$ represents the nvPM emissions index when the gas turbine engine 10 is operating in a lean cruise operating phase. This may be, for example, when the gas turbine is operating in the pilot plus main operating mode described above. $EI_{cruise\ (lean)}$ is determined by finding the average (mean) of the nvPM emissions index corresponding to when the gas turbine engine 10 is operating in a max take off operating phase (i.e. at 100% available thrust) and when it is operating in a climb operating phase (i.e. operating at 85% available thrust). In equations (5) and (6) above, $EI_{maxTO}$ and $EI_{climb}$ are as defined elsewhere herein. BPR is the bypass ratio of the gas turbine engine 10 as defined above. The bypass ratio is defined as the ratio of the mass flow rate of the flow through the bypass duct to the mass flow rate of the flow through the core. The lean cruise-MTO nvPM emissions index ratio represents a ratio of the emissions index at lean cruise to the emissions index at max take off, divided by the BPR.

Additionally, or alternatively, in any example defined or claimed herein, the lean cruise-MTO nvPM emissions index ratio of the gas turbine engine 10 may be less than 0.2.

The lean cruise-MTO nvPM emissions index ratio of the gas turbine engine 10 may be less than 0.119, preferably less than 0.109, and further preferably less than 0.0989.

The lean cruise-MTO nvPM emissions index ratio of the gas turbine engine 10 may be less than 0.101, preferably less than 0.0922, and further preferably less than 0.0838.

The lean cruise-MTO nvPM emissions index ratio of the gas turbine engine 10 may be less than or equal to 0.095, preferably less than or equal to 0.092, and further preferably less than or equal to 0.089.

The lean cruise-MTO nvPM emissions index ratio of the gas turbine engine 10 may be less than or equal to 0.106, preferably less than or equal to 0.0972, and further preferably less than or equal to 0.0883.

The lean cruise-MTO nvPM emissions index ratio of the gas turbine engine 10 may be less than or equal to 0.0887, preferably less than or equal to 0.0813, and further preferably less than or equal to 0.0739.

More generally, the lean cruise-MTO nvPM emissions index ratio may be less than 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, or 0.2, or within any range defined between any two of these values.

In any of the examples defined above, where only an upper bound for the lean-cruise-MTO nvPM emissions index ratio is defined, the lower bound may be greater than zero.

In any of the examples above, the lean cruise-MTO nvPM emissions index ratio of the gas turbine engine 10 may be greater than or equal to 0.0519, preferably greater than or equal to 0.0584, and further preferably greater than or equal to 0.0649.

The lean cruise-MTO nvPM emissions index ratio of the gas turbine engine 10 may be greater than or equal to 0.0578, preferably greater than or equal to 0.0651, and further preferably greater than or equal to 0.0723.

In one example, the lean cruise-MTO nvPM emissions index ratio of the gas turbine engine 10 may be in the range of 0.0519 to 0.106, preferably in the range of 0.0584 to 0.0972 and further preferably in the range of 0.0649 to 0.0883.

In another example, the lean cruise-MTO nvPM emissions index ratio may be in the range of 0.0519 to 0.0887, preferably in the range of 0.0584 to 0.0813 and further preferably in the range of 0.0649 to 0.0739.

In another example, the lean cruise-MTO nvPM emissions index ratio may be in the range of 0.0578 to 0.106, preferably in the range of 0.0651 to 0.0972 and further preferably in the range of 0.0723 to 0.0883.

A rich cruise-MTO nvPM emissions index ratio is defined as:

$$\frac{EI_{cruise(rich)}/EI_{maxTO}}{BPR} \tag{7}$$

where $EI_{cruise\ (rich)}$ is defined as:

$$\frac{EI_{climb} + EI_{approach}}{2} \tag{8}$$

$EI_{cruise\ (rich)}$ represents the nvPM emissions index when the gas turbine engine 10 is operating in a rich cruise operating phase. This may be, for example, when the gas turbine is operating in the pilot only operating mode described above. $EI_{cruise\ (rich)}$ is determined by finding the average (mean) of the nvPM emissions index corresponding to when the gas turbine engine 10 is operating in a climb operating phase (i.e. at 85% available thrust) and when it is operating in an approach operating phase (i.e. operating at 30% available thrust). In equations (7) and (8) above, $EI_{maxTO}$, $EI_{climb}$, $EI_{approach}$ and BPR are as defined above. The rich cruise-MTO nvPM emissions index ratio represents a ratio of the emissions index at rich cruise to the emissions index at max take off, divided by the BPR.

Additionally, or alternatively, in any example defined or claimed herein, the rich cruise-MTO nvPM emissions index ratio of the gas turbine engine 10 may be less than 20.

The rich cruise-MTO nvPM emissions index ratio of the gas turbine engine 10 may be less than 19, preferably less than 17.5, and further preferably less than 15.9.

The rich cruise-MTO nvPM emissions index ratio of the gas turbine engine 10 may be less than or equal to 12, preferably less than or equal to 9, and further preferably less than or equal to 6.

The rich cruise-MTO nvPM emissions index ratio of the gas turbine engine 10 may be less than or equal to 4.54, preferably less than or equal to 4.17, and further preferably less than or equal to 3.79.

The rich cruise-MTO nvPM emissions index ratio of the gas turbine engine 10 may be less than or equal to 0.066, preferably less than or equal to 0.0605, and further preferably less than or equal to 0.055.

More generally, the rich cruise-MTO nvPM emissions index ratio may be less than 1, 2, 3, 4, 5, 6, 7, 8, 9, 10, 11, 12, 13, 14, 15, 16, 17, 18, 19, or 20, or within any range defined between any two of these values. Alternatively, the rich cruise-MTO nvPM emissions index ratio may be less than 0.03, 0.33, 0.63, 0.93, 1.23, 1.53, 1.83, 2.13, 2.43, 2.73, 3.03, 3.33, 3.63, 3.93, 4.23, 4.53, 4.83, 5.13, 5.43, 5.73, or 6.03, or within any range defined between any two of these values.

In any of the examples defined above, where only an upper bound for the rich-cruise-MTO nvPM emissions index ratio is defined, the lower bound may be greater than zero.

In any of the examples defined above, the rich cruise-MTO nvPM emissions index ratio of the gas turbine engine 10 may be greater than or equal to 0.0374, preferably greater than or equal to 0.0421, and further preferably greater than or equal to 0.0468.

The rich cruise-MTO nvPM emissions index ratio of the gas turbine engine 10 may be greater than or equal to 1.41, preferably greater than or equal to 1.58, and further preferably greater than or equal to 1.76.

In one example, the rich cruise-MTO nvPM emissions index ratio of the gas turbine engine 10 may be in the range of 0.0374 to 4.54, preferably in the range of 0.0421 to 4.17, and further preferably in the range of 0.0468 to 3.79.

In another example, the rich cruise-MTO nvPM emissions index ratio of the gas turbine engine 10 may be in the range of 0.0374 to 0.0660, preferably in the range of 0.0421 to 0.0605, and further preferably in the range of 0.0468 to 0.0550.

In another example, the rich cruise-MTO nvPM emissions index ratio of the gas turbine engine 10 may be in the range of 1.41 to 4.54, preferably in the range of 1.58 to 4.17, and further preferably in the range of 1.76 to 3.79.

The bypass ratio of the gas turbine engine 10 may be as defined anywhere herein. More specifically, the bypass ratio may be in the range of 6.63 to 13.4 and more preferably in the range of 7.46 to 12.3 and even more preferably in the range of 8.29 to 11.1. In some examples, the bypass ratio may be in the range of 8.36 to 13.4 and more preferably in the range of 9.40 to 12.3 and even more preferably in the range of 10.4 to 11.1. In some examples, the bypass ratio may be in the range of 6.63 to 10.3 and more preferably in the range of 7.46 to 9.38 and even more preferably in the range of 8.29 to 8.53.

MTO, Climb, Approach and Idle nvPM Emissions Index Ratio

An MTO nvPM emissions index ratio is defined as:

$$\frac{EI_{maxTO,SAF}}{EI_{maxTO,FF}} \quad (9)$$

Where $EI_{maxTO,SAF}$ and $EI_{maxTO,FF}$ are as defined above. The MTO nvPM emissions index ratio represents a ratio of the nvPM emissions index corresponding to operating the gas turbine engine 10 during the max take off operating phase using a fuel comprising SAF to if the gas turbine engine 10 were instead operated using a fossil-based hydrocarbon fuel.

Additionally, or alternatively, in any example defined or claimed herein, the MTO nvPM emissions index ratio of the gas turbine engine 10 may be less than 1.

The MTO nvPM emissions index ratio of the gas turbine engine 10 may be less than or equal to 0.93, and preferably less than or equal to 0.86, and more preferably less than or equal to 0.79.

The MTO nvPM emissions index ratio of the gas turbine engine 10 may be less than or equal to 0.776, and preferably less than or equal to 0.711, and more preferably less than or equal to 0.646.

More generally, the MTO nvPM emissions index ratio of the gas turbine engine 10 may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

In any of the examples above in which only an upper bound of the MTO nvPM emissions index ratio is defined, the lower bound may be greater than zero.

In any of the examples above, the MTO nvPM emissions index ratio of the gas turbine engine 10 may be greater than or equal to 0.15, and preferably greater than or equal to 0.3, and more preferably greater than or equal to 0.45.

The MTO nvPM emissions index ratio of the gas turbine engine 10 may be greater than or equal to 0.516, and preferably greater than or equal to 0.581, and more preferably greater than or equal to 0.645.

In one example, the MTO nvPM emissions index ratio of the gas turbine engine 10 may be in the range of 0.516 to 0.776, and preferably in the range of 0.581 to 0.711, and more preferably in the range of 0.645 to 0.646.

In other examples, the MTO nvPM emissions index ratio may be 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, or within any range defined between any two of these values.

To evaluate the value of the MTO nvPM emissions index ratio a value for $EI_{maxTO,SAF}$ may be determined for operation at 100% available thrust using a fuel comprising SAF. The value of $EI_{maxTO,FF}$ may be determined for corresponding operation at the same given operating conditions except if the gas turbine engine were instead operated using a fossil-based hydrocarbon fuel.

A climb nvPM emissions index ratio is defined as:

$$\frac{EI_{climb,SAF}}{EI_{climb,FF}} \quad (10)$$

Where $EI_{climb,SAF}$ and $EI_{climb,FF}$ are as defined above. The climb nvPM emissions index ratio represents a ratio of the nvPM emissions index corresponding to operating the gas turbine engine 10 during the climb operating phase using a fuel comprising SAF to if the gas turbine engine 10 was instead operated using a fossil-based hydrocarbon fuel.

Additionally, or alternatively, in any example defined or claimed herein, the climb nvPM emissions index ratio of the gas turbine engine 10 may be less than 1.

The climb nvPM emissions index ratio of the gas turbine engine 10 may be less than or equal to 0.9, and preferably less than or equal to 0.75, and more preferably less than or equal to 0.6.

The climb nvPM emissions index ratio of the gas turbine engine 10 may be less than or equal to 0.57, and preferably less than or equal to 0.523, and more preferably less than or equal to 0.475.

More generally, the climb nvPM emissions index ratio of the gas turbine engine 10 may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

In any of the examples defined above in which only an upper bound for the climb nvPM emissions index ratio is defined, the lower bound may be greater than zero.

In any of the examples above, the climb nvPM emissions index ratio of the gas turbine engine 10 may be greater than or equal to 0.1, and preferably greater than or equal to 0.2, and more preferably greater than or equal to 0.3.

The climb nvPM emissions index ratio of the gas turbine engine 10 may be greater than or equal to 0.379, and preferably greater than or equal to 0.427, and more preferably greater than or equal to 0.474.

In one example, the climb nvPM emissions index ratio of the gas turbine engine 10 may be in the range of 0.379 to 0.570, and preferably in the range of 0.427 to 0.523, and more preferably in the range of 0.474 to 0.475.

In other examples, the climb nvPM emissions index ratio may be 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, or within any range defined between any two of these values.

An approach nvPM emissions index ratio is defined as:

$$\frac{EI_{approach,SAF}}{EI_{approach,FF}} \quad (11)$$

Where $EI_{approach,SAF}$ and $EI_{approach,FF}$ are as defined above. The approach nvPM emissions index ratio represents a ratio of the nvPM emissions index corresponding to operating the gas turbine engine 10 during the approach operating phase using a fuel comprising SAF to if the gas turbine engine 10 was instead operated using a fossil-based hydrocarbon fuel.

Additionally, or alternatively, in any example defined or claimed herein, the approach nvPM emissions index ratio of the gas turbine engine 10 may be less than 1.

The approach nvPM emissions index ratio of the gas turbine engine 10 may be less than or equal to 0.8, and preferably less than or equal to 0.5, and more preferably less than or equal to 0.2.

The approach nvPM emissions index ratio of the gas turbine engine 10 may be less than or equal to 0.185, and preferably less than or equal to 0.169, and more preferably less than or equal to 0.154.

More generally, the approach nvPM emissions index ratio of the gas turbine engine 10 may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

In any example defined above in which only an upper bound for the approach nvPM emissions index ratio is defined, the lower bound may be greater than zero.

In any example above, the approach nvPM emissions index ratio of the gas turbine engine 10 may be greater than or equal to 0.03, and preferably greater than or equal to 0.06, and more preferably greater than or equal to 0.09.

The approach nvPM emissions index ratio of the gas turbine engine 10 may be greater than or equal to 0.122, and preferably greater than or equal to 0.138, and more preferably greater than or equal to 0.153.

In one example, the approach nvPM emissions index ratio of the gas turbine engine 10 may be in the range of 0.122 to 0.185, and preferably in the range of 0.138 to 0.169, and more preferably in the range of 0.153 to 0.154.

In other examples, the approach nvPM emissions index ratio is 0.1, 0.11, 0.12, 0.13, 0.14, 0.15, 0.16, 0.17, 0.17, 0.18, 0.19, 0.2, or within any range defined between any two of these values.

An idle nvPM emissions index ratio is defined as:

$$\frac{EI_{idle,SAF}}{EI_{idle,FF}} \tag{12}$$

Where $EI_{idle,SAF}$ and $EI_{idle,FF}$ are as defined above. The idle nvPM emissions index ratio represents a ratio of the nvPM emissions index corresponding to operating the gas turbine engine 10 during the idle operating phase using a fuel comprising SAF to if the gas turbine engine 10 was instead operated using a fossil-based hydrocarbon fuel.

Additionally, or alternatively, in any example defined or claimed herein, the idle nvPM emissions index ratio of the gas turbine engine 10 may be less than 1.

The idle nvPM emissions index ratio of the gas turbine engine 10 may be less than or equal to 0.8, and preferably less than or equal to 0.5, and more preferably less than or equal to 0.2.

The idle nvPM emissions index ratio of the gas turbine engine 10 may be less than or equal to 0.115, and preferably less than or equal to 0.106, and more preferably less than or equal to 0.0959.

More generally, the idle nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

In any example defined above in which only an upper bound is given for the idle nvPM emissions index ratio, the lower bound may be greater than zero.

The idle nvPM emissions index ratio of the gas turbine engine 10 may be greater than or equal to 0.02, and preferably greater than or equal to 0.04, and more preferably greater than or equal to 0.06.

The idle nvPM emissions index ratio of the gas turbine engine 10 may be greater than or equal to 0.0766, and preferably greater than or equal to 0.0862, and more preferably greater than or equal to 0.0958.

In one example, the idle nvPM emissions index ratio of the gas turbine engine 10 may be in the range of 0.0766 to 0.115, and preferably in the range of 0.0862 to 0.106, and more preferably in the range of 0.0958 to 0.0959.

In some examples, the idle nvPM emissions index ratio of the gas turbine engine 10 may be 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, or within any range defined between any two of these values.

MTO, Climb, Approach and Idle nvPM Emissions Index Ratio-Modified Fuel Flow

An MTO nvPM emissions index ratio-modified fuel flow is defined as:

$$\frac{EI_{maxTO,SAF}}{EI_{maxTO,FF}} \times W_{f,maxTO} \tag{13}$$

Where $EI_{maxTO,SAF}$ and $EI_{maxTO,FF}$ are as defined above. $W_{f,maxTO}$ is as defined elsewhere herein i.e. is the mass flow rate of fuel provided to the plurality of fuel spray nozzles 124 in kg/s when the gas turbine engine 10 is operating at 100% available thrust for given operating conditions (e.g. during a MTO operating phase). The MTO nvPM emissions index ratio-modified fuel flow represents the fuel flow at MTO operation scaled by the respective nvPM emissions index ratio.

Additionally, or alternatively, in any example defined or claimed herein, the MTO nvPM emissions index ratio-modified fuel flow of the gas turbine engine 10 in kg/s may be less than 2. More specifically, the MTO nvPM emissions index ratio-modified fuel flow of the gas turbine engine 10 in kg/s may be less than 1.5. The MTO nvPM emissions index ratio-modified fuel flow of the gas turbine engine 10 in kg/s may be less than 1.

The MTO nvPM emissions index ratio-modified fuel flow of the gas turbine engine 10 in kg/s may be less than 1.29, more preferably less than 1.19, and yet even more preferably less than 1.08. The MTO nvPM emissions index ratio-modified fuel flow of the gas turbine engine 10 in kg/s may be less than 1.28, more preferably less than 1.17, and yet even more preferably less than 1.07.

The MTO nvPM emissions index ratio-modified fuel flow of the gas turbine engine 10 in kg/s may be less than or equal to 0.834, more preferably less than or equal to 0.764, and further preferably less than or equal to 0.695.

The MTO nvPM emissions index ratio-modified fuel flow of the gas turbine engine 10 in kg/s may be less than or equal to 0.823, more preferably less than or equal to 0.755 and further preferably less than or equal to 0.686.

In any of the examples in the previous paragraphs where only an upper bound is defined, the MTO nvPM emissions index ratio-modified fuel flow of the gas turbine engine 10 in kg/s may additionally be greater than zero.

In any of the examples above the MTO nvPM emissions index ratio-modified fuel flow of the gas turbine engine 10 in kg/s may be greater than or equal to 0.384, preferably greater than or equal to 0.432, and further preferably greater than or equal to 0.481.

In any of the examples above, the MTO nvPM emissions index ratio-modified fuel flow of the gas turbine engine 10 in kg/s may be greater than or equal to 0.453, preferably greater than or equal to 0.509 and further preferably greater than or equal to 0.566.

In some examples, the MTO nvPM emissions index ratio-modified fuel flow of the gas turbine engine 10 in kg/s may be in the range 0.384 to 0.834, preferably in the range 0.432 to 0.764, and further preferably in the range 0.481 to 0.695.

In some examples, the MTO nvPM emissions index ratio-modified fuel flow of the gas turbine engine 10 in kg/s may be in the range 0.384 to 0.823, preferably in the range 0.432 to 0.755 and further preferably in the range 0.481 to 0.686.

In some examples, the MTO nvPM emissions index ratio-modified fuel flow of the gas turbine engine 10 in kg/s may be in the range 0.453 to 0.834, preferably in the range 0.509 to 0.764 and further preferably in the range 0.566 to 0.695.

In some examples, the MTO nvPM emissions index ratio-modified fuel flow of the gas turbine engine 10 in kg/s may be less than or equal to 0.38, 0.384, 0.4, 0.42, 0.44, 0.46, 0.48, 0.5, 0.52, 0.54, 0.56, 0.58, 0.6, 0.62, 0.64, 0.66, 0.68, 0.7, 0.72, 0.74, 0.76, 0.78, 0.8, 0.82, 0.83, 0.834, or within any range defined between any two of these values.

$W_{f,maxTO}$ may be as defined anywhere else herein. In any of the examples above, $W_{f,maxTO}$ may be in the range of 0.595 to 1.29 kg/s, preferably in the range of 0.670 to 1.19 kg/s, more preferably in the range of 0.744 to 1.08 kg/s. In other examples, $W_{f,maxTO}$ may be in the range of 0.595 to 1.28 kg/s, preferably in the range of 0.670 to 1.17 kg/s, more preferably in the range of 0.744 to 1.07 kg/s. In yet other examples, $W_{f,maxTO}$ may be in the range of 0.701 to 1.29 kg/s, preferably in the range of 0.788 to 1.19 kg/s, more preferably in the range of 0.876 to 1.08 kg/s.

A climb nvPM emissions index ratio-modified fuel flow is defined as:

$$\frac{EI_{climb,SAF}}{EI_{climb,FF}} \times W_{f,climb} \qquad (14)$$

Where $EI_{climb,SAF}$ and $EI_{climb,FF}$ are as defined above. $W_{f,climb}$ is as defined elsewhere herein i.e. is the mass flow rate of fuel provided to the plurality of fuel spray nozzles 124 in kg/s when the gas turbine engine 10 is operating at 85% available thrust for given operating conditions (e.g. during a climb operating phase). The climb nvPM emissions index ratio-modified fuel flow represents the fuel flow at climb operation scaled by the respective nvPM emissions index ratio.

Additionally, or alternatively, in any example defined or claimed herein, the climb nvPM emissions index ratio-modified fuel flow of the gas turbine engine 10 in kg/s may be less than 2. More specifically, the climb nvPM emissions index ratio-modified fuel flow in kg/s may be less than 1.5. The climb nvPM emissions index ratio-modified fuel flow in kg/s may be less than 1.

The climb nvPM emissions index ratio-modified fuel flow of the gas turbine engine 10 in kg/s may be less than 1.05, more preferably less than 0.96, and yet even more preferably less than 0.873.

The climb nvPM emissions index ratio-modified fuel flow of the gas turbine engine 10 in kg/s may be less than or equal to 0.498, more preferably less than or equal to 0.456, and further preferably less than or equal to 0.415.

The climb nvPM emissions index ratio-modified fuel flow of the gas turbine engine 10 in kg/s may be less than or equal to 0.496, more preferably less than or equal to 0.455 and further preferably less than or equal to 0.413.

In any of the examples in the previous paragraphs where only an upper bound of the climb nvPM emissions index ratio-modified fuel flow is defined, the lower bound may be greater than zero.

In any example above, the climb nvPM emissions index ratio-modified fuel flow of the gas turbine engine 10 in kg/s may be greater than or equal to 0.234, preferably greater than or equal to 0.263, and further preferably greater than or equal to 0.292.

In any example above, the climb nvPM emissions index ratio-modified fuel flow of the gas turbine engine 10 in kg/s may be greater than or equal to 0.274, preferably greater than or equal to 0.308 and further preferably greater than or equal to 0.342.

In some examples, the climb nvPM emissions index ratio-modified fuel flow of the gas turbine engine 10 in kg/s may be in the range 0.234 to 0.498, preferably in the range 0.263 to 0.456, and further preferably in the range 0.292 to 0.415.

In some examples, the climb nvPM emissions index ratio-modified fuel flow of the gas turbine engine 10 in kg/s may be in the range 0.234 to 0.496, preferably in the range 0.263 to 0.455 and further preferably in the range 0.292 to 0.413.

In some examples, the climb nvPM emissions index ratio-modified fuel flow of the gas turbine engine 10 in kg/s may be in the range 0.274 to 0.498, preferably in the range 0.308 to 0.456 and further preferably in the range 0.342 to 0.415.

In some examples, the climb nvPM emissions index ratio-modified fuel flow of the gas turbine engine 10 in kg/s may be less than or equal to 0.23, 0.234, 0.24, 0.26, 0.28, 0.3, 0.32, 0.34, 0.36, 0.38, 0.4, 0.42, 0.44, 0.46, 0.48, 0.498, 0.5, or any range defined between any two of these values.

The $W_{f,climb}$ of the gas turbine engine 10 may be as defined anywhere else herein. In any of the examples above, $W_{f,climb}$ may be in the range of 0.492 to 1.05 kg/s, preferably in the range of 0.554 to 0.960 kg/s, more preferably in the range of 0.616 to 0.873 kg/s. In some examples, $W_{f,climb}$ may be in the range of 0.492 to 1.05 kg/s, preferably in the range of 0.554 to 0.957 kg/s, more preferably in the range of 0.616 to 0.870 kg/s. In some examples, $W_{f,climb}$ may be in the range of 0.577 to 1.05 kg/s, preferably in the range of 0.649 to 0.960 kg/s, more preferably in the range of 0.721 to 0.873 kg/s.

An approach nvPM emissions index ratio-modified fuel flow is defined as:

$$\frac{EI_{approach,SAF}}{EI_{approach,FF}} \times W_{f,approach} \qquad (15)$$

Where $EI_{approach,SAF}$ and $EI_{approach,FF}$ are as defined above. $W_{f,approach}$ is as defined elsewhere herein i.e. the mass flow rate of fuel provided to the plurality of fuel spray nozzles 124 in kg/s when the gas turbine engine 10 is operating at 30% available thrust for given operating conditions (e.g. during an approach operating phase). The approach nvPM emissions index ratio-modified fuel flow represents the fuel flow at approach operation scaled by the respective nvPM emissions index ratio.

Additionally, or alternatively, in any example defined or claimed herein, the approach nvPM emissions index ratio-modified fuel flow of the gas turbine engine 10 in kg/s may be less than 1. More specifically, the approach nvPM emissions index ratio-modified fuel flow in kg/s may be less than 0.4.

In some examples, the approach nvPM emissions index ratio-modified fuel flow of the gas turbine engine 10 in kg/s may be less than 0.343, more preferably less than 0.314, and yet even more preferably less than 0.286. The approach nvPM emissions index ratio-modified fuel flow of the gas turbine engine 10 in kg/s may be less than 0.341, more preferably less than 0.313, and yet even more preferably less than 0.284.

The approach nvPM emissions index ratio-modified fuel flow of the gas turbine engine 10 in kg/s may be less than or equal to 0.0526, more preferably less than or equal to 0.0482, and further preferably less than or equal to 0.0439.

The approach nvPM emissions index ratio-modified fuel flow of the gas turbine engine 10 in kg/s may be less than or equal to 0.0524, more preferably less than or equal to 0.048 and further preferably less than or equal to 0.0437.

In any of the examples in the previous paragraphs where only an upper bound is defined, the approach nvPM emissions index ratio-modified fuel flow of the gas turbine engine 10 in kg/s may additionally be greater than zero.

In any example above, the approach nvPM emissions index ratio-modified fuel flow of the gas turbine engine 10 in kg/s may be greater than or equal to 0.0269, preferably greater than or equal to 0.0302 and further preferably greater than or equal to 0.0336.

In any example above, the approach nvPM emissions index ratio-modified fuel flow of the gas turbine engine 10 in kg/s may be greater than or equal to 0.0301, preferably greater than or equal to 0.0339 and further preferably greater than or equal to 0.0376.

In some examples, the approach nvPM emissions index ratio-modified fuel flow of the gas turbine engine 10 in kg/s may be in the range 0.0269 to 0.0526, preferably in the range 0.0302 to 0.0482, and further preferably in the range 0.0336 to 0.0439.

In some examples, the approach nvPM emissions index ratio-modified fuel flow of the gas turbine engine 10 in kg/s may be in the range 0.0269 to 0.0524, preferably in the range 0.0302 to 0.0480 and further preferably in the range 0.0336 to 0.0437.

In some examples, the approach nvPM emissions index ratio-modified fuel flow of the gas turbine engine 10 in kg/s may be in the range 0.0301 to 0.0526, preferably in the range 0.0339 to 0.0482 and further preferably in the range 0.0376 to 0.0439.

In some examples, the approach nvPM emissions index ratio-modified fuel flow of the gas turbine engine 10 in kg/s may be less than or equal to 0.026, 0.0269, 0.028, 0.03, 0.032, 0.034, 0.036, 0.038, 0.04, 0.042, 0.044, 0.046, 0.048, 0.05, 0.052, 0.0526, 0.053, or any range defined between any two of these values.

The $W_{f,approach}$ of the gas turbine engine 10 may be as defined anywhere else herein. In any of the examples above, $W_{f,approach}$ may be in the range of 0.175 to 0.343 kg/s, preferably in the range of 0.197 to 0.314 kg/s, more preferably in the range of 0.219 to 0.286 kg/s. In some examples, $W_{f,approach}$ may be in the range of 0.175 to 0.341 kg/s, preferably in the range of 0.197 to 0.313 kg/s, more preferably in the range of 0.219 to 0.284 kg/s. In some examples, $W_{f,approach}$ may be in the range of 0.196 to 0.343 kg/s, preferably in the range of 0.220 to 0.314 kg/s, more preferably in the range of 0.245 to 0.286 kg/s.

An idle nvPM emissions index ratio-modified fuel flow is defined as:

$$\frac{EI_{idle,SAF}}{EI_{idle,FF}} \times W_{f,idle} \qquad (16)$$

Where $EI_{idle,SAF}$ and $EI_{idle,FF}$ are as defined above. $W_{f,idle}$ is defined as the mass flow rate of fuel provided to the plurality of fuel spray nozzles 124 in kg/s when the gas turbine engine 10 is operating at 7% available thrust for given operating conditions (e.g. during an idle operating phase). The idle nvPM emissions index ratio-modified fuel flow represents the fuel flow at idle operation scaled by the respective nvPM emissions index ratio.

Additionally, or alternatively, in any example defined or claimed herein, the idle nvPM emissions index ratio-modified fuel flow of the gas turbine engine 10 in kg/s may be less than 1. More specifically, the idle nvPM emissions index ratio-modified fuel flow in kg/s may be less than 0.2.

In some examples, the idle nvPM emissions index ratio-modified fuel flow of the gas turbine engine 10 in kg/s may be less than 0.118, more preferably less than 0.108, and yet even more preferably less than 0.0981. The idle nvPM emissions index ratio-modified fuel flow of the gas turbine engine 10 in kg/s may be less than 0.117, more preferably less than 0.107, and yet even more preferably less than 0.097.

The idle nvPM emissions index ratio-modified fuel flow of the gas turbine engine 10 in kg/s may be less than or equal to 0.0113, more preferably less than or equal to 0.0104 and further preferably less than or equal to 0.0094.

The idle nvPM emissions index ratio-modified fuel flow of the gas turbine engine 10 in kg/s may be less than or equal to 0.0112, more preferably less than or equal to 0.0103 and further preferably less than or equal to 0.00929.

In any of the examples in the previous paragraph, where only an upper bound is defined, the idle nvPM emissions index ratio-modified fuel flow of the gas turbine engine 10 in kg/s may additionally be greater than zero.

In any example above, the idle nvPM emissions index ratio-modified fuel flow of the gas turbine engine 10 in kg/s may be greater than or equal to 0.00666, preferably greater than or equal to 0.00749, and further preferably greater than or equal to 0.00833.

In any example above, the idle nvPM emissions index ratio-modified fuel flow of the gas turbine engine 10 in kg/s may be greater than or equal to 0.00682, preferably greater than or equal to 0.00767 and further preferably greater than or equal to 0.00853.

In some examples, the idle nvPM emissions index ratio-modified fuel flow of the gas turbine engine 10 in kg/s may be in the range 0.00666 to 0.0113, preferably in the range 0.00749 to 0.0104 and further preferably in the range 0.00833 to 0.00940.

In some examples, the idle nvPM emissions index ratio-modified fuel flow of the gas turbine engine 10 in kg/s may be in the range 0.00682 to 0.0112, preferably in the range 0.00767 to 0.0103 and further preferably in the range 0.00853 to 0.00929.

In some examples, the idle nvPM emissions index ratio-modified fuel flow of the gas turbine engine 10 in kg/s may be less than or equal to 0.0065, 0.00666, 0.007, 0.0075, 0.008, 0.0085, 0.009, 0.0095, 0.01, 0.0113, 0.015, or any range defined between any two of these values.

The $W_{f,idle}$ of the gas turbine engine 10 may be as defined anywhere else herein. In any of the examples above, $W_{f,idle}$ may be in the range of 0.0695 to 0.118 kg/s, preferably in the range of 0.0782 to 0.108 kg/s, more preferably in the range of 0.0869 to 0.0981 kg/s. In some examples, $W_{f,idle}$ may be in the range of 0.0712 to 0.117 kg/s, preferably in the range of 0.0801 to 0.107 kg/s, more preferably in the range of 0.0890 to 0.0970 kg/s.

Lean Cruise, Lean Cruise/MTO, Idle/Lean Cruise, Rich Cruise, Rich Cruise/MTO and Idle/Rich Cruise nvPM Emissions Index Ratios A lean cruise nvPM emissions index ratio is defined as:

$$\frac{EI_{cruise(lean),SAF}}{EI_{cruise(lean),FF}} \quad (17)$$

Where $EI_{cruise\ (lean),SAF}$ is defined as:

$$\frac{EI_{maxTO,SAF} + EI_{climb,SAF}}{2} \quad (18)$$

and $EI_{cruise\ (lean),FF}$ is defined as:

$$\frac{EI_{maxTO,FF} + EI_{climb,FF}}{2} \quad (19)$$

$EI_{cruise\ (lean),SAF}$ and $EI_{cruise\ (lean),FF}$ represent the nvPM emissions index when the gas turbine engine 10 is operating in a lean cruise operating phase and is running on a fuel comprising SAF and a fossil-based hydrocarbon fuel respectively. Lean cruise may be, for example, when the gas turbine engine 10 is operating in the pilot plus main operating mode described above. $EI_{cruise\ (lean),SAF}$ is determined by finding the average (mean) of the nvPM emissions indices when the gas turbine engine 10 is operating using a fuel comprising SAF in a max take off operating phase (i.e. at 100% available thrust) and when it is operating using a fuel comprising SAF in a climb operating phase (i.e. operating at 85% available thrust). In equations (18) and (19) above, E/maxTO,SAF, $EI_{climb,SAF}$, $EI_{maxTO,FF}$ and $EI_{climb,FF}$ are as defined elsewhere herein. The lean cruise nvPM emissions index ratio represents a ratio of the emissions index at lean cruise when using a fuel comprising SAF to the emissions index at lean cruise when using a fossil-based hydrocarbon fuel.

Additionally, or alternatively, in any example defined or claimed herein, the lean cruise nvPM emissions index ratio of the gas turbine engine 10 may be less than 1. More specifically the lean cruise nvPM emissions index ratio of the gas turbine engine 10 may be less than or equal to 0.9 and preferably less than or equal to 0.8.

In some examples, the lean cruise nvPM emissions index ratio of the gas turbine engine 10 may be less than or equal to 0.732, preferably less than or equal to 0.671 and further preferably less than or equal to 0.61.

In some examples, the lean cruise nvPM emissions index ratio of the gas turbine engine 10 may be less than or equal to 0.708, preferably less than or equal to 0.649 and further preferably less than or equal to 0.59.

More generally, in some examples, the lean cruise nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or in any range defined between any two of these values.

In any of the examples in the previous paragraphs where only an upper bound is defined, the lean cruise nvPM emissions index ratio of the gas turbine engine 10 may be greater than zero.

In any example above, the lean cruise nvPM emissions index ratio of the gas turbine engine 10 may be greater than or equal to 0.455, preferably greater than or equal to 0.512 and further preferably greater than or equal to 0.569.

In any example above, the lean cruise nvPM emissions index ratio of the gas turbine engine 10 may be greater than or equal to 0.461, preferably greater than or equal to 0.519 and further preferably greater than or equal to 0.577.

In some examples, the lean cruise nvPM emissions index ratio of the gas turbine engine 10 may be in the range 0.455 to 0.732, preferably in the range 0.512 to 0.671 and further preferably in the range 0.569 to 0.610.

In some examples, the lean cruise nvPM emissions index ratio of the gas turbine engine 10 may be in the range 0.455 to 0.708, preferably in the range 0.512 to 0.649 and further preferably in the range 0.569 to 0.590.

In some examples, the lean cruise nvPM emissions index ratio of the gas turbine engine 10 may be in the range 0.461 to 0.732, preferably in the range 0.519 to 0.671 and further preferably in the range 0.577 to 0.610.

In some examples, the lean cruise nvPM emissions index ratio of the gas turbine engine 10 may be 0.45, 0.455, 0.46, 0.47, 0.48, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.732, 0.74, or within any range defined between any two of these values.

A lean cruise/MTO nvPM emissions index ratio is defined as:

$$\frac{EI_{cruise(lean),SAF}/EI_{maxTO,SAF}}{EI_{cruise(lean),FF}/EI_{maxTO,FF}} \quad (20)$$

where $EI_{cruise\ (lean),SAF}$ and $EI_{cruise\ (lean),FF}$ are as defined earlier in this section, and $EI_{maxTO,SAF}$ and $EI_{maxTO,FF}$ are as defined elsewhere herein. The lean cruise/MTO nvPM emissions index ratio represents a ratio of the nvPM emissions index ratio using a fuel comprising SAF at lean cruise divided by that at MTO to the nvPM emissions index ratio using fossil-based fuel at lean cruise divided by that at MTO.

Additionally, or alternatively, in any example defined or claimed herein, the lean cruise/MTO nvPM emissions index ratio of the gas turbine engine 10 may be less than 1. More specifically, the lean cruise/MTO nvPM emissions index ratio of the gas turbine engine 10 may be less than or equal to 0.98 and preferably less than or equal to 0.96.

In some examples, the lean cruise/MTO nvPM emissions index ratio of the gas turbine engine 10 is less than or equal to 0.95, preferably less than or equal to 0.944.

In some examples, the lean cruise/MTO nvPM emissions index ratio of the gas turbine engine 10 may be less than or equal to 0.95, preferably less than or equal to 0.914.

In some examples, the lean cruise/MTO nvPM emissions index ratio of the gas turbine engine 10 may be less than or equal to 0.96, preferably less than or equal to 0.95 and further preferably less than or equal to 0.944.

More generally, in some examples, the lean cruise/MTO nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

In any of the examples in the previous paragraphs, where only an upper bound is defined, the lean cruise/MTO nvPM emissions index ratio may be greater than zero.

In any example above, the lean cruise/MTO nvPM emissions index ratio of the gas turbine engine 10 may be greater than or equal to 0.704, preferably greater than or equal to 0.792 and further preferably greater than or equal to 0.88.

In any example above, the lean cruise/MTO nvPM emissions index ratio of the gas turbine engine 10 may be greater than or equal to 0.714, preferably greater than or equal to 0.804 and further preferably greater than or equal to 0.893.

In some examples, the lean cruise/MTO nvPM emissions index ratio of the gas turbine engine 10 may be in the range 0.704 to 0.960, preferably in the range 0.792 to 0.950 and further preferably in the range 0.880 to 0.944.

In some examples, the lean cruise/MTO nvPM emissions index ratio of the gas turbine engine 10 may be in the range 0.704 to 0.960, preferably in the range 0.792 to 0.950 and further preferably in the range 0.880 to 0.914.

In some examples, the lean cruise/MTO nvPM emissions index ratio of the gas turbine engine 10 may be in the range 0.714 to 0.960, preferably in the range 0.804 to 0.950 and further preferably in the range 0.893 to 0.944.

In some examples, the lean cruise/MTO nvPM emissions index ratio of the gas turbine engine 10 may be 0.7, 0.704, 0.725, 0.75, 0.775, 0.8, 0.825, 0.85, 0.875, 0.9, 0.925, 0.95, 0.96, or within any range defined between any two of these values.

An idle/lean cruise nvPM emissions index ratio is defined as:

$$\frac{EI_{idle,SAF}/EI_{cruise(lean),SAF}}{EI_{idle,FF}/EI_{cruise(lean),FF}} \tag{21}$$

where $EI_{cruise\ (lean),SAF}$ and $EI_{cruise\ (lean),FF}$ are as defined earlier in this section, and $EI_{idle,SAF}$ and $EI_{idle,FF}$ are as defined elsewhere herein. The idle/lean cruise nvPM emissions index ratio represents a ratio of the nvPM emissions index ratio using a fuel comprising SAF at idle divided by that at lean cruise to the nvPM emissions index ratio using fossil-based fuel at idle divided by that at lean cruise.

Additionally, or alternatively, in any example defined or claimed herein, the idle/lean cruise nvPM emissions index ratio of the gas turbine engine 10 may be less than 1. More specifically, the idle/lean cruise nvPM emissions index ratio of the gas turbine engine 10 may be less than or equal to 0.8, preferably less than or equal to 0.6, even preferably less than or equal to 0.4, and even further preferably less than or equal to 0.3.

In some examples, the idle/lean cruise nvPM emissions index ratio of the gas turbine engine 10 may be less than or equal to 0.203, preferably less than or equal to 0.186 and further preferably less than or equal to 0.169.

In some examples, the idle/lean cruise nvPM emissions index ratio of the gas turbine engine 10 may be less than or equal to 0.2, preferably less than or equal to 0.183 and further preferably less than or equal to 0.167.

More generally, the idle/lean cruise nvPM emissions index ratio may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

In any of the examples in the paragraphs above, where only an upper bound is defined, the idle/lean cruise nvPM emissions index ratio may be greater than zero.

In any example above, the idle/lean cruise nvPM emissions index ratio of the gas turbine engine 10 may be greater than or equal to 0.129, preferably greater than or equal to 0.146 and further preferably greater than or equal to 0.162.

In any example above, the idle/lean cruise nvPM emissions index ratio of the gas turbine engine 10 may be greater than or equal to 0.125, preferably greater than or equal to 0.141 and further preferably greater than or equal to 0.157.

In some examples, the idle/lean cruise nvPM emissions index ratio of the gas turbine engine 10 may be in the range 0.125 to 0.203, preferably in the range 0.141 to 0.186 and further preferably in the range 0.157 to 0.169.

In some examples, the idle/lean cruise nvPM emissions index ratio may be in the range 0.129 to 0.203, preferably in the range 0.146 to 0.186 and further preferably in the range 0.162 to 0.169.

In some examples, the idle/lean cruise nvPM emissions index ratio of the gas turbine engine 10 may be in the range 0.125 to 0.200, preferably in the range 0.141 to 0.183 and further preferably in the range 0.157 to 0.167.

In some examples, the idle/lean cruise nvPM emissions index ratio may be 0.125, 0.13, 0.135, 0.14, 0.145, 0.15, 0.155, 0.16, 0.165, 0.17, 0.175, 0.18, 0.185, 0.19, 0.195, 0.2, 0.203 or within any range defined between any two of these values.

A rich cruise nvPM emissions index ratio is defined as:

$$\frac{EI_{cruise(rich),SAF}}{EI_{cruise(rich),FF}} \tag{22}$$

Where $EI_{cruise\ (rich),SAF}$ is defined as:

$$\frac{EI_{climbs,SAF} + EI_{approach,SAF}}{2} \tag{23}$$

and $EI_{cruise\ (rich),FF}$ is defined as:

$$\frac{EI_{climb,FF} + EI_{approach,FF}}{2} \tag{24}$$

$EI_{cruise\ (rich),SAF}$ and $EI_{cruise\ (rich),FF}$ represent the nvPM emissions index when the gas turbine engine 10 is operating in a rich cruise operating phase and is running on a fuel comprising SAF and a fossil-based hydrocarbon fuel respectively. Rich cruise may be, for example, when the gas turbine engine 10 is operating in the pilot only operating mode described above. $EI_{cruise\ (rich),SAF}$ is determined by finding the average (mean) of the nvPM emissions indices when the gas turbine engine 10 is operating using a fuel comprising SAF in a climb operating phase (i.e. at 85% available thrust) and when it is operating using a fuel comprising SAF in an approach operating phase (i.e. operating at 30% available thrust). In equations (24) and (25) above, $EI_{climb,SAF}$, $EI_{approach,SAF}$, $EI_{climb,FF}$ and $EI_{approach,FF}$ are as defined elsewhere herein. The rich cruise nvPM emissions index ratio represents a ratio of the emissions index at rich cruise when using a fuel comprising SAF to the emissions index at rich cruise when using a fossil-based hydrocarbon fuel.

Additionally or alternatively, in any example defined or claimed herein, the rich cruise nvPM emissions index ratio of the gas turbine engine 10 may be less than 1. More specifically, the rich cruise nvPM emissions index ratio of the gas turbine engine 10 may be less than or equal to 0.8, preferably less than or equal to 0.6, even preferably less than or equal to 0.4.

In some examples, the rich cruise nvPM emissions index ratio of the gas turbine engine 10 may be less than or equal to 0.303, preferably less than or equal to 0.278 and further preferably less than or equal to 0.252.

In some examples, the rich cruise nvPM emissions index ratio of the gas turbine engine 10 may be less than or equal to 0.186, preferably less than or equal to 0.17 and further preferably less than or equal to 0.155.

More generally, in some examples, the rich cruise nvPM emissions index ratio of the gas turbine engine 10 may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

In any of the examples of the previous paragraphs, where only an upper bound is defined, the rich cruise nvPM emissions index ratio may be greater than zero.

In any example above, the rich cruise nvPM emissions index ratio of the gas turbine engine 10 may be greater than or equal to 0.123, preferably greater than or equal to 0.138 and further preferably greater than or equal to 0.154.

In any example above, the rich cruise nvPM emissions index ratio of the gas turbine engine 10 may be greater than or equal to 0.162, preferably greater than or equal to 0.182 and further preferably greater than or equal to 0.203.

In some examples, the rich cruise nvPM emissions index ratio of the gas turbine engine 10 may be in the range 0.123 to 0.303, preferably in the range 0.138 to 0.278 and further preferably in the range 0.154 to 0.252.

In some examples, the rich cruise nvPM emissions index ratio of the gas turbine engine 10 may be in the range 0.162 to 0.303, preferably in the range 0.182 to 0.278 and further preferably in the range 0.203 to 0.252.

In some examples, the rich cruise nvPM emissions index ratio of the gas turbine engine 10 may be in the range 0.123 to 0.186, preferably in the range 0.138 to 0.170 and further preferably in the range 0.154 to 0.155.

In some examples, the rich cruise nvPM emissions index ratio of the gas turbine engine 10 may be 0.12, 0.123, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.303 or within any range defined between any two of these values.

A rich cruise/MTO nvPM emissions index ratio is defined as:

$$EI_{cruise(rich),SAF}/EI_{maxTO,SAF} \qquad (25)$$
$$EI_{cruise(rich),FF}/EI_{maxTO,FF}$$

where $EI_{cruise\ (rich),SAF}$ and $EI_{cruise\ (rich),FF}$ are as defined earlier in this section, and $EI_{maxTO,SAF}$ and $EI_{maxTO,FF}$ are as defined elsewhere herein. The rich cruise/MTO nvPM emissions index ratio represents a ratio of the nvPM emissions index using a fuel comprising SAF at rich cruise divided by that at MTO to the nvPM emissions index using fossil-based fuel at rich cruise divided by that at MTO.

Additionally, or alternatively, in any example defined or claimed herein, the rich cruise/MTO nvPM emissions index ratio of the gas turbine engine 10 may be less than 1. More specifically, the rich cruise/MTO nvPM emissions index ratio of the gas turbine engine 10 may be less than or equal to 0.8, preferably less than or equal to 0.6 and even preferably less than or equal to 0.5.

In some examples, the rich cruise/MTO nvPM emissions index ratio of the gas turbine engine 10 may be less than or equal to 0.469, preferably less than or equal to 0.43 and further preferably less than or equal to 0.391.

In some examples, the rich cruise/MTO nvPM emissions index ratio of the gas turbine engine 10 may be less than or equal to 0.287, preferably less than or equal to 0.264 and further preferably less than or equal to 0.24.

More generally, the rich cruise/MTO nvPM emissions index ratio of the gas turbine engine 10 may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

In any of the examples in the previous paragraphs in which only an upper bound is defined, the rich cruise/MTO nvPM emissions index ratio may be greater than zero.

In any example above, the rich cruise/MTO nvPM emissions index ratio of the gas turbine engine 10 may be greater than or equal to 0.191, preferably greater than or equal to 0.214 and further preferably greater than or equal to 0.238.

In any example above, the rich cruise/MTO nvPM emissions index ratio of the gas turbine engine 10 may be greater than or equal to 0.251, preferably greater than or equal to 0.283 and further preferably greater than or equal to 0.314.

In some examples, the rich cruise/MTO nvPM emissions index ratio of the gas turbine engine 10 may be in the range 0.191 to 0.469, preferably in the range 0.214 to 0.430 and further preferably in the range 0.238 to 0.391.

In some examples, the rich cruise/MTO nvPM emissions index ratio of the gas turbine engine 10 may be in the range 0.251 to 0.469, preferably in the range 0.283 to 0.430 and further preferably in the range 0.314 to 0.391.

In some examples, the rich cruise/MTO nvPM emissions index ratio of the gas turbine engine 10 may be in the range 0.191 to 0.287, preferably in the range 0.214 to 0.264 and further preferably in the range 0.238 to 0.240.

In some examples, the rich cruise/MTO nvPM emissions index ratio of the gas turbine engine 10 may be 0.19, 0.191, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.469, 0.47, or within any range defined between any two of these values.

An idle/rich cruise nvPM emissions index ratio is defined as:

$$EI_{idle,SAF}/EI_{cruise(rich),SAF} \qquad (26)$$
$$EI_{idle,FF}/EI_{cruise(rich),FF}$$

where $EI_{cruise\ (rich),SAF}$ and $EI_{cruise\ (rich),FF}$ are as defined earlier in this section, and $EI_{idle,SAF}$ and $EI_{idle,FF}$ are as defined elsewhere herein. The idle/rich cruise nvPM emissions index ratio represents a ratio of the nvPM emissions index using a fuel comprising SAF at idle divided by that at rich cruise to the nvPM emissions index using fossil-based fuel at idle divided by that at rich cruise.

Additionally, or alternatively, in any example defined or claimed herein, the idle/rich cruise nvPM emissions index ratio of the gas turbine engine 10 may be less than 1. More specifically, the idle/rich cruise nvPM emissions index ratio of the gas turbine engine 10 may be less than or equal to 0.9 and preferably less than or equal to 0.8.

In some examples, the idle/rich cruise nvPM emissions index ratio of the gas turbine engine 10 may be less than or equal to 0.746, preferably less than or equal to 0.683 and further preferably less than or equal to 0.621.

In some examples, the idle/rich cruise nvPM emissions index ratio of the gas turbine engine 10 may be less than or equal to 0.566, preferably less than or equal to 0.519 and further preferably less than or equal to 0.472.

More generally, the idle/rich cruise nvPM emissions index ratio of the gas turbine engine 10 may be less than 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or 0.05, or any range defined between any two of these values.

In any of the examples in the previous paragraphs in which only an upper bound is defined, the idle/rich cruise nvPM emissions index ratio of the gas turbine engine 10 may be greater than zero.

In any example above, the idle/rich cruise nvPM emissions index ratio of the gas turbine engine 10 may be greater than or equal to 0.304, preferably greater than or equal to 0.342 and further preferably greater than or equal to 0.38.

In any example above, the idle/rich cruise nvPM emissions index ratio of the gas turbine engine 10 may be greater than or equal to 0.496, preferably greater than or equal to 0.558 and further preferably greater than or equal to 0.62.

In some examples, the idle/rich cruise nvPM emissions index ratio of the gas turbine engine 10 may be in the range 0.304 to 0.746, preferably in the range 0.342 to 0.683 and further preferably in the range 0.380 to 0.621.

In some examples, the idle/rich cruise nvPM emissions index ratio of the gas turbine engine 10 may be in the range 0.304 to 0.566, preferably in the range 0.342 to 0.519 and further preferably in the range 0.380 to 0.472.

In some examples, the idle/rich cruise nvPM emissions index ratio of the gas turbine engine 10 may be in the range 0.496 to 0.746, preferably in the range 0.558 to 0.683 and further preferably in the range 0.620 to 0.621.

In some examples, the idle/rich cruise nvPM emissions index ratio of the gas turbine engine 10 may be 0.3, 0.304, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.746, 0.75, or within any range defined between any two of these values.

Emission Indices

In any of the examples defined or claimed anywhere herein, any one or more of the emission indices of the gas turbine engine 10 may be as follows:

$EI_{maxTO}$ may be in the range of 0.00893 to 4.72 mg/kg and preferably in the range of 0.0100 to 4.33 mg/kg and more preferably in the range of 0.0111 to 3.94 mg/kg.

$EI_{maxTO}$ may be in the range of 0.767 to 4.72 mg/kg and preferably in the range of 0.863 to 4.33 mg/kg and more preferably in the range of 0.959 to 3.94 mg/kg.

$EI_{maxTO}$ may be in the range of 0.00893 to 0.0809 mg/kg and preferably in the range of 0.0100 to 0.0741 mg/kg and more preferably in the range of 0.0111 to 0.0674 mg/kg.

$EI_{maxTO,SAF}$ may be in the range of 0.00893 to 3.05 mg/kg and preferably in the range of 0.0100 to 2.80 mg/kg and more preferably in the range of 0.0111 to 2.54 mg/kg.

$EI_{maxTO,SAF}$ may be in the range of 0.767 to 3.05 mg/kg and preferably in the range of 0.863 to 2.80 mg/kg and more preferably in the range of 0.959 to 2.54 mg/kg.

$EI_{maxTO,SAF}$ may be in the range of 0.00893 to 0.0523 mg/kg and preferably in the range of 0.0100 to 0.0479 mg/kg and more preferably in the range of 0.0111 to 0.0436 mg/kg.

$EI_{maxTO,SAF}$ may be in the range of 0.00893 to 4.71 mg/kg and preferably in the range of 0.0100 to 4.32 mg/kg and more preferably in the range of 0.0111 to 3.93 mg/kg.

$EI_{maxTO,SAF}$ may be in the range of 0.767 to 4.71 mg/kg and preferably in the range of 0.863 to 4.32 mg/kg and more preferably in the range of 0.959 to 3.93 mg/kg.

$EI_{maxTO,SAF}$ may be in the range of 0.00893 to 0.0808 mg/kg and preferably in the range of 0.0100 to 0.0740 mg/kg and more preferably in the range of 0.0111 to 0.0673 mg/kg.

$EI_{maxTO,FF}$ may be in the range of 0.0138 to 4.72 mg/kg and preferably in the range of 0.0155 to 4.33 mg/kg and more preferably in the range of 0.0172 to 3.94 mg/kg.

$EI_{maxTO,FF}$ may be in the range of 1.18 to 4.72 mg/kg and preferably in the range of 1.33 to 4.33 mg/kg and more preferably in the range of 1.48 to 3.94 mg/kg.

$EI_{maxTO,FF}$ may be in the range of 0.0138 to 0.0809 mg/kg and preferably in the range of 0.0155 to 0.0741 mg/kg and more preferably in the range of 0.0172 to 0.0674 mg/kg.

$EI_{climb}$ may be in the range of 0.00438 to 2.30 mg/kg and preferably in the range of 0.00493 to 2.11 mg/kg and more preferably in the range of 0.00548 to 1.92 mg/kg.

$EI_{climb}$ may be in the range of 0.460 to 2.30 mg/kg and preferably in the range of 0.517 to 2.11 mg/kg and more preferably in the range of 0.575 to 1.92 mg/kg.

$EI_{climb}$ may be in the range of 0.00438 to 0.0221 mg/kg and preferably in the range of 0.00493 to 0.0202 mg/kg and more preferably in the range of 0.00548 to 0.0184 mg/kg.

$EI_{climb,SAF}$ may be in the range of 0.00438 to 1.09 mg/kg and preferably in the range of 0.00493 to 0.999 mg/kg and more preferably in the range of 0.00548 to 0.909 mg/kg.

$EI_{climb,SAF}$ may be in the range of 0.460 to 1.09 mg/kg and preferably in the range of 0.517 to 0.999 mg/kg and more preferably in the range of 0.575 to 0.909 mg/kg.

$EI_{climb,SAF}$ may be in the range of 0.00438 to 0.0105 mg/kg and preferably in the range of 0.00493 to 0.00959 mg/kg and more preferably in the range of 0.00548 to 0.00872 mg/kg.

$EI_{climb,SAF}$ may be in the range of 0.00438 to 2.29 mg/kg and preferably in the range of 0.00493 to 2.10 mg/kg and more preferably in the range of 0.00548 to 1.91 mg/kg.

$EI_{climb,SAF}$ may be in the range of 0.460 to 2.29 mg/kg and preferably in the range of 0.517 to 2.10 mg/kg and more preferably in the range of 0.575 to 1.91 mg/kg.

$EI_{climb,SAF}$ may be in the range of 0.00438 to 0.0220 mg/kg and preferably in the range of 0.00493 to 0.0201 mg/kg and more preferably in the range of 0.00548 to 0.0183 mg/kg.

$EI_{climb,FF}$ may be in the range of 0.00923 to 2.30 mg/kg and preferably in the range of 0.0103 to 2.11 mg/kg and more preferably in the range of 0.0115 to 1.92 mg/kg.

$EI_{climb,FF}$ may be in the range of 0.969 to 2.30 mg/kg and preferably in the range of 1.09 to 2.11 mg/kg and more preferably in the range of 1.21 to 1.92 mg/kg.

$EI_{climb,FF}$ may be in the range of 0.00923 to 0.0221 mg/kg and preferably in the range of 0.0103 to 0.0202 mg/kg and more preferably in the range of 0.0115 to 0.0184 mg/kg.

$EI_{approach}$ may be in the range of 0.337 to 12.6 mg/kg and preferably in the range of 0.379 to 11.6 mg/kg and more preferably in the range of 0.421 to 10.5 mg/kg.

$EI_{approach}$ may be in the range of 0.571 to 9.89 mg/kg and preferably in the range of 0.643 to 9.07 mg/kg and more preferably in the range of 0.714 to 8.25 mg/kg.

$EI_{approach,SAF}$ may be in the range of 0.337 to 1.94 mg/kg and preferably in the range of 0.379 to 1.78 mg/kg and more preferably in the range of 0.421 to 1.62 mg/kg.

$EI_{approach,SAF}$ may be in the range of 0.571 to 1.52 mg/kg and preferably in the range of 0.643 to 1.40 mg/kg and more preferably in the range of 0.714 to 1.27 mg/kg.

$EI_{approach,SAF}$ may be in the range of 0.337 to 12.5 mg/kg and preferably in the range of 0.379 to 11.5 mg/kg and more preferably in the range of 0.421 to 10.4 mg/kg.

$EI_{approach,SAF}$ may be in the range of 0.571 to 9.88 mg/kg and preferably in the range of 0.643 to 9.06 mg/kg and more preferably in the range of 0.714 to 8.24 mg/kg.

$EI_{approach,FF}$ may be in the range of 2.19 to 12.6 mg/kg and preferably in the range of 2.47 to 11.6 mg/kg and more preferably in the range of 2.74 to 10.5 mg/kg.

$EI_{approach,FF}$ may be in the range of 3.72 to 9.89 mg/kg and preferably in the range of 4.18 to 9.07 mg/kg and more preferably in the range of 4.65 to 8.25 mg/kg.

$EI_{idle}$ may be in the range of 0.0525 to 1.55 mg/kg and preferably in the range of 0.0591 to 1.43 mg/kg and more preferably in the range of 0.0657 to 1.30 mg/kg.

$EI_{idle}$ may be in the range of 0.0858 to 1.55 mg/kg and preferably in the range of 0.0966 to 1.43 mg/kg and more preferably in the range of 0.107 to 1.30 mg/kg.

$EI_{idle}$ may be in the range of 0.0525 to 1.01 mg/kg and preferably in the range of 0.0591 to 0.925 mg/kg and more preferably in the range of 0.0657 to 0.841 mg/kg.

$EI_{idle,SAF}$ may be in the range of 0.0525 to 0.149 mg/kg and preferably in the range of 0.0591 to 0.137 mg/kg and more preferably in the range of 0.0657 to 0.124 mg/kg.

$EI_{idle,SAF}$ may be in the range of 0.0858 to 0.149 mg/kg and preferably in the range of 0.0966 to 0.137 mg/kg and more preferably in the range of 0.107 to 0.124 mg/kg.

$EI_{idle,SAF}$ may be in the range of 0.0525 to 0.0967 mg/kg and preferably in the range of 0.0591 to 0.0886 mg/kg and more preferably in the range of 0.0657 to 0.0806 mg/kg.

$EI_{idle,SAF}$ may be in the range of 0.0525 to 1.54 mg/kg and preferably in the range of 0.0591 to 1.42 mg/kg and more preferably in the range of 0.0657 to 1.29 mg/kg.

$EI_{idle,SAF}$ may be in the range of 0.0858 to 1.54 mg/kg and preferably in the range of 0.0966 to 1.42 mg/kg and more preferably in the range of 0.107 to 1.29 mg/kg.

$EI_{idle,SAF}$ may be in the range of 0.0525 to 1.00 mg/kg and preferably in the range of 0.0591 to 0.924 mg/kg and more preferably in the range of 0.0657 to 0.840 mg/kg.

$EI_{idle,FF}$ may be in the range of 0.548 to 1.55 mg/kg and preferably in the range of 0.617 to 1.43 mg/kg and more preferably in the range of 0.686 to 1.30 mg/kg.

$EI_{idle,FF}$ may be in the range of 0.896 to 1.55 mg/kg and preferably in the range of 1.00 to 1.43 mg/kg and more preferably in the range of 1.12 to 1.30 mg/kg.

$EI_{idle,FF}$ may be in the range of 0.548 to 1.01 mg/kg and preferably in the range of 0.617 to 0.925 mg/kg and more preferably in the range of 0.686 to 0.841 mg/kg.

Method of Operating a Gas Turbine Engine

Figure 9:
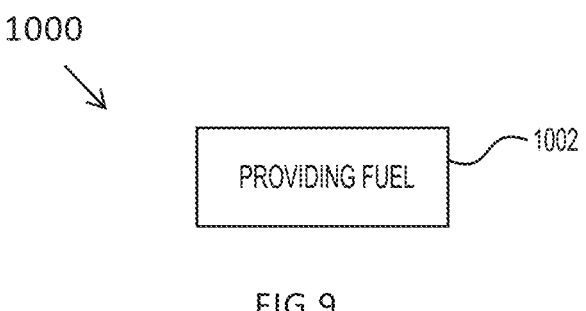
FIG. 9 shows a method of operating the gas turbine engine.

FIG. 9 illustrates a method 1000 of operating the gas turbine engine 10 of any example or aspect defined or claimed herein. The method comprises providing (1002) fuel comprising a sustainable aviation fuel (SAF) to the plurality of fuel spray nozzles (124).

CONCLUSION

Anything described in this section may apply to any aspect or example described or claimed anywhere herein.

For any example gas turbine engine defined herein, the ratio defined in any one or more of expressions 1 to 26 may be as defined or claimed anywhere herein. In other words, the gas turbine engine 10 may be configured such than one or more of the ratios defined herein are within the ranges defined herein.

Any reference to a ratio (or other parameter) "of the gas turbine engine" being within a specific range should be understood to mean that the gas turbine is "configured such that" or "configured such that, in use" the respective ratio or parameter is within the range. In other words, a reference to a ratio or parameter "of the gas turbine engine" being within a specified range should be understood to mean that the gas turbine engine is arranged such that the respective parameter or ratio is within that range when the gas turbine engine is in use.

Any of the parameters defined herein may be determined at suitable given operating conditions. For example, the given operating conditions at which the emissions indices defined herein are determined may be ISA at sea level except that the reference absolute humidity shall be 0.00634 kg water/kg dry air. The predetermined operating conditions may be at sea level static. The predetermined operating conditions may include no customer bleeds and/or no power offtakes. The predetermined operating conditions may be at day conditions. The predetermined operating conditions may be at around 60% relative humidity. The same given operating conditions may be used to evaluate any other parameter defined herein, such as the BPR.

The emissions indices may however be evaluated at other operating conditions. For example, other different operating conditions may be used so long as the same operating conditions are used for all the parameters within a respective ratio.

The emission indices defined herein may be determined using any suitable method as would be known to the skilled person. For example, the procedure for calculating the emission indices defined herein may comprise plotting curves of the nvPM emissions index and NOx emissions index against T3. The known T3 at the 4 LTO reference points (7% thrust, 100% thrust, 85% thrust and 30% thrust) is then used to find the respective emissions index. T3 is defined using the station numbering listed in standard SAE AS755, i.e. T3=high pressure compressor outlet total temperature.

Any reference herein to operation at 7% thrust may more generally be considered to be operation at idle. Any reference herein to operation at 100% thrust may more generally be considered to be operation at max take off. Any reference herein to operation at 85% thrust may more generally be considered to be operation at a climb operating phase. Any reference herein to operation at 30% thrust may more generally be considered to be operation at an approach operating phase. These operating phases may be as defined elsewhere herein.

Any reference to a percentage available thrust given herein should be taken to mean at "approximately" or at "around" the specified thrust. For example, by "7% available thrust" used anywhere herein we mean "around 7% available thrust". Similarly, by "100% available thrust" used anywhere herein we mean "around 100% available thrust". By "85% available thrust" used anywhere herein we mean "around 85% available thrust". By "30% available thrust" used anywhere herein we mean "around 30% available thrust". By "around" used when specifying a thrust of "XX" we may mean XX±15%, XX±10%, XX±5%, or XX±2%. For example, by "around 7% available thrust" we may mean "2% to 12% available thrust" or "5% to 9% available thrust". For example, by "around 100% available thrust" we may mean "90% to 100% available thrust" or "95% to 100% available thrust" or "98% to 100% available thrust". For example, by "around 30% available thrust" we may mean "20% to 40% available thrust" or "25% to 35% available thrust" or "28% to 32% available thrust". For example, by "around 85% available thrust" we may mean "70% to 100% available thrust" or "75% to 95% available thrust" or "80% to 90% available thrust" or "83% to 87% available thrust".

Any of the ranges defined herein should be understood as an inclusive range i.e. in the range A and B or in the range A to B should include the upper and lower boundaries A and B.

Where a ratio is given as a single number, e.g., '0.5', this refers to the ratio of the given single number to 1, i.e., '0.5' is to be read as '0.5:1'.

Where a number is quoted to one significant figure, e.g., '0.5', this may refer to the same number when quoted to two significant figures where the second significant figure is '0', e.g., '0.50', or when quoted to three significant figures where the third significant figure is '0', e.g., '0.500'. Where a number is quoted to two significant figures, e.g., '0.50', this may refer to the same number when quoted to three significant figures where the third significant figure is '0', e.g., '0.500'. Where a number is quoted to three significant figures, e.g., '0.500', this may refer to the same number when quoted to two significant figures, e.g., '0.50', or one significant figure, e.g., '0.5'. Where a number is quoted to two significant figures, e.g., '0.50', this may refer to the same number when quoted to one significant figure, e.g., '0.5'.

Advantageously, reduced nvPM in the exhaust of a gas turbine engine contributes to a reduction in undesirable emissions of the engine. For example, according to operational conditions, reducing nvPM in such a manner may lead to a reduced degree of soot deposits within the engine within and/or downstream of the combustor, and/or an improvement in local air quality. Furthermore, at certain stages of an aircraft flight (where contrails are otherwise expected to form) reduced nvPM in the exhaust may lead to reduced contrail strength and/or time taken for a contrail to disperse. Still further, it has been recognised that certain parts of the flight cycle at which the nvPM is reduced (or most reduced) can be targeted in order to achieve a desired outcome, for example in terms of environmental impact. Purely by way of example, lower nvPM at cruise conditions may particularly reduce the radiative forcing impact of contrails. Purely by way of further example, lower nvPM at idle conditions may particularly improve local air quality on the ground in the region of engine operation. Purely by way of further example, lower nvPM at MTO conditions may particularly reduce the maximum rate of nvPM production during the flight cycle and/or improve air quality on the ground and/or in the region of engine operation. These considerations may apply to all aspects of the disclosure.

A number of parameters related to gas turbine engine operation have been determined to have an influence on, or are an important factor in, the configuration and arrangement of the combustor of the engine when certain types of fuel, such as a sustainable aviation fuel, are being combusted. Accordingly, any one or more parameters of the aspects disclosed or described above may be advantageously taken into account when determining, for example, operational settings, combustor arrangement and/or combustor configuration, to influence and/or optimise how that fuel is to be distributed, ignited, and/or combusted within the gas turbine engine. These considerations may apply to all aspects of the disclosure.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft, comprising:
a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:
a first idle-maximum take-off (MTO) non-volatile particulate matter (nvPM) emissions index ratio is defined as:

$$\frac{EI_{idle}}{EI_{maxTO}}$$

where:
$EI_{idle}$ is the nvPM emissions index in mg/kg of the gas turbine engine if operating at around 7% available thrust for given operating conditions; and
$EI_{maxTO}$ is the nvPM emissions index in mg/kg of the gas turbine engine if operating at around 100% available thrust for the given operating conditions:
the first idle-MTO nvPM emissions index ratio of the gas turbine engine is less than 60; and
the gas turbine engine is configured to provide fuel comprising a sustainable aviation fuel (SAF) to the plurality of fuel spray nozzles.

2. The gas turbine engine of claim 1 wherein the first idle-MTO nvPM emissions index ratio is less than 58.4.

3. The gas turbine engine of claim 1, wherein the first idle-MTO nvPM emissions index ratio is less than or equal to 45.

4. The gas turbine engine of claim 1, wherein the first idle-MTO nvPM emissions index ratio is less than or equal to 8.65.

5. The gas turbine engine of claim 1, wherein the first idle-MTO nvPM emissions index ratio is greater than or equal to 0.038.

6. The gas turbine engine (10) of claim 1, wherein the first idle-MTO nvPM emissions index ratio is in the range of 0.038 to 8.65.

7. The gas turbine engine of claim 1, wherein:
a second idle-MTO nvPM emissions index ratio is defined as:

$$\frac{EI_{idle,SAF}/EI_{maxTO,SAF}}{EI_{idle,FF}/EI_{maxTO,FF}}$$

where:

EI$_{idle,SAF}$ is the nvPM emissions index in mg/kg of the gas turbine engine if operating at around 7% available thrust for the given operating conditions, or for other different operating conditions, and if a fuel provided to the combustor comprises a sustainable aviation fuel;

EI$_{maxTO,SAF}$ is the nvPM emissions index in mg/kg of the gas turbine engine if operating at around 100% available thrust for the same given operating conditions at which EI$_{idle,SAF}$ is calculated, and if a fuel provided to the combustor comprises a sustainable aviation fuel;

EI$_{idle,FF}$ is the nvPM emissions index in mg/kg of the gas turbine engine if operating at around 7% available thrust for the same given operating conditions at which EI$_{idle,SAF}$ is calculated, and if a fuel provided to the combustor is a fossil-based hydrocarbon fuel;

EI$_{maxTO,FF}$ is the nvPM emissions index in mg/kg of the gas turbine engine if operating at around 100% available thrust for the same given operating conditions at which EI$_{idle,SAF}$ is calculated, and if a fuel provided to the combustor is a fossil-based hydrocarbon fuel; and the second idle-MTO nvPM emissions index ratio of the gas turbine engine is less than 1.

8. The gas turbine engine of claim 7, wherein the second idle-MTO nvPM emissions index ratio is less than or equal to 0.8.

9. The gas turbine engine of claim 7, wherein the second idle-MTO nvPM emissions index ratio is less than or equal to 0.178.

10. The gas turbine engine of claim 7, wherein the second idle-MTO nvPM emissions index ratio is greater than or equal to 0.118.

11. The gas turbine engine of claim 7, wherein the second idle-MTO nvPM emissions index ratio is in the range 0.118 to 0.178.

12. The gas turbine engine of claim 1, wherein the ratio of the number of fuel spray nozzles in the first subset of fuel spray nozzles to the number of fuel spray nozzles in the second subset of fuel spray nozzles is in the range of 1:3 to 1:4.

13. The gas turbine engine of claim 1, wherein the first subset of fuel spray nozzles includes between 1 and 10 fuel spray nozzles.

14. The gas turbine engine of claim 1, wherein the second subset of fuel spray nozzles includes between 10 and 25 fuel spray nozzles.

15. The gas turbine engine of claim 1, wherein the combustor comprises one or more ignitors.

16. The gas turbine engine of claim 15, wherein each of the first subset of fuel spray nozzles is located nearer a respective one or more of the ignitors than the second subset, and/or wherein one or more of the ignitors is arranged diametrically opposite another one or more of the ignitors.

17. The gas turbine engine of claim 1, wherein the fuel provided to the combustor comprises a % SAF in the range of 50% to 100%.

18. A method of operating the gas turbine engine of claim 1, the method comprising providing fuel comprising a sustainable aviation fuel to the plurality of fuel spray nozzles.

19. A method of operating a gas turbine engine, the gas turbine engine comprising:

a combustor, comprising a combustion chamber and a plurality of fuel spray nozzles configured to inject fuel into the combustion chamber, wherein the plurality of fuel spray nozzles comprises a first subset of fuel spray nozzles and a second subset of fuel spray nozzles, wherein the combustor is operable in a condition in which each of the fuel spray nozzles of the first subset of fuel spray nozzles is supplied with fuel at a greater fuel flow rate than each of the fuel spray nozzles of the second subset of fuel spray nozzles, wherein a ratio of the number of fuel spray nozzles in the first subset of fuel spray nozzles to the number of fuel spray nozzles in the second subset of fuel spray nozzles is in the range of 1:2 to 1:5; and wherein:

a first idle-maximum take-off (MTO) non-volatile particulate matter (nvPM) emissions index ratio is defined as:

$$\frac{EI_{idle}}{EI_{maxTO}}$$

where:

EI$_{idle}$ is the nvPM emissions index in mg/kg of the gas turbine engine operating at around 7% available thrust for given operating conditions; and EI$_{maxTO}$ is the nvPM emissions index in mg/kg of the gas turbine engine operating at around 100% available thrust for the given operating conditions; and the first idle-MTO nvPM emissions index ratio of the gas turbine engine is less than 60; and the method comprises providing fuel comprising a sustainable aviation fuel to the plurality of fuel spray nozzles.

20. The method of claim 19, wherein:

a second idle-MTO nvPM emissions index ratio is defined as:

$$\frac{EI_{idle,SAF}/EI_{maxTO,SAF}}{EI_{idle,FF}/EI_{maxTO,FF}}$$

where:

EI$_{idle,SAF}$ is the nvPM emissions index in mg/kg of the gas turbine engine operating at around 7% available thrust for the given operating conditions, or for other different operating conditions, and a fuel provided to the combustor comprises a sustainable aviation fuel;

EI$_{maxTO,SAF}$ is the nvPM emissions index in mg/kg of the gas turbine engine operating at around 100% available thrust for the same given operating conditions at which EI$_{idle,SAF}$ is calculated, and a fuel provided to the combustor comprises a sustainable aviation fuel;

EI$_{idle,FF}$ is the nvPM emissions index in mg/kg of the gas turbine engine operating at around 7% available thrust for the same given operating conditions at which EI$_{idle,SAF}$ is calculated, and a fuel provided to the combustor is a fossil-based hydrocarbon fuel;

EI$_{maxTO,FF}$ is the nvPM emissions index in mg/kg of the gas turbine engine operating at around 100% available thrust for the same given operating conditions at which EI$_{idle,SAF}$ is calculated, and a fuel provided to the combustor is a fossil-based hydrocarbon fuel; and the second idle-MTO nvPM emissions index ratio of the gas turbine engine is less than 1.

* * * * *